US012522896B2

(12) United States Patent
Tonneslan et al.

(10) Patent No.: US 12,522,896 B2
(45) Date of Patent: *Jan. 13, 2026

(54) ALUMINUM ALLOY COMPOSITIONS, ARTICLES THEREFROM, AND METHODS OF PRODUCING ARTICLES THEREFROM

(71) Applicant: Relativity Space, Inc., Long Beach, CA (US)

(72) Inventors: Samuel James Tonneslan, Long Beach, CA (US); Van Earl Bishop Wright, Jr., Long Beach, CA (US); Ross Patterson, Long Beach, CA (US); Erik Richman, Long Beach, CA (US); Sean Orzolek, Long Beach, CA (US); Molly Kaplan, Long Beach, CA (US); Fritz C. Gruber, Long Beach, CA (US); Timothy Langan, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 18/478,703

(22) Filed: Sep. 29, 2023

(65) Prior Publication Data

US 2024/0026497 A1 Jan. 25, 2024

Related U.S. Application Data

(63) Continuation-in-part of application No. 17/929,558, filed on Sep. 2, 2022, now Pat. No. 12,031,199.

(60) Provisional application No. 63/325,528, filed on Mar. 30, 2022.

(51) Int. Cl.
| | |
|---|---|
| *C22C 21/06* | (2006.01) |
| *B22F 10/28* | (2021.01) |
| *C22F 1/047* | (2006.01) |
| *B33Y 10/00* | (2015.01) |
| *B33Y 30/00* | (2015.01) |
| *B33Y 70/00* | (2020.01) |
| *B33Y 80/00* | (2015.01) |

(52) U.S. Cl.
CPC .............. *C22C 21/06* (2013.01); *B22F 10/28* (2021.01); *C22F 1/047* (2013.01); *B22F 2301/052* (2013.01); *B33Y 10/00* (2014.12); *B33Y 30/00* (2014.12); *B33Y 70/00* (2014.12); *B33Y 80/00* (2014.12)

(58) Field of Classification Search
CPC ........ C22C 1/0416; C22C 21/06; C22F 1/047
See application file for complete search history.

(56) References Cited

U.S. PATENT DOCUMENTS

| | | | |
|---|---|---|---|
| 5,091,609 A * | 2/1992 | Sawada | C23C 18/1262 174/110 A |
| 7,754,036 B1 | 7/2010 | Newman et al. | |
| 10,030,293 B2 | 7/2018 | Palm | |
| 10,254,499 B1 | 4/2019 | Cohen et al. | |
| 12,031,199 B2 * | 7/2024 | Tonneslan | C22F 1/047 |
| 2005/0109431 A1 | 5/2005 | Kernan et al. | |
| 2005/0167012 A1 | 8/2005 | Lin et al. | |
| 2011/0017055 A1 | 1/2011 | Mooy et al. | |
| 2011/0313091 A1 | 12/2011 | Argyropoulos et al. | |
| 2015/0368771 A1 | 12/2015 | Hentschel et al. | |
| 2017/0165795 A1 | 6/2017 | Lenczowski | |
| 2021/0214823 A1 | 7/2021 | Allard, Jr. et al. | |
| 2023/0313345 A1 | 10/2023 | Tonneslan et al. | |

FOREIGN PATENT DOCUMENTS

| | | |
|---|---|---|
| CN | 101941122 B | 8/2012 |
| CN | 111187951 A | 5/2020 |
| EP | 4499885 A1 | 2/2025 |
| WO | 2023191893 A1 | 10/2023 |

OTHER PUBLICATIONS

International Search Report and Written Opinion for International Application No. PCT/US2022/076314, Search completed Nov. 3, 2022, Mailed Jan. 27, 2023, 23 pgs.
"Alloy", ER4043. Datasheet [online]. Weldwire Company, Inc., 2013 [retrieved on Nov. 3, 2022]. Retrieved from the Internet: <URL: https://www.weldwire.net/wp-content/uploads/2013/08/ER4043.pdf>, 1 pg.
"Current and Speculative Applications", [retrieved on Sep. 14, 2023]. Retrieved from the Internet: <URL: https://anon49.tripod.com/alsc/uses.html>, 3 pgs.
"International Alloy Designations and Chemical Composition Limits for Wrought Aluminum and Wrought Aluminum Alloys", The Aluminum Association, Aug. 2018, [retrieved on Sep. 11, 2024]. Retrieved from the Internet: <URL: <https://www.aluminum.org/sites/default/files/2021-11/TealSheet.pdf>, 45 pgs.
"Matweb", [retrieved on Sep. 14, 2023]. Retrieved from the Internet: <URL: https://www.matweb.com/search/datasheet.aspx?matguid=77074c2f3397473aa831ca0183654711&ckck=1>, 1 pg.
Ahmad, "The Properties and Application of Scandium-Reinforced Aluminum", JOM, vol. 55, No. 2, Feb. 2003, pp. 35-39, doi: 10.1007/s11837-003-0224-6.
Belov et al., "Casting alloys of the Al—Ce—Ni system: microstructural approach to alloy design", Materials Science and Engineering: A, vol. 271, No. 1-2, Nov. 1, 1999, pp. 134-142, doi: 10.1016/S0921-5093(99)00343-3.
Caetano, "Overview of Common Aerospace Aluminum Alloys: 2024, 6061, and 7075", 2.821: Structural Materials, Apr. 1, 2017, 19 pgs.
Coury et al., "Design and production of Al—Mn—Ce alloys with tailored properties", Materials & Design, vol. 110, Nov. 15, 2016, pp. 436-448, doi: 10.1016/j.matdes.2016.08.008.

(Continued)

*Primary Examiner* — Jessee R Roe
(74) *Attorney, Agent, or Firm* — KPPB LLP

(57) ABSTRACT

Systems of weldable wires, powder, and materials comprising an aluminum-magnesium-scandium alloy, and methods for additive manufacturing the alloy are described. The alloy can be utilized in additive manufacturing to additively manufacture at industrial scales. With post treatment, the additive manufactured alloys can have advantageous properties for aerospace applications.

19 Claims, 24 Drawing Sheets

(56) References Cited

OTHER PUBLICATIONS

Cross, "Applying Solidification Theory to Aluminum Weldability and Consumable Development", Supplement to the Welding Journal, vol. 101, No. 8, Aug. 2022, pp. 209-s-223-s, doi: 10.29391/2022.101.016.

Harvey, "Effect of Elevated Temperature Operation on the Strength of Aluminum Conductors", IEEE Transactions on Power Apparatus and Systems, vol. PAS-91, No. 5, Sep. 1972, pp. 1769-1772, doi: 10.1109/TPAS.1972.293498.

Inoue et al., "High-strength aluminum alloys containing nanoquasicrystalline particles", Materials Science and Engineering, vol. A 286, No. 1, Jun. 30, 2000, pp. 1-10, doi: 10.1016/S0921-5093(00)00656-0.

Langelandsvik et al., "Review of Aluminum Alloy Development for Wire Arc Additive Manufacturing", Materials, vol. 14, No. 18, Article 5370, Sep. 17, 2021, 26 pgs., doi: 10.3390/ma14185370.

Michi et al., "A creep-resistant additively manufactured Al—Ce—Ni—Mn alloy", Acta Materialia, vol. 227, No. 117699, Apr. 1, 2022, 47 pgs., doi: 10.1016/j.actamat.2022.117699.

Plotkowski et al., "Microstructure and properties of a high temperature Al—Ce—Mn alloy produced by additive manufacturing", Acta Materialia, vol. 196, Sep. 1, 2020, pp. 595-608, doi: 10.1016/j.actamat.2020.07.014.

Ren et al., "The Microstructure and Properties of an Al—Mg—0.3Sc Alloy Deposited by Wire Arc Additive Manufacturing", Metals, vol. 10, No. 3, Article 320, Feb. 26, 2020, 9 pgs., doi: 10.3390/met10030320.

Royset, "Scandium in Aluminium Alloys Overview: Physical Metallurgy, Properties and Applications", Metallurgical Science and Technology, vol. 25, Jan. 2007, pp. 11-21.

Sims et al., "Cerium-Based, Intermetallic-Strengthened Aluminum Casting Alloy: High-Volume Co-product Development", JOM, vol. 68, No. 7, May 23, 2016, pp. 1940-1947, doi: 10.1007/s11837-016-1943-9.

Sims et al., "High performance aluminum-cerium alloys for high-temperature applications", Material Horizons, vol. 4, No. 6, Aug. 1, 2017, pp. 1070-1078, doi: 10.1039/c7mh00391a.

Tang et al., "Correlation between thermodynamics and glass forming ability in the Al—Ce—Ni system", Intermetallics, vol. 18, No. 5, May 2010, pp. 900-906, doi: 10.1016/j.intermet.2009.12.027.

Weiss, "Developments in Aluminum-Scandium-Ceramic and Aluminum-Scandium-Cerium Alloys", The Minerals, Metals & Materials Series, Chesonis, C. (eds) Light Metals 2019, Springer, Cham., Feb. 16, 2019, pp. 1439-1443, doi: 10.1007/978-3-030-05864-7_180.

Yang et al., "Primary solidification of ternary compounds in Al-rich Al—Ce—Mn alloys", Journal of Alloys and Compounds, vol. 844, No. 156048, Dec. 5, 2020, 24 pgs., doi: 10.1016/j.jallcom.2020.156048.

International Preliminary Report on Patentability for International Application PCT/US2022/076314, Report issued Sep. 24, 2024, Mailed Oct. 10, 2024, 15 Pgs.

\* cited by examiner

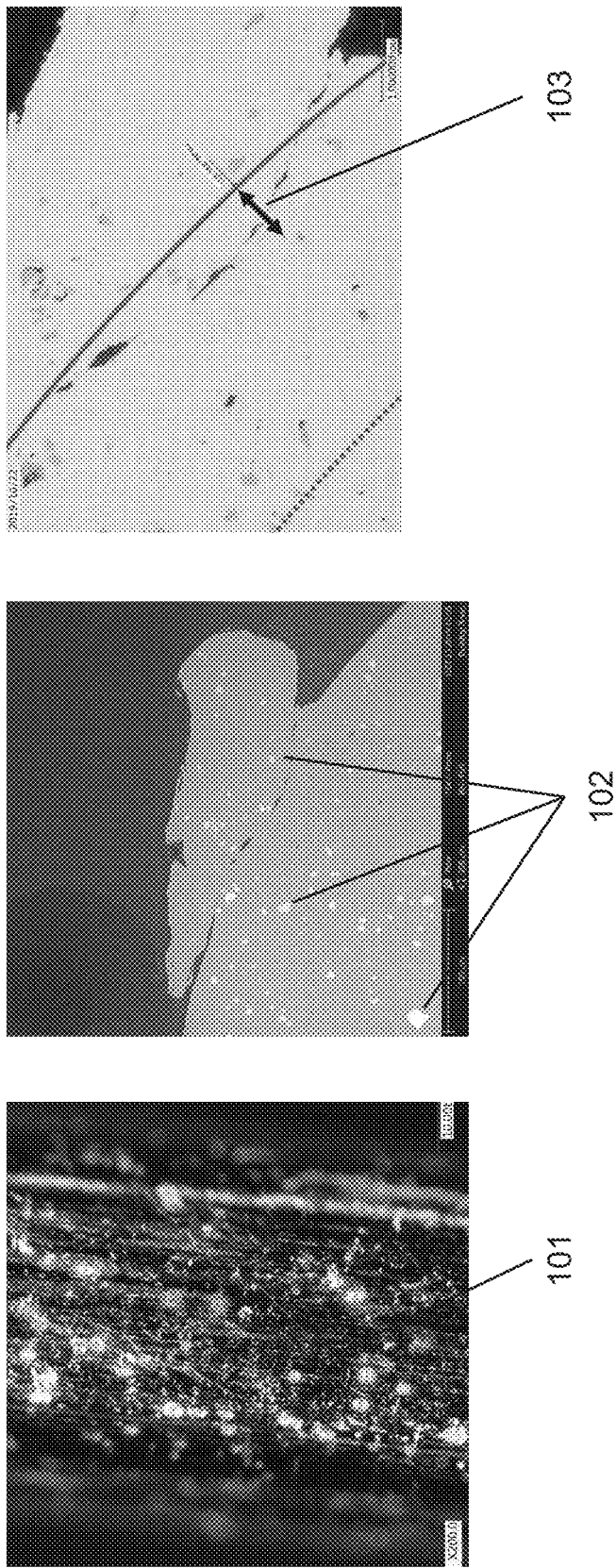

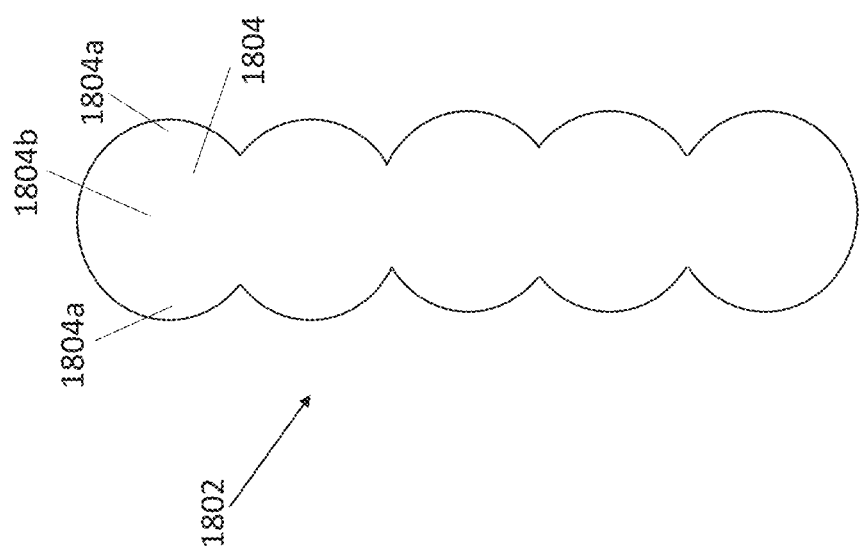

ALUMINUM ALLOY COMPOSITIONS, ARTICLES THEREFROM, AND METHODS OF PRODUCING ARTICLES THEREFROM

CROSS-REFERENCE TO RELATED APPLICATIONS

The current application is a continuation-in-part of U.S. patent application Ser. No. 17/929,558, now U.S. Pat. No. 12,031,199, which claims the benefit, under 35 U.S.C. § 119 (e), of U.S. Provisional Patent Application No. 63/325,528, filed Mar. 30, 2022, the entire disclosure of each of which is incorporated by reference in its entirety for all purposes.

FIELD OF THE INVENTION

The present invention generally relates to aluminum-magnesium-scandium alloy compositions; and more particularly to wires of aluminum-magnesium-scandium alloys, and to methods for producing articles with aluminum-magnesium-scandium alloys.

BACKGROUND

Wire arc additive manufacturing (WAAM) is a three-dimensional printing process in which the heat energy of an electric arc or another energy source is employed for melting an electrode (wire) and depositing material layers according to a deposition path to form a three-dimensional structure. Some alloys, such as 1XXX, 4XXX, and most of the 5XXX-series aluminum alloys, are weldable and available as wire, but the resulting printed materials lack strength and are unsuitable for use as structural materials. Structural aluminums, such as 2XXX and 7XXX-series, and aluminum-lithium alloys, have desirable strength properties, but welding with these alloys is difficult and, as a result, they are generally not available as wire products. These drawbacks have prevented WAAM from being used for manufacturing applications that require high strength, such as for manufacturing aerospace articles and components.

BRIEF SUMMARY OF THE INVENTION

Summarized here and described in detail below are aluminum-magnesium-scandium alloy compositions that are both suitable for use as a welding material in WAAM and have suitable strength for use in aerospace articles and components and/or for use as structural materials.

One embodiment of the invention includes an aluminum-magnesium-scandium alloy having a composition comprising: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.2 and less than or equal to 1.0 weight percent; Ti greater than or equal to 0.05 and less than or equal to 0.15 weight percent; each of Si, Fe, Cu, and Zn less than or equal to 0.1 weight percent; with a balance of the composition being Al.

In a further embodiment, the composition further comprises less than or equal to 0.2 wt % Cr.

In another embodiment, the composition further comprises less than or equal to 0.1 wt % of at least one of Cd, Hg, Ag, B, and Li.

In an additional embodiment, the composition further comprises less than or equal to 0.002 wt % B.

In still another embodiment, the composition further comprises less than or equal to 0.0003 wt % Be.

In a still further embodiment, the composition further comprises less than or equal to 0.05 wt % Si.

In a yet further embodiment, a ratio of Zr to Sc is less than or equal to 0.51, when determined according to the formula: (Zr wt %/Sc wt %).

In yet another embodiment, a ratio of Cu to Cr is less than or equal to 0.3, when determined according to the formula: (Cu wt %/Cr wt %).

In a further embodiment again, a ratio of the combination of Zr and Ti present to Sc is less than or equal to 0.3, when determined according to the formula: ((Zr wt %+Ti wt %)/Sc wt %).

In another embodiment again, the composition further comprises at least one trace element less than or equal to 0.05 weight percent, and a total amount of trace element less than or equal to 0.15 weight percent.

In another additional embodiment, the at least one trace element is selected from the group consisting of: an element from the lanthanide group, yttrium (Y), niobium (Nb), vanadium (V), hydrogen (H), oxygen (O), nitrogen (N), and any combination thereof.

In a still further embodiment, the composition comprises at least one primary particle or domain of $Al_3(Sc, Zr)$ having at least one dimension of less than or equal to 20 μm.

In still yet another embodiment, a wire formed from the alloy satisfies a plurality of requirements when determined according to AWS A5.10, or an equivalent thereof.

A still further embodiment includes a wire comprising an aluminum-magnesium-scandium alloy having a composition comprising: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.2 and less than or equal to 1.0 weight percent; Ti greater than or equal to 0.05 and less than or equal to 0.15 weight percent; each of Si, Fe, Cu, and Zn less than or equal to 0.1 weight percent; with a balance of the composition being Al; where the wire satisfies a plurality of requirements when determined according to AWS A5.10, or an equivalent thereof.

In another embodiment again, the composition further comprises less than or equal to 0.2 wt % Cr.

In an additional embodiment, the composition further comprises less than or equal to 0.1 wt % of at least one of Cd, Hg, Ag, B, and Li.

In yet another embodiment, the composition further comprises less than or equal to 0.002 wt % B.

In a yet further embodiment, the composition further comprises less than or equal to 0.0003 wt % Be.

In another yet embodiment, the composition further comprises less than or equal to 0.05 wt % Si.

In another additional embodiment, a ratio of Zr to Sc is less than or equal to when determined according to the formula: (Zr wt %/Sc wt %).

In a still yet further embodiment, a ratio of Cu to Cr is less than or equal to 0.3, when determined according to the formula: (Cu wt %/Cr wt %).

In another embodiment again, a ratio of the combination of Zr and Ti present to Sc is less than or equal to 0.3, when determined according to the formula: ((Zr wt %+Ti wt %)/Sc wt %).

In a further embodiment, the composition further comprises at least one trace element less than or equal to 0.05 weight percent, and a total amount of trace element less than or equal to 0.15 weight percent.

In a still further embodiment, the at least one trace element is selected from the group consisting of: an element from the lanthanide group, yttrium (Y), niobium (Nb), vanadium (V), hydrogen (H), oxygen (O), nitrogen (N), and any combination thereof.

In a yet further embodiment, the composition comprises at least one primary particle or domain of $Al_3(Sc, Zr)$ having at least one dimension of less than or equal to 20 μm.

In still another embodiment again, the wire has an average diameter of less than or equal to 2 mm.

In a still further additional embodiment, the wire has a spooling cast from 25 to 50 cm and a spooling helix of less than or equal to 0.1 of the spooling cast.

In still another embodiment, an article formed from the wire has a thickness greater than or equal to 0.05 inch.

In yet another embodiment again, at least a portion of the article has a height at least 1000 times greater than a thickness of the same portion of the article.

Another further embodiment includes an article comprising an aluminum-magnesium-scandium alloy having a composition comprising: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.2 and less than or equal to 1.0 weight percent; Ti greater than or equal to 0.05 and less than or equal to 0.15 weight percent; each of Si, Fe, Cu, and Zn less than or equal to 0.1 weight percent; with a balance of the composition being Al; where the article has a yield strength of greater than or equal to 135 MPa and less than or equal to 215 MPa, and a tensile strength of greater than or equal to 290 MPa and less than or equal to 370 MPa.

In a further embodiment, the composition further comprises less than or equal to 0.2 wt % Cr.

In another embodiment, the composition further comprises less than or equal to 0.1 wt % of at least one of Cd, Hg, Ag, B, and Li.

In a still further embodiment, the composition further comprises less than or equal to 0.002 wt % B.

In still another embodiment, the composition further comprises less than or equal to 0.0003 wt % Be.

In a yet further embodiment, the composition further comprises less than or equal to 0.05 wt % Si.

In yet another embodiment, a ratio of Zr to Sc is less than or equal to 0.51, when determined according to the formula: (Zr wt %/Sc wt %).

In a further embodiment again, a ratio of Cu to Cr is less than or equal to 0.3, when determined according to the formula: (Cu wt %/Cr wt %).

In another embodiment again, a ratio of the combination of Zr and Ti present to Sc is less than or equal to 0.3, when determined according to the formula: ((Zr wt %+Ti wt %)/Sc wt %).

In a further additional embodiment, the composition further comprises at least one trace element less than or equal to 0.05 weight percent, and a total amount of trace element less than or equal to 0.15 weight percent.

In another embodiment, the at least one trace element is selected from the group consisting of: an element from the lanthanide group, yttrium (Y), niobium (Nb), vanadium (V), hydrogen (H), oxygen (O), nitrogen (N), and any combination thereof.

In a still yet further embodiment, the composition comprises at least one primary particle or domain of $Al_3(Sc, Zr)$ having at least one dimension of less than or equal to 20 μm.

In still yet another embodiment, the article has a thickness greater than or equal to 0.05 inch.

In a still yet further embodiment, at least a portion of the article has a height at least 1000 times greater than a thickness of the same portion of the article.

In a still further embodiment again, the article has a yield strength of greater than or equal to 200 MPa and a tensile strength of greater than or equal to 280 MPa after a T5 heat treatment.

In still another embodiment again, the T5 heat treatment is a process where the article is heated at a temperature at least 275° C. and less than a melting point of the article for a period of less than or equal to 12 hours, and omits a homogenization heat treatment.

In a still further additional embodiment, the T5 heat treatment temperature is less than or equal to 335° C.

In still another embodiment again, the T5 heat treatment relieves at least 90% of residual stress accumulated in the article.

In yet another embodiment, after the T5 heat treatment, the article has a degree of sensitization (DoS) mass loss of less than or equal to 15 $mg/cm^2$.

Another further embodiment includes a method for additive manufacturing an article comprising providing a wire comprising an aluminum-magnesium-scandium alloy with a composition:

Sc greater than or equal to 0.23 and less than or equal to 0.37 weight percent;

Zr greater than or equal to 0.11 and less than or equal to 0.19 weight percent;

Mg greater than or equal to 4.1 and less than or equal to 5.6 weight percent;

Mn greater than or equal to 0.2 and less than or equal to 1.0 weight percent;

Ti greater than or equal to 0.05 and less than or equal to 0.15 weight percent;

each of Si, Fe, Cu, and Zn less than or equal to 0.1 weight percent;

with a balance of the composition being Al; and depositing the wire in a layer by layer fashion to form the article; where the article has a yield strength of greater than or equal to 135 MPa and less than or equal to 215 MPa, and a tensile strength of greater than or equal to 290 MPa and less than or equal to 370 MPa.

In yet another embodiment, the composition further comprises less than or equal to 0.2 wt % Cr.

In an additional further embodiment, the composition further comprises less than or equal to 0.1 wt % of at least one of Cd, Hg, Ag, B, and Li.

In another further embodiment again, the composition further comprises less than or equal to 0.002 wt % B.

In still another embodiment, the composition further comprises less than or equal to 0.0008 wt % Be.

In yet another embodiment, the composition further comprises less than or equal to 0.05 wt % Si.

In another further additional embodiment, a ratio of Zr to Sc is less than or equal to 0.51, when determined according to the formula: (Zr wt %/Sc wt %).

In still yet another further embodiment, a ratio of Cu to Cr is less than or equal to 0.3, when determined according to the formula: (Cu wt %/Cr wt %).

In still another further embodiment again, a ratio of the combination of Zr and Ti present to Sc is less than or equal to 0.3, when determined according to the formula: ((Zr wt %+Ti wt %)/Sc wt %).

In yet another embodiment, the composition further comprises at least one trace element less than or equal to 0.05 weight percent, and a total amount of trace element less than or equal to 0.15 weight percent.

In still yet another embodiment, the at least one trace element is selected from the group consisting of: an element from the lanthanide group, yttrium (Y), niobium (Nb), vanadium (V), hydrogen (H), oxygen (O), nitrogen (N), and any combination thereof.

In another yet embodiment again, the composition comprises at least one primary particle or domain of $Al_3(Sc, Zr)$ having at least one dimension of less than or equal to 20 μm.

In a further embodiment, the article has a thickness greater than or equal to 0.05 inch.

In another additional embodiment, at least a portion of the article has a height at least 1000 times greater than a thickness of the same portion of the article.

In yet another embodiment, the additive manufacturing process is a wire arc additive manufacturing (WAAM) process selected from the group consisting of: a gas metal arc welding based WAAM, a gas tungsten arc welding based WAAM, a plasma arc welding based WAAM, a single wire WAAM, a double-wire WAAM, and a multiple-wire WAAM.

In yet another further embodiment, the article has a yield strength of greater than or equal to 200 MPa and a tensile strength of greater than or equal to 280 MPa after a T5 heat treatment.

In still yet another embodiment, the T5 heat treatment is a process where the article is heated at a temperature at least 275° C. and less than a melting point of the article for a period of less than or equal to 12 hours, and omits a homogenization heat treatment.

In another further embodiment, the T5 heat treatment temperature is less than or equal to 335° C.

In another additional embodiment, the T5 heat treatment relieves at least 90% of residual stress accumulated in the article.

In a further yet embodiment again, after the T5 heat treatment, the article has a degree of sensitization (DoS) mass loss of less than or equal to 15 $mg/cm^2$.

Another further embodiment includes a method for additive manufacturing an article comprising providing a wire comprising an aluminum-magnesium-scandium alloy with a composition:
 Sc greater than or equal to 0.23 and less than or equal to 0.37 weight percent;
 Zr greater than or equal to 0.11 and less than or equal to 0.19 weight percent;
 Mg greater than or equal to 4.1 and less than or equal to 5.6 weight percent;
 Mn greater than or equal to 0.2 and less than or equal to 1.0 weight percent;
 each of Si, Fe, Cu, and Zn less than or equal to 0.1 weight percent;
 with a balance of the composition being Al;
depositing the wire in a layer by layer fashion to form the article; and applying a T5 heat treatment to the article; where after the T5 treatment, the article has a yield strength of greater than or equal to 200 MPa and a tensile strength of greater than or equal to 280 MPa.

In a further embodiment, the composition further comprises less than or equal to 0.2 wt % Cr.

In another embodiment, the composition further comprises less than or equal to 0.1 wt % of at least one of Cd, Hg, Ag, B, and Li.

In a still further embodiment, the composition further comprises less than or equal to 0.002 wt % B.

In still another embodiment, the composition further comprises less than or equal to 0.0008 wt % Be.

In a yet further embodiment, the composition further comprises less than or equal to 0.05 wt % Si.

In yet another embodiment, a ratio of Zr to Sc is less than or equal to 0.51, when determined according to the formula: (Zr wt %/Sc wt %).

In another embodiment again, a ratio of Cu to Cr is less than or equal to 0.3, when determined according to the formula: (Cu wt %/Cr wt %).

In a further additional embodiment, a ratio of the combination of Zr and Ti present to Sc is less than or equal to 0.3, when determined according to the formula: ((Zr wt %+Ti wt %)/Sc wt %).

In another additional embodiment, the composition further comprises at least one trace element less than or equal to 0.05 weight percent, and a total amount of trace element less than or equal to 0.15 weight percent.

In a still yet further embodiment, the at least one trace element is selected from the group consisting of: an element from the lanthanide group, yttrium (Y), niobium (Nb), vanadium (V), hydrogen (H), oxygen (O), nitrogen (N), and any combination thereof.

In still yet another embodiment, the composition comprises at least one primary particle or domain of $Al_3(Sc, Zr)$ having at least one dimension of less than or equal to 20 μm.

In a still further embodiment again, the article has a thickness greater than or equal to 0.05 inch.

In still another embodiment again, at least a portion of the article has a height at least 1000 times greater than a thickness of the same portion of the article.

In yet another embodiment, the additive manufacturing process is a wire arc additive manufacturing (WAAM) process selected from the group consisting of: a gas metal arc welding based WAAM, a gas tungsten arc welding based WAAM, a plasma arc welding based WAAM, a single wire WAAM, a double-wire WAAM, and a multiple-wire WAAM.

In an additional embodiment again, the T5 heat treatment is a process where the article is heated at a temperature at least 275° C. and less than a melting point of the article for a period of less than or equal to 12 hours, and omits a homogenization heat treatment.

In yet another further embodiment, the T5 heat treatment temperature is less than or equal to 335° C.

In a further yet embodiment, the T5 heat treatment relieves at least 90% of residual stress accumulated in the article.

In yet another embodiment again, after the T5 heat treatment, the article has a degree of sensitization (DoS) mass loss of less than or equal to 15 $mg/cm^2$.

In some aspects, the techniques described herein relate to an article including an aluminum-magnesium-scandium alloy including a layered structure with a composition including: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.15 and less than or equal to 0.25 weight percent; Ti greater than or equal to 0.05 and less than or equal to 0.15 weight percent; each of Si, Fe, Cu, and Zn less than or equal to 0.1 weight percent; with a balance of the composition being Al, wherein the article has a yield strength of greater than or equal to 200 MPa and a tensile strength of greater than or equal to 280 MPa after a T5 age-after-print heat treatment process.

In some aspects, the techniques described herein relate to an article, wherein the composition further includes less than or equal to 0.2 wt % Cr.

In some aspects, the techniques described herein relate to an article, wherein the composition further includes less than or equal to 0.1 wt % of at least one of Cd, Hg, Ag, B, and Li.

In some aspects, the techniques described herein relate to an article, wherein the composition further includes less than or equal to 0.002 wt % B.

In some aspects, the techniques described herein relate to an article, wherein the composition further includes less than or equal to 0.0008 wt % Be.

In some aspects, the techniques described herein relate to an article, wherein the composition further includes less than or equal to 0.05 wt % Si.

In some aspects, the techniques described herein relate to an article, wherein a ratio of Zr to Sc is less than or equal to 0.51, when determined according to the formula: (Zr wt %/Sc wt %).

In some aspects, the techniques described herein relate to an article, wherein a ratio of Cu to Cr is less than or equal to 0.3, when determined according to the formula: (Cu wt %/Cr wt %).

In some aspects, the techniques described herein relate to an article, wherein a ratio of the combination of Zr and Ti present to Sc is less than or equal to 0.3, when determined according to the formula: ((Zr wt %+Ti wt %)/Sc wt %).

In some aspects, the techniques described herein relate to an article, wherein the composition further includes at least one trace element less than or equal to 0.05 weight percent, and a total amount of trace element less than or equal to 0.15 weight percent.

In some aspects, the techniques described herein relate to an article, wherein the at least one trace element is selected from the group consisting of: an element from the lanthanide group, yttrium (Y), niobium (Nb), vanadium (V), hydrogen (H), oxygen (O), nitrogen (N), and any combination thereof.

In some aspects, the techniques described herein relate to an article, wherein the composition includes at least one primary particle or domain of $Al_3(Sc, Zr)$ having at least one dimension of less than or equal to 20 μm.

In some aspects, the techniques described herein relate to an article, wherein the article has a thickness greater than or equal to 0.05 inch.

In some aspects, the techniques described herein relate to an article, wherein at least a portion of the article has a height at least 1000 times greater than a thickness of the same portion of the article.

In some aspects, the techniques described herein relate to an article, wherein the article has a yield strength of greater than or equal to 200 MPa and a tensile strength of greater than or equal to 280 MPa after a heat treatment.

In some aspects, the techniques described herein relate to an article, wherein the article has a yield strength of greater than or equal to 225 MPa and a tensile strength of greater than or equal to 300 MPa after a heat treatment.

In some aspects, the techniques described herein relate to an article, wherein the heat treatment is a process where the article is heated at a temperature at least 275° C. and less than a melting point of the article for a period of less than or equal to 12 hours, and omits a homogenization heat treatment.

In some aspects, the techniques described herein relate to an article, wherein the heat treatment temperature is less than or equal to 335° C.

In some aspects, the techniques described herein relate to an article, wherein the heat treatment relieves at least 90% of residual stress accumulated in the article.

In some aspects, the techniques described herein relate to an article, wherein after the heat treatment, the article has a degree of sensitization (DoS) mass loss of less than or equal to 15 mg/cm2.

In some aspects, the techniques described herein relate to an article, wherein the Mn content is greater than 0.2 and less than 0.25 weight percent.

In some aspects, the techniques described herein relate to an article, wherein the layered structure includes layers of cylindrical or oval shaped contours that additively stack to form the article.

In some aspects, the techniques described herein relate to an article, wherein the Sc composition is greater than or equal to 0.28 and less than or equal to 0.32 weight percent.

In some aspects, the techniques described herein relate to a method for additive manufacturing an article, including: providing a wire including an aluminum-magnesium-scandium alloy with a composition: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.15 and less than or equal to 0.25 weight percent; Ti greater than or equal to 0.05 and less than or equal to 0.15 weight percent; each of Si, Fe, Cu, and Zn less than or equal to 0.1 weight percent; with a balance of the composition being Al; and depositing the wire in a layer by layer fashion to form the article.

In some aspects, the techniques described herein relate to a method, wherein the composition further includes less than or equal to 0.2 wt % Cr.

In some aspects, the techniques described herein relate to a method, wherein the composition further includes less than or equal to 0.1 wt % of at least one of Cd, Hg, Ag, B, and Li.

In some aspects, the techniques described herein relate to a method, wherein the composition further includes less than or equal to 0.002 wt % B.

In some aspects, the techniques described herein relate to a method, wherein the composition further includes less than or equal to 0.0008 wt % Be.

In some aspects, the techniques described herein relate to a method, wherein the composition further includes less than or equal to 0.05 wt % Si.

In some aspects, the techniques described herein relate to a method, wherein a ratio of Zr to Sc is less than or equal to 0.51, when determined according to the formula: (Zr wt %/Sc wt %).

In some aspects, the techniques described herein relate to a method, wherein a ratio of Cu to Cr is less than or equal to 0.3, when determined according to the formula: (Cu wt %/Cr wt %).

In some aspects, the techniques described herein relate to a method, wherein a ratio of the combination of Zr and Ti present to Sc is less than or equal to 0.3, when determined according to the formula: ((Zr wt %+Ti wt %)/Sc wt %).

In some aspects, the techniques described herein relate to a method, wherein the composition further includes at least one trace element less than or equal to 0.05 weight percent, and a total amount of trace element less than or equal to 0.15 weight percent.

In some aspects, the techniques described herein relate to a method, wherein the at least one trace element is selected from the group consisting of: an element from the lanthanide group, yttrium (Y), niobium (Nb), vanadium (V), hydrogen (H), oxygen (O), nitrogen (N), and any combination thereof.

In some aspects, the techniques described herein relate to a method, wherein the composition includes at least one primary particle or domain of $Al_3(Sc, Zr)$ having at least one dimension of less than or equal to 20 μm.

In some aspects, the techniques described herein relate to a method, wherein the article has a thickness greater than or equal to 0.05 inch.

In some aspects, the techniques described herein relate to a method, wherein at least a portion of the article has a height at least 1000 times greater than a thickness of the same portion of the article.

In some aspects, the techniques described herein relate to a method, wherein the additive manufacturing process is a wire arc additive manufacturing (WAAM) process selected from the group consisting of: a gas metal arc welding based WAAM, a gas tungsten arc welding based WAAM, a plasma arc welding based WAAM, a single wire WAAM, a double-wire WAAM, and a multiple-wire WAAM.

In some aspects, the techniques described herein relate to a method, wherein the article has a yield strength of greater than or equal to 200 MPa and a tensile strength of greater than or equal to 280 MPa after a heat treatment.

In some aspects, the techniques described herein relate to a method, wherein the heat treatment is a process where the article is heated at a temperature at least 275° C. and less than a melting point of the article for a period of less than or equal to 12 hours, and omits a homogenization heat treatment.

In some aspects, the techniques described herein relate to a method, wherein the heat treatment temperature is less than or equal to 335° C.

In some aspects, the techniques described herein relate to a method, wherein the heat treatment relieves at least 90% of residual stress accumulated in the article.

In some aspects, the techniques described herein relate to a method, wherein after the heat treatment, the article has a degree of sensitization (DoS) mass loss of less than or equal to 15 mg/cm2.

In some aspects, the techniques described herein relate to a method, wherein the Mn content is greater than 0.2 and less than 0.25 weight percent.

In some aspects, the techniques described herein relate to a method for additive manufacturing an article, including: providing a wire including an aluminum-magnesium-scandium alloy with a composition: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.15 and less than or equal to 0.25 weight percent; each of Si, Fe, Cu, and Zn less than or equal to 0.1 weight percent; with a balance of the composition being Al; depositing the wire in a layer by layer fashion to form the article; and applying a heat treatment to the article.

In some aspects, the techniques described herein relate to a method, wherein the composition further includes less than or equal to 0.2 wt % Cr.

In some aspects, the techniques described herein relate to a method, wherein the composition further includes less than or equal to 0.1 wt % of at least one of Cd, Hg, Ag, B, and Li.

In some aspects, the techniques described herein relate to a method, wherein the composition further includes less than or equal to 0.002 wt % B.

In some aspects, the techniques described herein relate to a method, wherein the composition further includes less than or equal to 0.0008 wt % Be.

In some aspects, the techniques described herein relate to a method, wherein the composition further includes less than or equal to 0.05 wt % Si.

In some aspects, the techniques described herein relate to a method, wherein a ratio of Zr to Sc is less than or equal to 0.51, when determined according to the formula: (Zr wt %/Sc wt %).

In some aspects, the techniques described herein relate to a method, wherein a ratio of Cu to Cr is less than or equal to 0.3, when determined according to the formula: (Cu wt %/Cr wt %).

In some aspects, the techniques described herein relate to a method, wherein a ratio of the combination of Zr and Ti present to Sc is less than or equal to 0.3, when determined according to the formula: ((Zr wt %+Ti wt %)/Sc wt %).

In some aspects, the techniques described herein relate to a method, wherein the composition further includes at least one trace element less than or equal to 0.05 weight percent, and a total amount of trace element less than or equal to 0.15 weight percent.

In some aspects, the techniques described herein relate to a method, wherein the at least one trace element is selected from the group consisting of: an element from the lanthanide group, yttrium (Y), niobium (Nb), vanadium (V), hydrogen (H), oxygen (O), nitrogen (N), and any combination thereof.

In some aspects, the techniques described herein relate to a method, wherein the composition includes at least one primary particle or domain of $Al_3(Sc, Zr)$ having at least one dimension of less than or equal to 20 μm.

In some aspects, the techniques described herein relate to a method, wherein the article has a thickness greater than or equal to 0.05 inch.

In some aspects, the techniques described herein relate to a method, wherein at least a portion of the article has a height at least 1000 times greater than a thickness of the same portion of the article.

In some aspects, the techniques described herein relate to a method, wherein the additive manufacturing process is a wire arc additive manufacturing (WAAM) process selected from the group consisting of: a gas metal arc welding based WAAM, a gas tungsten arc welding based WAAM, a plasma arc welding based WAAM, a single wire WAAM, a double-wire WAAM, and a multiple-wire WAAM.

In some aspects, the techniques described herein relate to a method, wherein the heat treatment is a process where the article is heated at a temperature at least 275° C. and less than a melting point of the article for a period of less than or equal to 12 hours, and omits a homogenization heat treatment.

In some aspects, the techniques described herein relate to a method, wherein the heat treatment temperature is less than or equal to 335° C.

In some aspects, the techniques described herein relate to a method, wherein the heat treatment relieves at least 90% of residual stress accumulated in the article.

In some aspects, the techniques described herein relate to a method, wherein after the heat treatment, the article has a degree of sensitization (DoS) mass loss of less than or equal to 15 mg/cm2.

In some aspects, the techniques described herein relate to a method, wherein the Mn content is greater than 0.2 and less than 0.25 weight percent.

In some aspects, the techniques described herein relate to a method, wherein the Sc composition is greater than or equal to 0.28 and less than or equal to 0.32 weight percent.

In some aspects, the techniques described herein relate to a method for repairing an article, including: providing a wire including an aluminum-magnesium-scandium alloy with a composition: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than 0.2 and less than or equal to 0.25 weight percent; Ti greater than or equal to 0.05 and less than or equal to 0.15 weight percent; each of Si, Fe, Cu, and Zn less than or equal to 0.1 weight percent; with a balance of the composition being Al; and depositing the wire onto a seam of two sections of the article.

In some aspects, the techniques described herein relate to a method, wherein the composition further includes less than or equal to 0.2 wt % Cr.

In some aspects, the techniques described herein relate to a method, wherein the composition further includes less than or equal to 0.1 wt % of at least one of Cd, Hg, Ag, B, and Li.

In some aspects, the techniques described herein relate to a method, wherein the composition further includes less than or equal to 0.002 wt % B.

In some aspects, the techniques described herein relate to a method, wherein the composition further includes less than or equal to 0.0008 wt % Be.

In some aspects, the techniques described herein relate to a method, wherein the composition further includes less than or equal to 0.05 wt % Si.

In some aspects, the techniques described herein relate to a method, wherein a ratio of Zr to Sc is less than or equal to 0.51, when determined according to the formula: (Zr wt %/Sc wt %).

In some aspects, the techniques described herein relate to a method, wherein a ratio of Cu to Cr is less than or equal to 0.3, when determined according to the formula: (Cu wt %/Cr wt %).

In some aspects, the techniques described herein relate to a method, wherein a ratio of the combination of Zr and Ti present to Sc is less than or equal to 0.3, when determined according to the formula: ((Zr wt %+Ti wt %)/Sc wt %).

In some aspects, the techniques described herein relate to a method, wherein the composition further includes at least one trace element less than or equal to 0.05 weight percent, and a total amount of trace element less than or equal to 0.15 weight percent.

In some aspects, the techniques described herein relate to a method, wherein the at least one trace element is selected from the group consisting of: an element from the lanthanide group, yttrium (Y), niobium (Nb), vanadium (V), hydrogen (H), oxygen (O), nitrogen (N), and any combination thereof.

In some aspects, the techniques described herein relate to a method, wherein the composition includes at least one primary particle or domain of $Al_3(Sc, Zr)$ having at least one dimension of less than or equal to 20 μm.

In some aspects, the techniques described herein relate to a method, wherein the article has a thickness greater than or equal to 0.05 inch.

In some aspects, the techniques described herein relate to a method, wherein at least a portion of the article after depositing the wire has a height at least 1000 times greater than a thickness of the same portion of the article.

In some aspects, the techniques described herein relate to a method, wherein the article after depositing the wire has a yield strength of greater than or equal to 200 MPa and a tensile strength of greater than or equal to 280 MPa after a heat treatment.

In some aspects, the techniques described herein relate to a method, wherein the heat treatment is a process where the article with the deposited wire is heated at a temperature at least 275° C. and less than a melting point of the article for a period of less than or equal to 12 hours, and omits a homogenization heat treatment.

In some aspects, the techniques described herein relate to a method, wherein the heat treatment temperature is less than or equal to 335° C.

In some aspects, the techniques described herein relate to a method, wherein the heat treatment relieves at least 90% of residual stress accumulated in the article.

In some aspects, the techniques described herein relate to a method, wherein after the heat treatment, the article has a degree of sensitization (DoS) mass loss of less than or equal to 15 mg/cm2.

In some aspects, the techniques described herein relate to a method, wherein the Sc composition is greater than or equal to 0.28 and less than or equal to 0.32 weight percent.

In some aspects, the techniques described herein relate to an article including an aluminum-magnesium-scandium alloy including a layered structure with a composition including: Sc greater than or equal to 0.23 and less than or equal to 0.37 weight percent; Zr greater than or equal to 0.11 and less than or equal to 0.19 weight percent; Mg greater than or equal to 4.1 and less than or equal to 5.6 weight percent; Mn greater than or equal to 0.1 and less than or equal to 0.25 weight percent; Ti greater than or equal to 0.05 and less than or equal to 0.15 weight percent; each of Si, Fe, Cu, and Zn less than or equal to 0.1 weight percent; with a balance of the composition being Al.

In some aspects, the techniques described herein relate to an article, wherein the composition further includes less than or equal to 0.2 wt % Cr.

In some aspects, the techniques described herein relate to an article, wherein the composition further includes less than or equal to 0.1 wt % of at least one of Cd, Hg, Ag, B, and Li.

In some aspects, the techniques described herein relate to an article, wherein the composition further includes less than or equal to 0.002 wt % B.

In some aspects, the techniques described herein relate to an article, wherein the composition further includes less than or equal to 0.0008 wt % Be.

In some aspects, the techniques described herein relate to an article, wherein the composition further includes less than or equal to 0.05 wt % Si.

In some aspects, the techniques described herein relate to an article, wherein a ratio of Zr to Sc is less than or equal to 0.51, when determined according to the formula: (Zr wt %/Sc wt %).

In some aspects, the techniques described herein relate to an article, wherein a ratio of Cu to Cr is less than or equal to 0.3, when determined according to the formula: (Cu wt %/Cr wt %).

In some aspects, the techniques described herein relate to an article, wherein a ratio of the combination of Zr and Ti present to Sc is less than or equal to 0.3, when determined according to the formula: ((Zr wt %+Ti wt %)/Sc wt %).

In some aspects, the techniques described herein relate to an article, wherein the composition further includes at least one trace element less than or equal to 0.05 weight percent, and a total amount of trace element less than or equal to 0.15 weight percent.

In some aspects, the techniques described herein relate to an article, wherein the at least one trace element is selected from the group consisting of: an element from the lanthanide group, yttrium (Y), niobium (Nb), vanadium (V), hydrogen (H), oxygen (O), nitrogen (N), and any combination thereof.

In some aspects, the techniques described herein relate to an article, wherein the composition includes at least one primary particle or domain of $Al_3(Sc, Zr)$ having at least one dimension of less than or equal to 20 μm.

In some aspects, the techniques described herein relate to an article, wherein the article has a thickness greater than or equal to 0.05 inch.

In some aspects, the techniques described herein relate to an article, wherein at least a portion of the article has a height at least 1000 times greater than a thickness of the same portion of the article.

In some aspects, the techniques described herein relate to an article, wherein the article has a yield strength of greater than or equal to 200 MPa and a tensile strength of greater than or equal to 280 MPa after a heat treatment.

In some aspects, the techniques described herein relate to an article, wherein the article has a yield strength of greater than or equal to 225 MPa and a tensile strength of greater than or equal to 300 MPa after a heat treatment.

In some aspects, the techniques described herein relate to an article, wherein the heat treatment is a process where the article is heated at a temperature at least 275° C. and less than a melting point of the article for a period of less than or equal to 12 hours, and omits a homogenization heat treatment.

In some aspects, the techniques described herein relate to an article, wherein the heat treatment temperature is less than or equal to 335° C.

In some aspects, the techniques described herein relate to an article, wherein the heat treatment relieves at least 90% of residual stress accumulated in the article.

In some aspects, the techniques described herein relate to an article, wherein after the heat treatment, the article has a degree of sensitization (DoS) mass loss of less than or equal to 15 mg/cm2.

In some aspects, the techniques described herein relate to an article, wherein the layered structure includes layers of cylindrical or oval shaped contours that additively stack to form the article.

In some aspects, the techniques described herein relate to a method, wherein the Sc composition is greater than or equal to 0.28 and less than or equal to 0.32 weight percent.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as example embodiments of the invention and should not be construed as a complete recitation of the scope of the invention, wherein:

FIGS. 1A-1C illustrate images of defects in Scalmalloy wires.

FIG. 18B is an example cross sectional view of an article printed by WAAM using the Al—Mg—Sc alloys in accordance with an embodiment of the invention.

DETAILED DESCRIPTION

Figure 2B:
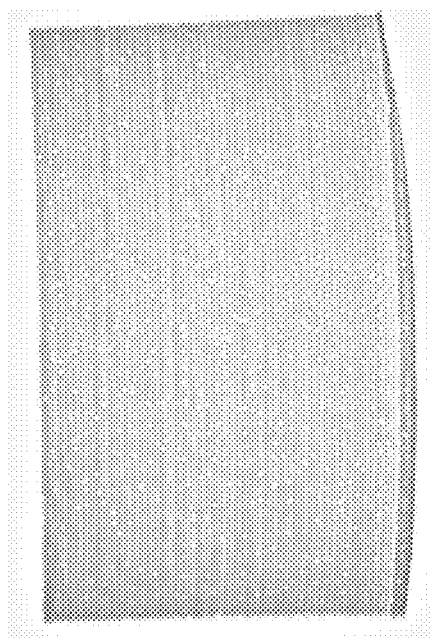
FIGS. 2A-2D illustrate poor print quality using Scalmalloy wires in WAAM processes.

Turning now to the drawings, the compositions for aluminum-magnesium-scandium (Al—Mg—Sc) alloys and the application of the alloys in a form of wire and/or powder are described. Many embodiments include the compositions of Al—Mg—Sc alloys containing Al, Mg, Sc, zirconium (Zr), manganese (Mn), silicon (Si), iron (Fe), copper (Cu), zinc (Zn), titanium (Ti), and at least one of silver (Ag), boron (B), beryllium (Be), chromium (Cr), cadmium (Cd), and mercury (Hg). The alloy can be used in additive manufacturing processes to make industrial scale objects. The Al—Mg—Sc alloys in accordance with several embodiments can form weldable wires for wire arc additive manufacturing (WAAM) processes. In some embodiments, industrial scale objects, articles, and/or structures can be printed with various WAAM processes using the Al—Mg—Sc alloy. Examples of the WAAM processes include (but are not limited to) gas metal arc welding based WAAM, gas tungsten arc welding based WAAM, plasma arc welding based WAAM, single wire WAAM, double wires WAAM, and multiple wires WAAM. The WAAM printed industrial scale objects have suitable strength for use in aerospace and other applications requiring high strength.

Additive manufacturing (AM) has gained popularity due to its flexibility and process capabilities. Powder bed fusion (PBF) is one of the most common metal-based methods where a powder bed is deposited in layers between 20 μm and 100 μm thick and melted with an electron beam or laser locally. This method is commonly adopted for production small-scale parts up to hundreds of millimeters wide. However, industrial scale components may be impractical to fabricate using AM techniques such as PBF. Wire arc additive manufacturing (WAAM) has been created to produce large scale objects. WAAM uses wire feedstock and arc welding equipment to produce builds layer-by-layer, and can produce medium to large components. WAAM offers special benefits in the manufacture of near-net-shaped pieces including the ability to produce large structural components efficiently with modest complexity, and a high rate of production.

Large-scale Al parts have been used in aerospace and automotive industries, due to high mechanical strength, light weight, and the good corrosion resistance of the material. Typically, 2XXX-series and 7XXX-series Al alloys, and aluminum-lithium alloys have desired strength properties for aerospace applications. However, conventionally high strength Al alloys are difficult to weld as such alloys contain a hardening phase when being cooled from liquid to solid. The hardening phase may cause hot tearing when the alloy is formed into wire. On the other hand, weldable Al alloys such as 1XXX, 4XXX, and most of the 5XXX-series, lack the strength needed for structural materials.

Many embodiments provide Al—Mg—Sc alloys that can form weldable wires for additive manufacturing and have desired properties for aerospace applications when printed into a 3D structure using WAAM. The Al—Mg—Sc wires enable good print quality (such as print accuracy and part quality) and surface finish when used in various WAAM processes. WAAM printed Al—Mg—Sc structures, with appropriate post treatment including (but not limited to) heat treatment and machining, can have yield strength of greater than or equal to about 200 MPa (about 29,000 PSI) and tensile strength of greater than or equal to about 280 MPa (about 40,600 PSI), suitable as structural materials. The mechanical strengths can be determined according to ASTM E8 or an equivalent thereof. In several embodiments, the printed structures using Al—Mg—Sc wires can have the desired chemical compositions. The Al—Mg—Sc wires can avoid alloying element burn-off during the printing processes to meet minimum mechanical property requirements. In some embodiments, the porosity volume fractions satisfy the aerospace welding standards when determined according to the American Welding Society (AWS) D17.1, or an equivalent thereof. The porosity volume fraction enables low defects in the printed structures.

Several embodiments provide elemental compositions of the Al—Mg—Sc alloys. Unless otherwise indicated, all percentages refer to a weight percent (wt %) and are determined relative to the total amount of a composition present. In many embodiments, elemental compositions of Al—Mg—Sc alloys comprise:

from about 0.23 to about 0.37 wt % Sc;
from about 0.11 to about 0.19 wt % Zr;
from about 4.1 to about 5.6 wt % Mg;
from about 0.2 to about 1.0 wt % Mn;
from about 0.05 to about 0.15 wt % Ti;
less than or equal to about 0.1 wt % of each of Si, Fe, Cu, and Zn;
less than or equal to about 0.2 wt % of Cr;
less than or equal to about 0.1 wt % of at least one of Be, Cd, Hg, Ag, B, Li;
less than or equal to about 0.05 wt % of each trace element; and
less than or equal to about 0.15 wt % of a total amount of trace elements;
with the balance of the composition being Al.

In many embodiments, the wires formed from the Al—Mg—Sc alloy composition are compatible with various WAAM processes, and can provide good print quality for WAAM. The WAAM printed objects can be processed after printing to acquire desired properties for aerospace applications including (but not limited to): mechanical strength, corrosion resistance, and structural stability under pressure. Several embodiments implement heat treatments including (but not limited to) T5 heat treatments to WAAM printed objects. The T5 heat treatment in accordance with a number of embodiments can include a process in which an article is heated at a temperature of at least 275° C. and less than a melting point of the article for a period of less than or equal to about 12 hours. In many embodiments, the article subjected to T5 heat treatment is heated in a single event, and is not subjected to multiple heat treatment steps. Several embodiments provide that the article subjected to T5 heat treatment is not heated to a temperature consistent with a homogenization heat treatment, which may also be referred to as a solution heat treatment, or the like. Homogenization heat treatment involves heating an alloy to a high enough temperature to drive the alloying elements into solid solution, yielding a metastable, supersaturated solid solution.

The T5 heat treatment in accordance with several embodiments can improve mechanical properties including (but not limited to) yield strength to at least 200 MPa and ultimate tensile strength to at least 280 MPa, of the WAAM printed objects and/or structures comprising Al—Mg—Sc alloys. In certain embodiments, the yield strength of the printed objects after T5 heat treatment can be at least about 240 MPa; or from about 200 MPa to about 295 MPa. In various embodiments, the ultimate tensile strength of the printed objects after T5 heat treatment can be at least about 345 MPa; or at least about 355 MPa; or from about 355 MPa to about 420 MPa. The T5 heat treatment in accordance with many embodiments can also relieve about at least 90% residual stress accumulated during the printing processes and preserve the part integrity and quality. Many embodiments include the inventive realization that the T5 heat treatment can improve the corrosion resistance of the alloy by removing the β-phase ($Mg_2Al_3$) from the Al—Mg—Sc alloys.

The WAAM processes can print industrial scale structures and/or objects using Al—Mg—Sc alloy wires in accordance with some embodiments. Examples of WAAM printed objects include (but are not limited to): objects for aerospace applications, rockets, various parts of rockets, barrels, tanks, and domes. In certain embodiments, at least a portion of the printed object has a height at least 1000 times greater than a thickness of the same portion of the object. In some embodiments, the printed objects for aerospace application can have at least one dimension of at least 10 feet; or at least 15 feet; or at least 16 feet; or at least 18 feet; or at least 20 feet; or at 22 feet; or at least 24 feet; or at least 26 feet; or at least 30 feet; or at least 40 feet; or at least 50 feet; or at least 100 feet; or at least 200 feet. The WAAM printed objects in accordance with some embodiments can have at least one component with a shape of a rectangular, square, cylinder, circle, eclipse, dome, triangle, polygon, pentagon, hexagon, octagon, cube, sphere, hemisphere, cone, pyramid, and any combinations thereof. In various embodiments, the printed objects can have a cylindrical shape with a diameter of at least 24 feet and a length of at least 200 feet.

Systems and methods for Al—Mg—Sc alloys with specific compositions that can be utilized in wire form for additive manufacturing and in applications that require high strength in accordance with various embodiments of the invention are discussed further below.

Aluminum-Magnesium-Scandium Alloys

Many embodiments provide aluminum-magnesium-scandium (Al—Mg—Sc) alloys containing Al, Mg, Sc, zirconium (Zr), manganese (Mn), silicon (Si), iron (Fe), copper (Cu), zinc (Zn), titanium (Ti), and at least one of silver (Ag), boron (B), beryllium (Be), chromium (Cr), cadmium (Cd), and mercury (Hg). The weight percentage (wt %) is based on the total weight of the composition. An example composition comprises:

from about 0.23 to about 0.37 wt % Sc;
from about 0.11 to about 0.19 wt % Zr;
from about 4.1 to about 5.6 wt % Mg;
from about 0.2 to about 1.0 wt % Mn;
from about 0.05 to about 0.15 wt % Ti;
less than or equal to about 0.1 wt % of each of Si, Fe, Cu, and Zn;
less than or equal to about 0.2 wt % of Cr;
less than or equal to about 0.1 wt % of at least one of Be, Cd, Hg, Ag, B, Li;
less than or equal to about 0.05 wt % of each trace element; and
less than or equal to about 0.15 wt % of a total amount of trace elements;
with the balance of the composition being Al.

Additions of Mg can be included to improve strength in the Al—Mg—Sc alloys. However, Mg should not exceed about 5.6 wt % in accordance with certain embodiments. The strength benefit from excess Mg may be marginal and can lead to difficulties in controlling wire surface quality. In several embodiments, the composition comprises from about 4.1 wt % Mg to about 5.6 wt % Mg. In some embodiments, the composition comprises from about 4.1 wt % Mg to about 5.5 wt % Mg; or from about 4.1 wt % Mg to about 5.4 wt % Mg; or from about 4.1 wt % Mg to about 5.3 wt % Mg; or from about 4.1 wt % Mg to about 5.2 wt % Mg; or from about 4.1 wt % Mg to about 5.1 wt % Mg; or from about 4.1 wt % Mg to about 5.0 wt % Mg; or from about 4.1 wt % Mg to about 4.9 wt % Mg; or from about 4.1 wt % Mg to about 4.8 wt % Mg; or from about 4.1 wt % Mg to about 4.7 wt % Mg; or from about 4.1 wt % Mg to about 4.6 wt % Mg; or from about 4.1 wt % Mg to about 4.5 wt % Mg; or from about 4.1 wt % Mg to about 4.4 wt % Mg; or from about 4.1 wt % Mg to about 4.3 wt % Mg; or from about 4.1 wt % Mg to about 4.2 wt % Mg, based on the total amount of the composition.

Additions of Mn can also be included to improve strength in the Al—Mg—Sc alloys. However, Mn should not exceed about 1.0 wt % in accordance with many embodiments. The strength benefit from excess Mn may be marginal. In addition, excess Mn may make it difficult to draw wires, and also make it difficult to control the surface quality of the wire. In many embodiments, the total composition includes from about 0.2 wt % to 1.0 wt % Mn, based on the total amount of the composition. In some embodiments, the composition includes greater than or equal to about 0.20 wt % Mn, or greater than or equal to about 0.25 wt % Mn, or greater than or equal to about 0.3 wt % Mn, or greater than or equal to about 0.35 wt % Mn, or greater than or equal to about 0.40 wt % Mn, or greater than or equal to about 0.45 wt % Mn, or greater than or equal to about 0.50 wt % Mn, or greater than or equal to about 0.60 wt % Mn, or greater than or equal to about 0.65 wt % Mn, or greater than or equal to about 0.70 wt % Mn, or greater than or equal to about 0.75 wt % Mn, or greater than or equal to about 0.80 wt % Mn, or greater than or equal to about 0.85 wt % Mn, or greater than or equal to about 0.90 wt % Mn, and less than or equal to about 1 wt %, or less than or equal to about 0.95 wt % Mn, based on the total amount of the composition.

In some embodiments, the Al—Mg—Sc alloy composition comprises from about 0.2 wt % Mn to about 0.48 wt % Mn; or from about 0.22 wt % Mn to about 0.42 wt % Mn; or from about 0.53 Wt % Mn to about 0.82 wt % Mn; or from about 0.64 Wt % Mn to about 0.77 wt % Mn, based on the total amount of the composition.

In many embodiments, the Al—Mg—Sc alloy composition comprises from about 0.11 wt % Zr to about 0.19 wt % Zr. In a number of embodiments, the composition comprises from about 0.15 wt % Zr to about 0.17 wt % Zr; or from about 0.11 wt % Zr to about 0.18 wt % Zr; or from about 0.11 wt % Zr to about 0.17 wt % Zr; or from about 0.11 wt % Zr to about 0.16 wt % Zr; or from about 0.11 wt % Zr to about 0.15 wt % Zr; or from about 0.11 wt % Zr to about 0.14 wt % Zr; or from about 0.11 wt % Zr to about 0.13 wt % Zr; or from about 0.11 wt % Zr to about 0.12 wt % Zr, based on the total amount of the composition.

In certain embodiments, the Al—Mg—Sc alloy composition includes from about 0.23 wt % to 0.37 wt % Sc, based on the total amount of the composition. In some embodiments, the composition comprises from about 0.25 wt % Sc to about 0.36 wt % Sc; or from about 0.27 wt % Sc to about 0.35 wt % Sc; or from about 0.30 wt % Sc to about 0.34 wt % Sc, based on the total amount of the composition.

Additions of Sc in Al alloys can improve structural and mechanical properties, and/or other characteristics of the alloy. In many embodiments, an addition of Sc with Zr is more effective than the addition of Sc alone. Zr can dissolve in the $Al_3Sc$ phase to preserve the positive qualities of $Al_3Sc$ (the effect of Zr on the Al—Mg—Sc alloys is discussed further below). In several embodiments, the ratio of Zr to Sc is less than or equal to about 0.63, or less than or equal to about 0.51, or less than or equal to about 0.47, or less than or equal to about 0.41, and greater than or equal to about 0.33, or greater than or equal to about 0.38, when determined according to the formula: [Zr wt %/Sc wt %].

The composition may include primary phases and secondary phases of various materials. These may be determined microscopically using techniques including (but not limited to) optical microscopy, TEM (transmission electron microscopy), SEM (scanning electron microscopy), and/or the like, which may be in conjunction with analytical processes such as XRD (X-ray Diffraction) analysis, EDX (Energy Dispersive X-Ray) analysis, EBSD (Electron Backscatter Diffraction) analysis, and any combinations thereof. In some embodiments, the composition comprises primary phase particles or domains comprising $Al_3(Sc, Zr)$ phase in which portions of the Sc in the $Al_3Sc$ lattice have been replaced with Zr, and the Sc in the mixed crystal is concentrated.

In many embodiments, the composition may be characterized as comprising primary particles or domains of $Al_3(Sc, Zr)$ having a longest dimension of less than or equal to about 20 μm, or less than 15 μm, or less than 10 μm, or less than 5 μm, or less than 2 μm. In some embodiments, the composition is essentially devoid of any primary phase particles or domains of $Al_3(Sc, Zr)$ meaning that no primary phase particles or domains of $Al_3(Sc, Zr)$ are observable or detectable in a representative sample when determined as outlined above.

In several embodiments, the Al—Mg—Sc alloy comprises a ratio of the combination of Zr and Ti present to Sc of less than or equal to about 0.3, when determined according to the formula [(Zr wt %+Ti wt %)/Sc wt %]. Zr and Ti should be carefully balanced, as Ti can interfere the ability of Zr to stay consolidated while cooling at high temperatures.

In a number of embodiments, the Al—Mg—Sc alloy composition can further comprise less than or equal to about 0.2 wt % Cr, based on the total weight of the composition. In some embodiments, a ratio of Cu to Cr is less than or equal to about 0.41, or less than or equal to about 0.33, or less than or equal to about 0.27, and greater than or equal to about 0.05, or greater than or equal to about 0.12, when determined according to the formula [Cu wt %/Cr wt %].

In certain embodiments, the Al—Mg—Sc alloy composition comprises less than or equal to about 0.1 wt % Si based on the total weight of the composition. In some embodiments, the Al—Mg—Sc alloy composition further comprises less than or equal to about 0.05 wt % Si, based on the total amount of the composition present. Si concentration should be carefully controlled to limit disparity in liquid metal viscosity during welding.

In some embodiments, the Al—Mg—Sc alloy composition comprises less than or equal to about 0.1 wt. % Be based on the total weight of the composition. In various embodiments, the Al—Mg—Sc composition comprises less than or equal to about 0.0008 wt % Be, or less than or equal to about 0.0008 wt % Be and greater than or equal to about wt % Be, based on the total amount of the composition.

In several embodiments, the Al—Mg—Sc alloy composition comprises less than or equal to about 0.1 wt % B based on the total weight of the composition. In certain embodiments, the Al—Mg—Sc alloy composition further comprises less than or equal to about 0.002 wt % B.

In several embodiments, the Al—Mg—Sc alloy composition further comprises trace elements. Examples of the trace elements include (but are not limited to): any one of elements from the lanthanide group, yttrium (Y), niobium (Nb), vanadium (V), hydrogen (H), oxygen (O), nitrogen (N), or any combination thereof. Each trace element is less than or equal to about 0.05 wt %, based on the total amount of the composition present. A total weight of the trace elements is less than or equal to about 0.15 wt %, based on the total weight of the composition present.

It is to be understood that in addition to the elements disclosed as being present in the composition, the composition my further include additional elements, present as unavoidable impurities which may be introduced into the alloy composition for example through processing and/or owing to the components from which the composition is produced.

While various compositions of Al—Mg—Sc alloys for weldable and high strength materials using additive manufacturing are described above, any of a variety of compositions can be utilized in Al—Mg—Sc alloys as appropriate to the requirements of specific applications in accordance with various embodiments of the invention. Systems for specific elements in Al—Mg—Sc alloys in accordance with various embodiments of the invention are discussed further below.

Scandium of the Al—Mg—Sc Alloys

Many embodiments include scandium (Sc) in Al—Mg—Sc alloys to improve the mechanical strength. The Sc concentration range between about 0.23 wt % and about 0.37 wt % of several embodiments is carefully selected to ensure the Al—Mg—Sc alloys can form weldable wires and the wires can provide desired print quality in WAAM processes. The weldable Al—Mg—Sc wires in accordance with certain embodiments satisfy the requirements of welding wires when determined according to AWS 5.10, or an equivalent thereof. In various embodiments, the WAAM printed structures using the Al—Mg—Sc alloy wires can have print qualities including (but not limited to): smooth and consistent print surface, desired mechanical properties for structural materials, desired elemental compositions, desired porosity volume fractions and/or defect densities, and any combinations thereof.

Sc additions to Al alloys can improve the alloy properties including (but not limited to) mechanical properties, heat treating response, and weldability. Sc reinforced Al alloys can have several advantages. First of all, Sc can inhibit recrystallization in Al alloys. Transition metals such as Zr, Cr, Mn, V, or Ti may not be as effective at inhibiting recrystallization because most of the high-strength and precipitation-hardenable Al alloys are solution-heat-treated at temperatures well above their recrystallization temperatures. In comparison, Sc can increase the recrystallization temperature of Al alloys to above 600° C., well above the temperature range of heat-treatable Al alloys.

Secondly, Sc can strengthen Al alloys. The addition of Sc in the range of 0.2 wt %-0.6 wt % may bring a specific-strengthening effect. Sc reinforced Al alloys are capable of developing strength and fracture toughness similar to that of Al 2024-T3 alloy.

Sc has the ability to refine grain size. Sc is a strong modifier of cast structure, and the addition of Sc makes it possible to obtain continuously cast billets with a non-dendritic structure. The addition of Sc can improve fatigue life.

The addition of Sc to Al alloys may reduce and/or eliminate of hot cracking in welds. Hot cracking is the formation of shrinkage cracks during the solidification of weld metal. The Sc modification of welding filler alloys as well as base alloys are capable of preventing hot cracking. Cracking can be significantly reduced by a Sc-modified filler metal. Al alloy 2618 is known to be hot-crack sensitive. When welded with conventional filler, it develops a high level of cracking. However, its crack susceptibility can be reduced when the conventional filler is replaced with Sc modified filler. Welding studies on Al 7XXX by conventional filler alloys and Sc-modified fillers have shown the capability of Sc to convert non-weldable alloys to weldable alloys with limited weld quality.

Most of the effects of Sc addition in wrought Al-alloys are linked to the formation of the $Al_3Sc$ phase. The formation of the $Al_3Sc$ phase in the melt before solidification can affect the grain refinement efficiency. With Al, Sc may form a eutectic-type binary phase with limited solubility. The maximum equilibrium solubility of Sc in Al is between about 0.35 wt % and 0.40 wt %. With cooling rates in solidification corresponding to continuous casting of ingots, an anomalously supersaturated solid solution of Sc (up to 0.6 wt %) in Al may be formed. In connection with this, the maximum or close to maximum hardening effect in wrought semi-finished products obtained from continuously cast billets of binary Al alloys may be obtained with a content of about 0.6 wt % Sc. With an increase in Sc content from 0 to 0.6 wt % the strength properties increase significantly. When Sc concentration exceeds about 0.6 wt %, the alloy comprising Al and Sc may form a hypereutectic phase.

In a typical processing route of a wrought Al alloy, particles of the $Al_3Sc$ phase can form under different conditions, each of which influences the microstructure and properties of the alloy in a specific way:

During solidification after casting or welding, $Al_3Sc$ particles can form in the melt and act as nuclei for Al, thus leading to grain refinement.

Heat treatment in the range 250-350° C. can lead to significant precipitation hardening of an alloy supersaturated in Sc. The size of strengthening $Al_3Sc$ precipitates is typically in the range 2-50 nm.

High temperature processing of the alloy in the range 400-600° C., for instance homogenization, hot rolling or extrusion, can give a dense distribution of $Al_3Sc$ particles of typically 20-100 nm size. The particle distributions formed under such conditions are reported to lead to good recrystallisation resistance and enhanced super-plasticity.

Scalmalloy provides an example of a high strength Al alloy with the addition of Sc (See, e.g., U.S. Patent Application Publication No. 2017/0165795 A1 to B. Lenczowski; the disclosure of which is herein incorporated by reference in its entirety). Scalmalloy is suitable in powder form for additive manufacturing. Table 1 lists elemental compositions of the Scalmalloy and an example Al—Mg—Sc alloy in accordance with several embodiments.

TABLE 1

Alloy compositions in % by weight.

| Elements | Scalmalloy | Example alloy |
|---|---|---|
| Mg | 0.5-10 | 4.1-5.6 |
| Sc | 0.1-30; preferably 0.4-3; More preferably 0.6-3 | 0.23-0.37 |
| Zr | 0.05-1.5 | 0.11-0.19 |
| Mn | 0.01-1.5 | 0.1-1.0 |
| Zn | 0-2.0 | ≤0.1 |

TABLE 1-continued

Alloy compositions in % by weight.

| Elements | Scalmalloy | Example alloy |
|---|---|---|
| Ti | 0.01-0.2 | ≤0.1 |
| Cu | n/a | ≤0.1 |
| Ce | ≤0.25 | n/a |
| Be | 0-0.004 | ≤0.1 |
| B | 0-0.008 | ≤0.1 |
| Si | ≤0.25 | ≤0.1 |
| Fe | ≤0.25 | ≤0.1 |
| Hf | ≤0.5 | ≤0.05 |
| Al | Balance | Balance |

Scalmalloy has been used in additive manufacturing. However, the high concentration of Sc (from about 0.6 wt % to about 3 wt %) in Scalmalloy limits the ability to form weldable wires for WAAM processes. During a wire drawing process, the metal is extruded down from a large diameter billet (diameter about a few inches) to a very fine diameter wire (diameter about fractions of an inch). The metal is strain hardened during the wire drawing process. Annealing treatments may be applied to soften the metal wire. However, Sc has a high melting temperature relative to Al. For Scalmalloy, the annealing treatments may harden the wires instead of softening it, which makes the Scalmalloy wires more brittle and more prone to breaking and surface defects. The concentration of Sc in Scalmalloy is above the eutectic point of Sc and Al, such that Sc in the Scalmalloy can precipitate as a hardening $Al_3Sc$ phase. Accordingly, Sc can form very large precipitate $Al_3Sc$ phases over time, which is not desirable in the wires. In an ideal scenario, Sc phases should be small (on the order of about tens of nanometers in size) and well distributed all throughout the metal. In the Scalmalloy wire-drawing processes, Sc can be at least an order of magnitude greater in size. The $Al_3Sc$ phases in Scalmalloy act as little boulders that essentially get dragged through the wire. Moreover, the $Al_3Sc$ phases may not reverse unless the whole alloy is melted again.

Due to the formation of the hardening phases of Sc during the casting and wire drawing process, Scalmalloy wires exhibit poor wire qualities. The coarse precipitates of Sc rip the wires apart from within and create striations on wire surface that are prone to trapping contaminants and being abraded to create defects on the surfaces and/or inside the wires. FIG. 1A-FIG. 1C illustrate images of defects in Scalmalloy wires. FIG. 1A illustrates an optical image of a Scalmalloy wire. A defect 101 can be seen on the surface of the wire. FIG. 1B illustrates a scanning electron microscope image of a cross section of a Scalmalloy wire. Various defects 102 can be seen in the wire. FIG. 1C illustrates an optical image of a cross section of a Scalmalloy wire. The defect 103 penetrates about 17 μm deep into the outer diameter of the wire.

Figure 2A:
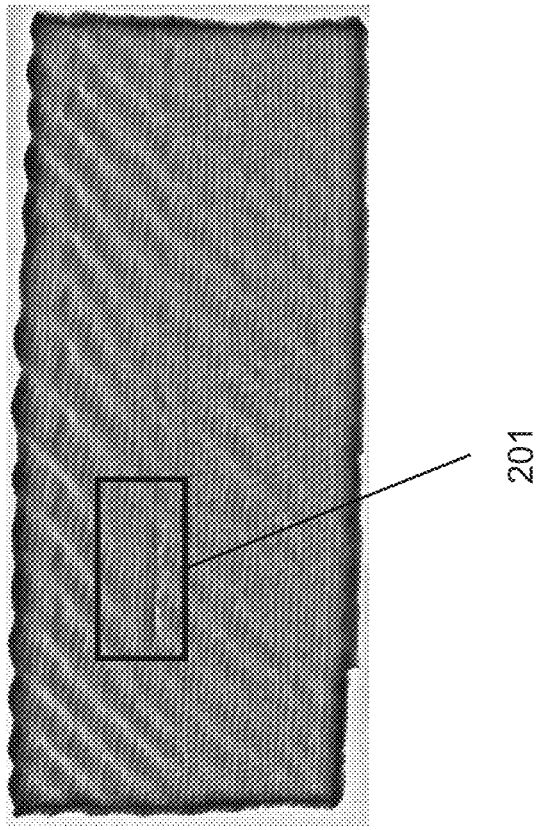

High Sc concentration in Scalmalloy not only results in defects when produced in wire form. The poor wire quality of Scalmalloy wires also result in poor weld qualities. Surface finish with good quality is important for WAAM printed objects. Defects such as gouges, scratches, and/or nicks may result in poor wire qualities, which may start to trap debris such as oils and lubricants, contributing to poor weld quality. FIG. 2A illustrates an object printed with Scalmalloy wires using WAAM processes. In FIG. 2A, the regions 201 show high porosity in the printed material. FIG. 2B illustrates an X-ray scan of an object printed with Scalmalloy wires using WAAM processes. The X-ray scan of the object in FIG. 2B shows high porosity.

Figure 2D:
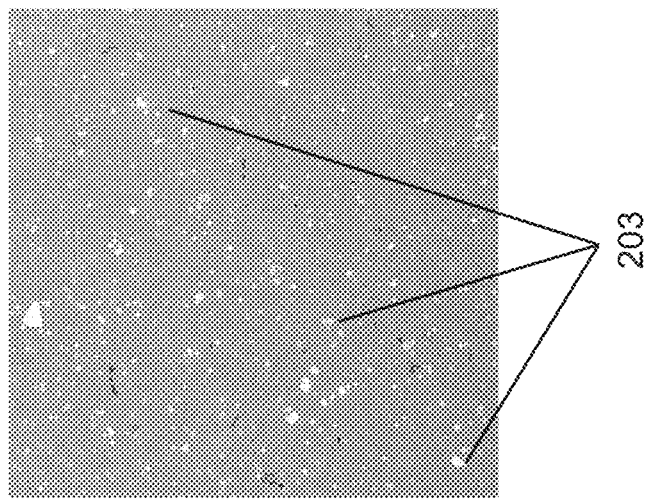
Figure 2C:
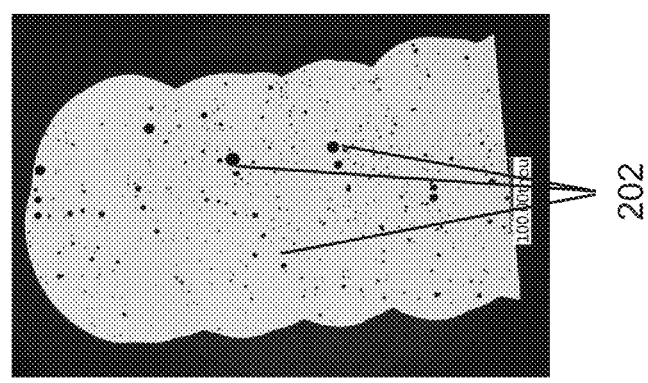

FIG. 2C and FIG. 2D illustrate defects on the cross section of the printed objects with Scalmalloy wires. FIG. 2C illustrates an optical image of a printed surface with Scalmalloy wire. Defects 202 are evident across the surface. FIG. 2D illustrates a scanning electron microscope image of a cross section printed with Scalmalloy wire. Various defects 203 are shown on the cross section. The data taken together shows that conventional Scalmalloy wire results in bad weld quality.

The Sc concentration ranges in the Al—Mg—Sc alloys in accordance with many embodiments are carefully selected to enable: 1) The formation of weldable wires using the Al—Mg—Sc alloys; and 2) Desired print quality using the Al—Mg—Sc alloy wires in WAAM processes. In several embodiments, the Al—Mg—Sc alloys are able to form high quality weldable wires for various WAAM processes (more on Al—Mg—Sc wire qualities are discussed further below). The Sc content is selected so that under conditions of crystallization corresponding to continuous casting of Al alloy ingots, a large portion of the Sc is found in solid solution. In subsequent production heating, the solid solution containing Sc may decompose with formation of secondary particles of $Al_3Sc$. The formation of the secondary $Al_3Sc$ particles is at an optimum degree of dispersion, providing a sharp increase in recrystallization temperature and strengthening of the alloy. The smaller portion of Sc may need to be precipitated in crystallization in the form of primary $Al_3Sc$ particles and modify the as-cast grain structure in the ingot or in the weld joint.

Figure 3C:
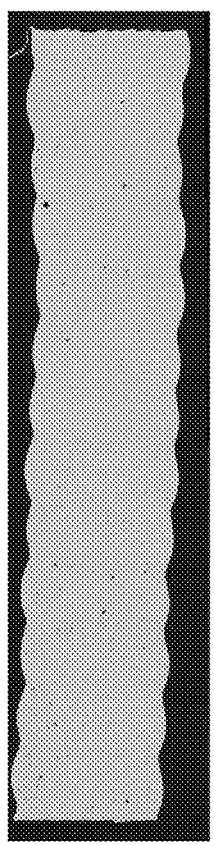
FIGS. 3C-3D illustrate good print quality using Al—Mg—Sc wires in accordance with an embodiment of the invention.
Figure 3D:
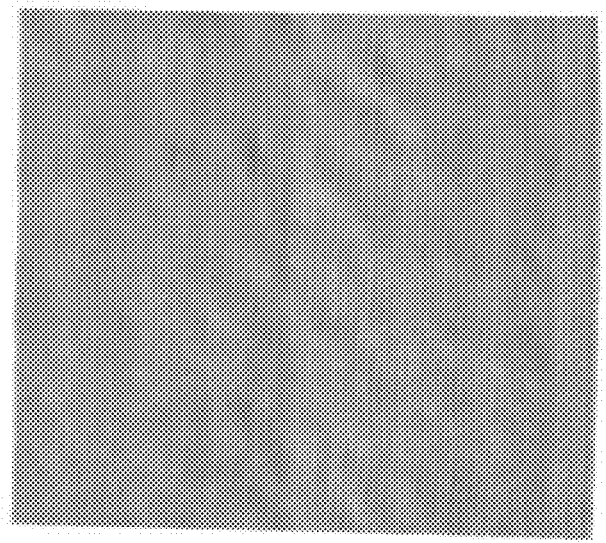
Figure 3A:
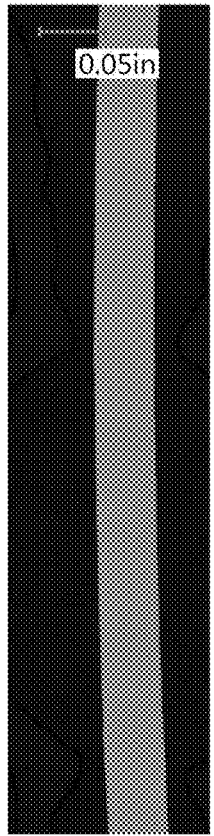
FIGS. 3A-3B illustrate images of Al—Mg—Sc wires in accordance with an embodiment of the invention.
Figure 3B:
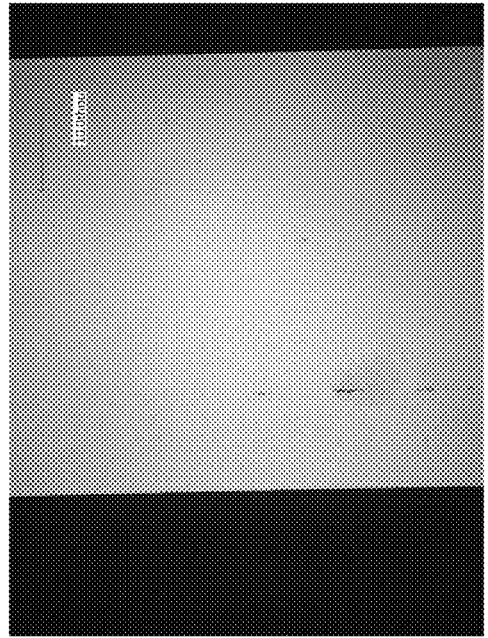

An example Al—Mg—Sc alloy in accordance with many embodiments can be formed into weldable wires with much fewer surface defects compared to the Scalmalloy wires. The good qualities of Al—Mg—Sc wires enable good and consistent print qualities when used in WAAM processes. FIG. 3A and FIG. 3B illustrate optical microscope images of Al—Mg—Sc wires in accordance with an embodiment of the invention. FIG. 3A and FIG. 3B show a cross section of a wire with smooth surface and few defects. FIG. 3C illustrates a microscope image of a WAAM printed object using Al—Mg—Sc wires in accordance with an embodiment. FIG. 3D illustrates an X-ray scan of a WAAM printed object using Al—Mg—Sc wires in accordance with an embodiment. The Al—Mg—Sc wires enable a consistent print quality as shown in FIG. 3D. Compared to Scalmalloy wires, the example Al—Mg—Sc wires have better wire qualities and enable a consistent quality build.

While various concentration ranges of Sc in weldable and high strength Al—Mg—Sc alloys for additive manufacturing are described above with reference to FIG. 1, FIGS. 2A-2C, and FIGS. 3A-3D, any of a variety of Sc concentrations can be utilized in Al—Mg—Sc alloys as appropriate to the requirements of specific applications in accordance with various embodiments of the invention. Systems for Mg in Al—Mg—Sc alloys in accordance with various embodiments of the invention are discussed further below.

Magnesium of the Al—Mg—Sc Alloys

In many embodiments, magnesium (Mg) has a concentration from about 4.1 wt % to about 5.6 wt % in the Al—Mg—Sc alloys. Mg in the alloys can increase strength and corrosion resistance properties over the alloys without Mg. Mg can maintain an appreciable contribution to strength via solid solution strengthening, and also prevent falling into a chemistry range that makes the alloy susceptible to hot cracking during welding solidification. The inventors realized that Mg is an effective solid solution strengthening element of the Al alloying elements. The majority of the 5XXX base alloys, which contain around 5 wt % Mg, show low hot crack sensitivity. Adding Mg can provide a weld with good hot crack resistance and a solidification temperature a little lower than the base alloy. In many embodiments, Mg concentration is greater than about 3 wt % to keep a low probability of hot cracking during weld solidification. In several embodiments, Mg concentration is greater than about 4.1 wt %.

Several embodiments provide that Mg concentration is kept lower than about 5.6 wt %. The inventors realized that, if Mg concentration is too high, it would be difficult to draw good wire products. They further realized that high Mg concentration may also make sensitization problems harder to compensate for and may result in poor print quality (the effect of high Mg concentration on degree of desensitization is discussed further below). In addition, Mg has a low boiling point. A high Mg concentration in the alloy may result in Mg boiling off during welding and redepositing as magnesium oxide inclusions.

Table 2 lists elemental compositions of an alloy with Mg concentration higher than 6 wt % and the example Al—Mg—Sc alloy in accordance with several embodiments. The high Mg alloy has a higher Mg concentration and no Zr, compared to the example alloy, while other element concentration ranges are overlapping.

TABLE 2

Alloy compositions in % by weight.

| Elements | High Mg alloy | Example alloy |
| --- | --- | --- |
| Mg | 6.5 | 4.1-5.6 |
| Sc | 0.3 | 0.23-0.37 |
| Zr | n/a | 0.11-0.19 |
| Mn | 0.7 | 0.1-1.0 |
| Zn | n/a | ≤0.1 |
| Ti | 0.125 | ≤0.1 |
| Cu | n/a | ≤0.1 |
| Si | ≤0.1 | ≤0.1 |
| Fe | n/a | ≤0.1 |
| Al | Balance | Balance |

Figure 4B:
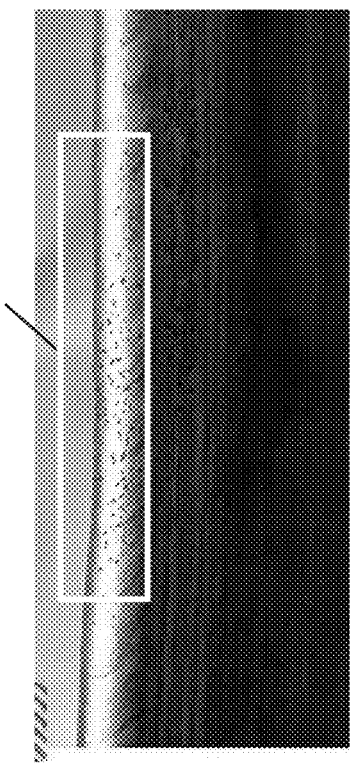
FIGS. 4A-FIG. 4D illustrate defects on wires and printed objects with a high Mg alloy.
Figure 4D:
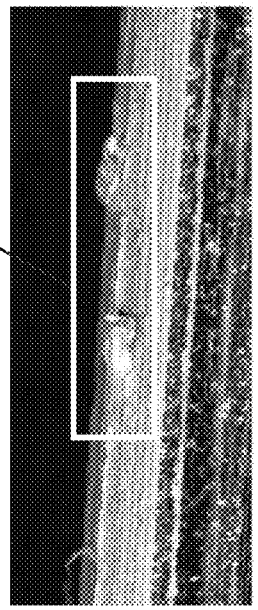
Figure 4A:
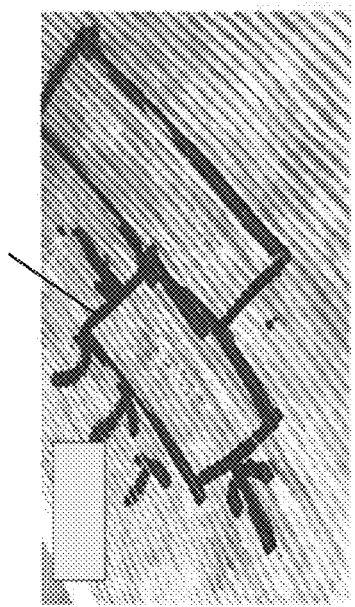
Figure 4C:
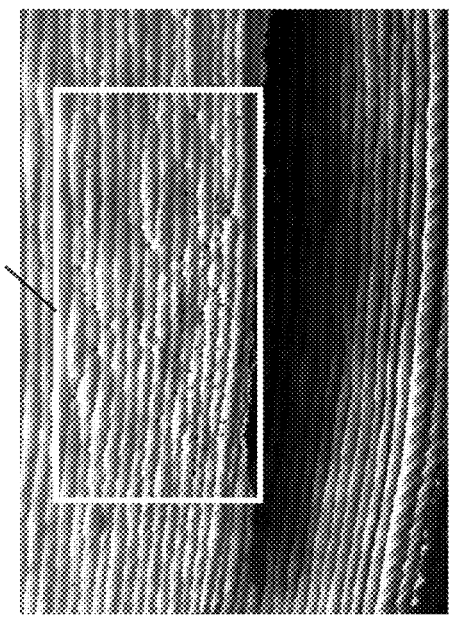

Many embodiments include the inventive realization that the high Mg concentration in Al alloys can cause deformations in wires and/or poor print qualities. FIGS. 4A-4D illustrate images of wires and printed objects of the high Mg alloy in accordance with an embodiment of the invention. FIGS. 4A-4D show defects on the wire surface as well as the printed objects due to the high Mg concentration. FIG. 4A shows defects 401 on the surface of the printed object. FIG. 4B shows significant chips and/or debris 402 on the printed object. FIG. 4C shows pores and uneven surfaces 403 on the printed object. FIG. 4D shows defects 404 on the wire surface. In contrast to the high Mg alloys, the Al—Mg—Sc alloys with lower Mg concentration enable better wire quality and print quality as shown in FIGS. 3A-3D.

While various concentration ranges of Mg in weldable and high strength Al—Mg—Sc alloys for additive manufacturing are described above with reference to FIGS. 4A-4D, any of a variety of Mg concentrations can be utilized in Al—Mg—Sc alloys as appropriate to the requirements of specific applications in accordance with various embodiments of the invention. Systems for Zr in Al—Mg—Sc alloys in accordance with various embodiments of the invention are discussed further below.

Zirconium of the Al—Mg—Sc Alloys

Many embodiments include the inventive realization that zirconium (Zr) should be added to the Al—Mg—Sc alloys together with Sc. Several embodiments keep a ratio of Zr to Sc less than or equal to about 0.63, and greater than or equal to about 0.33, when determined according to the formula: [Zr wt %/Sc wt %], to strengthen the positive qualities of Sc. As can readily be appreciated, any of a variety of Zr to Sc weight percentage ratio between about 0.33 wt % and about 0.63 wt % can be utilized in the alloys as appropriate to the requirements of a specific application.

Zr can dissolve in the $Al_3Sc$ phase to preserve the positive qualities of $Al_3Sc$. Several embodiments use a lower content of Sc to have a strong modifying effect when Zr is present. In the presence of Zr, a non-dendritic structure can be formed with a Sc content as low as 0.2 wt %. In comparison, more than 0.5 wt % Sc may be needed to obtain a non-dendritic structure without Zr. The synergistic interaction between Sc and Zr is effective in inhibiting recrystallization through the formation of extremely fine $Al_3(Zr_xSc_{1-x})$ particles. These particles are less prone to coagulation compared to $Al_3Sc$ particles. In addition, Zr makes it possible to increase the temperature and time of production heating without decreasing the positive effects of Sc. $Al_3(Zr_xSc_{1-x})$ is an Al-Sc-base substitutional solid solution in which Sc is replaced by Zr, which is close to it in nature. So, the type of lattice is preserved and the lattice parameter changes little. Zr may replace up to half of Sc (x=0.5). Therefore $Al_3(Zr_xSc_{1-x})$ is a phase of variable composition. Depending upon the quantity of Zr dissolved, the properties of this phase may change, particularly the thermal stability of the particles of the phase and their tendency toward coagulation in high-temperature heating.

From the perspective of manufacturing, the content of Zr in Al alloys should be carefully controlled. The solubility limit of Zr is reached at very low concentrations by weight. Utilizing standard commercial manufacturing methods (where cooling or solidification rates are on the order of $10^0$-$10^1$ K/s) the solubility limit is observed to be about 0.3 wt %.

Zr in the Al—Mg—Sc alloys in accordance with many embodiments can prevent coarsening of the Sc—Al hardening phase during the heat treatment (heat treatment of the Al—Mg—Sc alloys is discussed further below). Zr can make heat treat easier for industrial scale additively manufactured structures. The hardening phases of Al precipitate in the alloy during the aging process. If the hardening phases of Al can be controlled in an optimal size range distribution throughout, the alloy may achieve good mechanical strength. If the sizes of the hardening phases grow out of the optimal range, the hardening phases will be less well dispersed so that the alloy may become softer over time, also known as overage the material. An overaged alloy may lose mechanical strength and/or ductility due to the large sizes of the hardening phases. In at least one embodiment, a large structure, e.g., having a dimension of at least about 6, 10, or 18 feet, can be placed inside a furnace so that the entirety of the large structure is subjected to a heat treatment simultaneously. The addition of Zr to the Al—Mg—Sc alloys can prevent coarsening and brings flexibility during the heat treatment of large structures (e.g. at least 20 feet in one dimension).

While various concentration ranges of Sc, Mg, and Zr, in weldable and high strength Al—Mg—Sc alloys for additive manufacturing are described above, any of a variety of elemental concentrations can be utilized in Al—Mg—Sc alloys as appropriate to the requirements of specific applications in accordance with various embodiments of the invention. Systems and methods for welding wires comprising Al—Mg—Sc alloys in accordance with various embodiments of the invention are discussed further below.

Al—Mg—Sc Alloy Wires

Many embodiments provide a spooled wire comprising and/or consisting essentially of the Al—Mg—Sc alloy compositions. In several embodiments, articles, objects, and/or structures comprising and/or consisting essentially of the Al—Mg—Sc alloy compositions can be produced with various WAAM techniques using the spooled wires.

In several embodiments, the Al—Mg—Sc alloy composition can be formed into and/or is physically present as a wire, e.g., a welding wire suitable for use in additive manufacturing. In many embodiments, the wires can have an average diameter of less than or equal to about 2 mm; or less than or equal to about 1.8 mm; or less than or equal to about 1.6 mm; or less than or equal to about 1.4 mm; or less than or equal to about 1.2 mm; or less than or equal to about 1.0 mm. As can readily be appreciated, any of a variety of wire diameters can be formed for the Al—Mg—Sc weldable wires which can be used for additive manufacturing as appropriate to the requirements of a specific application.

Figure 5:
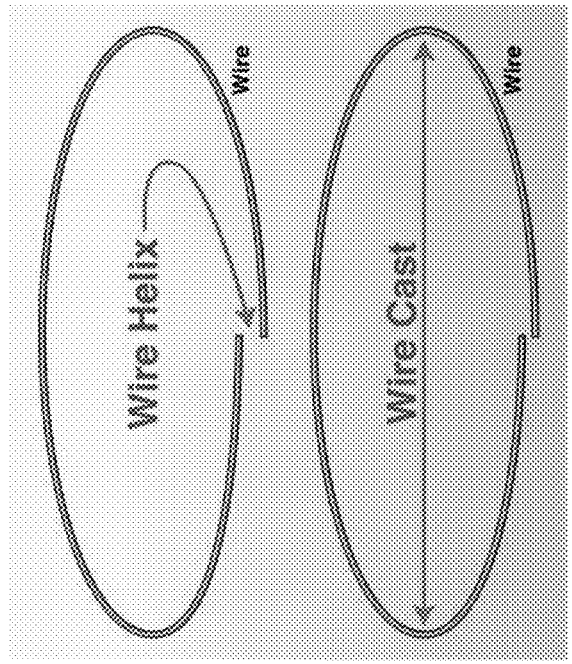
FIG. 5 illustrates the wire cast and the wire helix of a spooled wire.

In some embodiments, the wires formed from the Al—Mg—Sc alloy composition can have a spooling cast from about 25 to 50 cm, and/or a spooling helix of less than or equal to 0.1 of the spooling cast, when determined according to AWS A5.10, or an equivalent thereof. As can readily be appreciated, any of a variety of spooling cast and/or helix of the Al—Mg—Sc alloy wires for additive manufacturing can be selected as appropriate to the requirements of a specific application. The spooled wire may refer to a wire capable of winding around a spool. Wire cast and wire helix are the two variables that can affect wire delivery. FIG. 5 illustrates the wire cast and the wire helix. The wire helix can be defined as the rise of a single strand of wire when placed on a flat surface (how high the wire springs off the floor). This is measured vertically for aluminum wire. Cast stands for the diameter of the circle the wire forms when it is cut from a wound spool and laid on a flat surface. Cast is the diameter of the wire when it is removed from the spool, while the helix is the vertical height from the flat surface. The wire cast may vary based on the wire packaging and the amount of wire remaining. Methodologies for determining cast and helix are outlined and determined according to the American Welding Society.

Many embodiments keep the wire cast in a range between about 25 cm to about 50 cm. A tighter cast, such as when the wire is down to the inner portion of a spool, can create a smaller contact area between the contact tip and the surface of the wire, causing potential current transfer issues as well as excessive contact tip wear and arc wander. A larger radius cast can cause intermittent arcs due to poor contact with the inner diameter of the contact tip.

Several embodiments keep the wire helix of less than or equal to 0.1 of the spooling cast. Wire helix can be a problem if it is inconsistent, which can cause tracking issues along the weld seam. Ideally, the wire cast and helix should remain consistent throughout the life of the wire package. A poor cast and helix can cause the wire to twist and spin out of the contact tip at varying degrees.

In some embodiments, the composition may be produced by melting of a mixture comprising the various components, and is not particularly restricted and can take place in any suitable manner. In certain embodiments, a wire comprising or consisting essentially of, or consisting of the composition may be produced according to wire drawing processes. The production of the wire is not particularly restricted and can comprise conventional processes, for example formation of a power or granule (e.g., via melt spinning and spray drying) and pressing the powder into a bar or ingot, followed by drawing the wire, or compacting in a casing, followed by wire drawing. According to specific embodiments, the production of the wire may take place by means of pressing and drawing into a wire, the process parameters such as the pressure during the pressing, the drawing speed during the wire drawing, and the like, not being particularly restricted and being able to be suitably adjusted.

Many embodiments provide that the wire can have any desired length and thickness (cross section) as well as any desired cross-sectional shape. For example, in the transverse direction, the wire can have a round cross section, but also an angular cross section, a cross section comprising three or more sides, or and/or the like.

In many embodiments, the wire can have a thickness which allows for cooling of the composition after forming of the wire at cooling rates effective to produce the composition. For examples, at cooling rates of greater than or equal to about 10° C./second, or greater than or equal to about 100° C./second, or greater than or equal to about 1000° C./second.

In several embodiments, when determined in a transverse direction, the wire can have an average diameter (in the case of a round cross section) or a maximum sectional length in the transverse direction (for example from corner to corner or edge to edge) of greater than or equal to about 0.8 mm, or greater than or equal to about 1 mm, or greater than or equal to about 1.5 mm, and less than or equal to about 2.5 mm, or less than or equal to about 2 mm.

Al—Mg—Sc alloy wires in accordance with many embodiments have suitable properties for additive manufacturing including (but not limited to) various WAAM processes. In several embodiments, wires comprising and/or consisting essentially of the Al—Mg—Sc alloy compositions have desired welding wire properties when determined according to AWS A5.10, or an equivalent thereof. Wire properties including (but not limited to): geometries, surface finish, porosity, defects, and/or mechanical properties, satisfy the criteria of welding wires when determined according to AWS A5.10, or any equivalent thereof. In various embodiments, wires comprising and/or consisting essentially of the Al—Mg—Sc alloy compositions have an average yield strength of about 65 MPa, with a confidence interval of about 95%.

In many embodiments, the wires formed from the composition are used in various WAAM processes including (but not limited to) gas metal arc welding based WAAM, gas tungsten arc welding based WAAM, plasma arc welding based WAAM, and any combinations thereof. As can readily be appreciated, any of a variety of WAAM processes can be utilized in the formation of articles comprising Al—Mg—Sc alloys as appropriate to the requirements of a specific application. The WAAM processes can print industrial scale structures and/or objects using the wires in accordance with some embodiments. Examples of WAAM printed objects include (but are not limited to): objects for aerospace applications, rockets, various parts of rockets, barrels, tanks, and domes. In certain embodiments, at least a portion of the printed object has a height at least 1000 times greater than a thickness of the same portion of the object. In some embodiments, the printed objects for aerospace application can have at least one dimension of at least 15 feet; of at least 16 feet; of at least 18 feet; of at least 20 feet; of at 22 feet; of at least 24 feet; of at least 26 feet; of at least 30 feet; of at least 40 feet; of at least 50 feet; of at least 100 feet; of at least 200 feet. The WAAM printed objects in accordance with some embodiments can have at least one component with a shape of a rectangular, square, cylinder, circle, eclipse, dome, triangle, polygon, pentagon, hexagon, octagon, cube, sphere, hemisphere, cone, pyramid, and any combinations thereof. In several embodiments, the printed objects can have a cylindrical shape with a diameter of at least 24 feet and a length of at least 200 feet. The WAAM printed objects can be processed after printing to acquire desired characteristics including (but not limited to) mechanical properties and corrosion resistant properties.

In some embodiments, the WAAM printed objects can have a thickness between about 0.05 inch and about 0.5 inch; or a thickness of about 0.10 inch; or a thickness of about 0.12 inch; or a thickness of about 0.135 inch; or a thickness of about 0.15 inch; or a thickness of about 0.19 inch; or a thickness of about 0.275 inch; or a thickness of about 0.375 inch; or a thickness of about 0.385 inch; or a thickness of about 0.50 inch. In many embodiments, the WAAM printed objects can have a thickness greater than about 0.5 inch. As can readily be appreciated, any of a variety of thickness can be formed using Al—Mg—Sc weldable wires with WAAM processes as appropriate to the requirements of a specific application.

Al—Mg—Sc Alloy Heat Treatment

Many embodiments apply heat treatments including (but not limited to) T5 heat treatments to WAAM printed objects. The heat treatments may be a heat aging process. In several embodiments, the heat treatment can be carried out in ambient environment in air. In certain embodiments, the heat treatment can be carried out in inert gas. The T5 heat treatment can include a process in which an article is heated at a temperature at least 275° C. and less than a melting point of the article for a period of less than or equal to about 12 hours. For purposes herein, it is to be understood that an article subjected to T5 heat treatment is heated in a single event, and is not subjected to multiple heat treatment steps. Furthermore, it is to be understood that an article subjected to T5 heat treatment is not heated to a temperature consistent with a homogenization heat treatment, which may also be referred to as a solution heat treatment, or the like.

In many embodiments, a maximum temperature of the T5 heat treatment utilized to produce an article comprising the composition is less than or equal to about 335° C. (635° F.). In some embodiments, a maximum temperature of the T5 heat treatment utilized to produce an article comprising the composition is less than or equal to about 333° C. (631° F.), or less than or equal to about 331° C. (627° F.), or less than or equal to about 326° C. (618° F.). A minimum temperature of the T5 heat treatment utilized to produce an article comprising the composition may be greater than or equal to about 275° C. (527° F.), or greater than or equal to about 280° C. (536° F.), greater than or equal to about 285° C. (545° F.), or greater than or equal to about 290° C. (554° F.), or greater than or equal to about 295° C. (563° F.), or greater than or equal to about 300° C. (572° F.). As can readily be appreciated, any of a variety of T5 heat treatment temperature can be utilized as appropriate to the requirements of a specific application.

In several embodiments, a maximum time of the T5 heat treatment is greater than or equal to about 10 minutes and less than or equal to about 12 hours. In a number of embodiments, a duration of time of the T5 heat treatment is greater than or equal to about 10 minutes, or greater than or equal to about 30 minutes, or greater than or equal to about 60 minutes, or greater than or equal to about 90 minutes, or greater than or equal to about 2 hours, and less than or equal to about 12 hours, or less than or equal to about 10 hours. As can readily be appreciated, any of a variety of T5 heat treatment time duration can be utilized as appropriate to the requirements of a specific application.

Figures 6A, 6B:
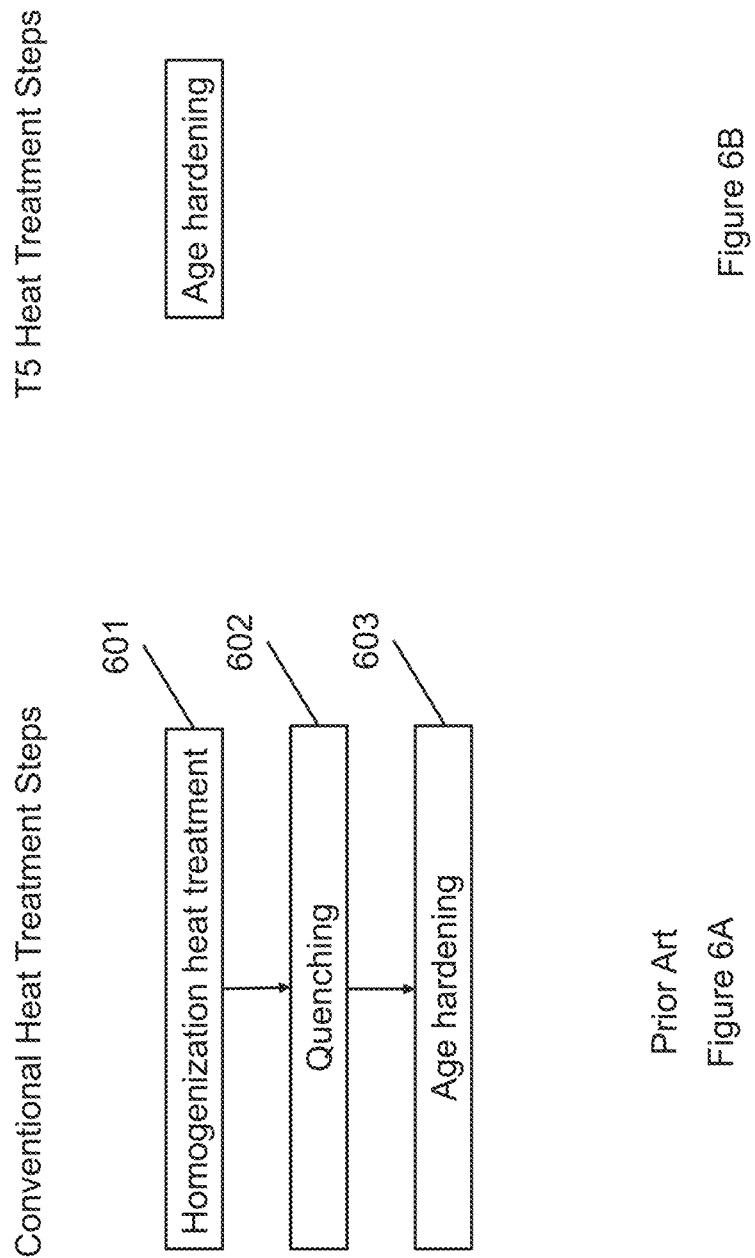
FIG. 6A illustrates conventional heat treatment steps for Al alloys.
FIG. 6B illustrates T5 heat treatment steps for Al—Mg—Sc alloys in accordance with an embodiment of the invention.

Heat treatment can be used to increase mechanical strength of Al alloys. FIG. 6A illustrates a flow chart listing the steps for conventional heat treatment of Al alloys. The conventional heat treatment is typically conducted in a three-step process involving homogenization heat treatment 601 with the goal of dissolution of soluble phases, followed by quenching 602 aimed at development of supersaturation, and finally followed by age hardening 603 in which precipitation of solute atoms either at room temperature (natural aging) or elevated temperature (artificial aging or precipitation heat treatment).

In contrast, T5 heat treatment only involves the third step of this process. FIG. 6B illustrates a flow chart for the T5 heat treatment of Al—Mg—Sc alloys in accordance with an embodiment of the invention. T5 heat treatment in several embodiments includes one step artificial aging or precipitation heat treatment at elevated temperatures. A method of heat treatment for WAAM printed objects in accordance with many embodiments refrains from homogenization heat treatment and/or quenching.

Homogenization heat treating utilizes relatively high temperatures from about 426° C. to about 482° C. (about 800-900° F.), very near the melting point of the alloy. At these temperatures, a solid solution can be formed. Conventionally, solution annealing may be desirable because it takes into solid solution the maximum practical amounts of the soluble hardening elements in the alloy. The process consists of soaking the alloy at a temperature sufficiently high and for a time long enough to achieve a nearly homogeneous solid solution. Nominal commercial homogenization heat treating temperature is determined by the composition limits of the alloy and an allowance for unintentional temperature variations.

Although ranges normally listed allow variations of ±6° C. (±10° F.) from the nominal, some highly alloyed, controlled-toughness, high-strength alloys may need the temperature to be controlled within more restrictive limits. Broader ranges may be allowable for alloys with greater intervals of temperature between their solvus and eutectic melting temperatures. The inventors realized that homogenization heat treating times range from minutes to hours, which may be sufficient to cause issues with certain aerospace structures that render them unusable.

Many embodiments include the inventive realization that homogenization heat treatment may be undesirable for WAAM-printed structures including (but not limited to) the structures for aerospace applications. Aerospace objects including (but not limited to) rockets can be tall and thin, i.e., having a height at least 1000 times greater than a thickness of the same portion of the article. The inventors realized that homogenization heat treatments can result in a tall object collapsing under its own weight so that it cannot be used.

In addition, conventional processes may use homogenization heat treating as a desirable process to allow for controlled release of constituent hardening elements in alloys. In contrast, the alloy compositions in accordance with many embodiments can achieve significant improvements in physical strength, using artificial aging heat treatment alone and refraining from homogenization heat treatment. In several embodiments, the compositions also remove the need for quenching.

While various heat treatment processes for additive manufactured Al—Mg—Sc alloys are described above, any of a variety of heat treatment parameters can be utilized for Al—Mg—Sc alloys as appropriate to the requirements of specific applications in accordance with various embodiments of the invention. Systems and methods for heat treatment that can improve mechanical properties, reduce residual stress, and improve corrosion resistance of the WAAM printed objects and/or structures comprising Al—Mg—Sc alloys in accordance with various embodiments of the invention are discussed further below.

Mechanical Properties

The Al—Mg—Sc alloys in accordance with many embodiments have higher mechanical strength compared to conventional weldable Al alloys such as the 5XXX alloys before and/or after the T5 heat treatment. Before any heat treatment, the as-printed Al—Mg—Sc alloys using the WAAM processes exhibit higher mechanical strength including (but not limited to) yield strength and ultimate tensile strength. The elements including (but not limited to) Mg, Sc, Mn, and Zr in the Al—Mg—Sc alloys improve the mechanical strength of the alloy. In many embodiments, the as-printed Al—Mg—Sc alloys, before the heat treatment, have a yield strength of greater than or equal to about 135 MPa (about 19,580 PSI, or about 19.6 KSI) and less than or equal to about 215 MPa (about 31,183 PSI, or about 31.2 KSI), when determined according to ASTM E8 or an equivalent thereof on a workpiece comprising the composition having a thickness between about 0.05 inch and about 0.5 inch; or a thickness between about 0.05 inch and about 0.375 inch. In several embodiments, the as-printed Al—Mg—Sc alloys, absent of heat treatment, have an ultimate tensile strength of greater than or equal to about 290 MPa (about 42,060 PSI, or about 42.1 KSI) and less than or equal to about 370 MPa (about 53,664 PSI, or about 53.7 KSI), when determined according to ASTM E8 or an equivalent thereof on a workpiece comprising the composition having a thickness between about 0.05 inch and about 0.5 inch; or a thickness between about 0.05 inch and about 0.375 inch.

Table 3 lists elemental compositions of a 5183 Al alloy, a high Mg content Al alloy, and an example Al—Mg—Sc alloy. 5183 Al alloy has similar Mg and Mn concentrations as the example Al—Mg—Sc alloy, but does not have Sc or Zr. The high Mg alloy has a similar Sc concentration as the example Al—Mg—Sc alloy, but has a Mg concentration higher than about 5.6 wt % and does not have Zr.

TABLE 3

Alloy compositions in % by weight.

| Elements | 5183 Al alloy | High Mg alloy | Example alloy |
|---|---|---|---|
| Mg | 4.3-5.2 | 6.5 | 4.1-5.6 |
| Sc | n/a | 0.3 | 0.23-0.37 |
| Zr | n/a | n/a | 0.11-0.19 |
| Mn | 0.5-1.0 | 0.7 | 0.1-1.0 |
| Zn | 0.25 | n/a | ≤0.1 |
| Ti | 0.15 | 0.125 | ≤0.1 |
| Cu | 0.1 | n/a | ≤0.1 |
| Si | 0.4 | ≤0.1 | ≤0.1 |
| Fe | 0.4 | n/a | ≤0.1 |
| Be | 0.0003 | n/a | ≤0.1 |
| Cr | 0.05-0.25 | n/a | ≤0.2 |
| Al | Balance | Balance | Balance |

Figure 7:
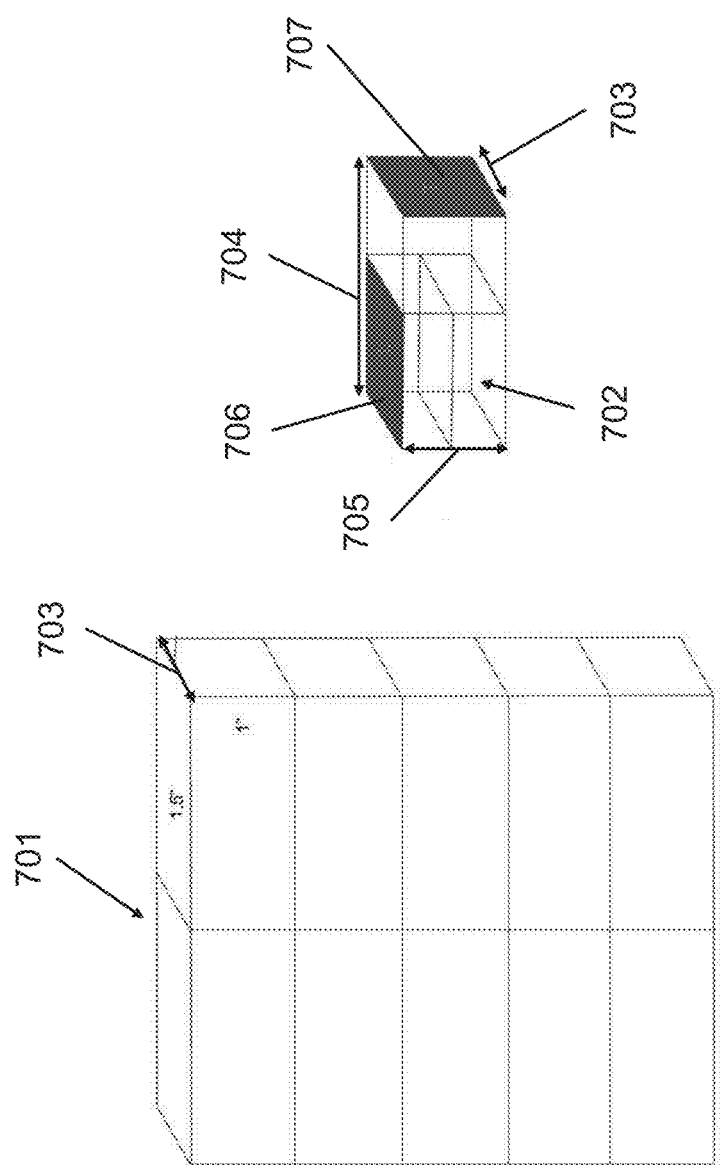
FIG. 7 illustrates the longitudinal direction and the transverse direction in accordance with an embodiment of the invention.

In several embodiments, mechanical properties including (but not limited to) yield strength, ultimate tensile strength, elongation, and elastic modulus, can be measured in longitudinal (hoop) direction and in transverse (axial) direction of the WAAM printed objects. FIG. 7 illustrates the longitudinal direction and the transverse direction in accordance with an embodiment of the invention. 701 shows multiple sections of WAAM printed object. The printed object has a thickness 703 of about 0.500 inches. 702 shows a single section of the multiple sections of the object 701. The single section has a length 704 of about 1.5 inches and a height 705 of about 1 inch. The print thickness 703 is about 0.500 inches. The longitudinal (hoop) direction is shown in 706 and the transverse (axial) direction is shown in 707.

Figure 8:
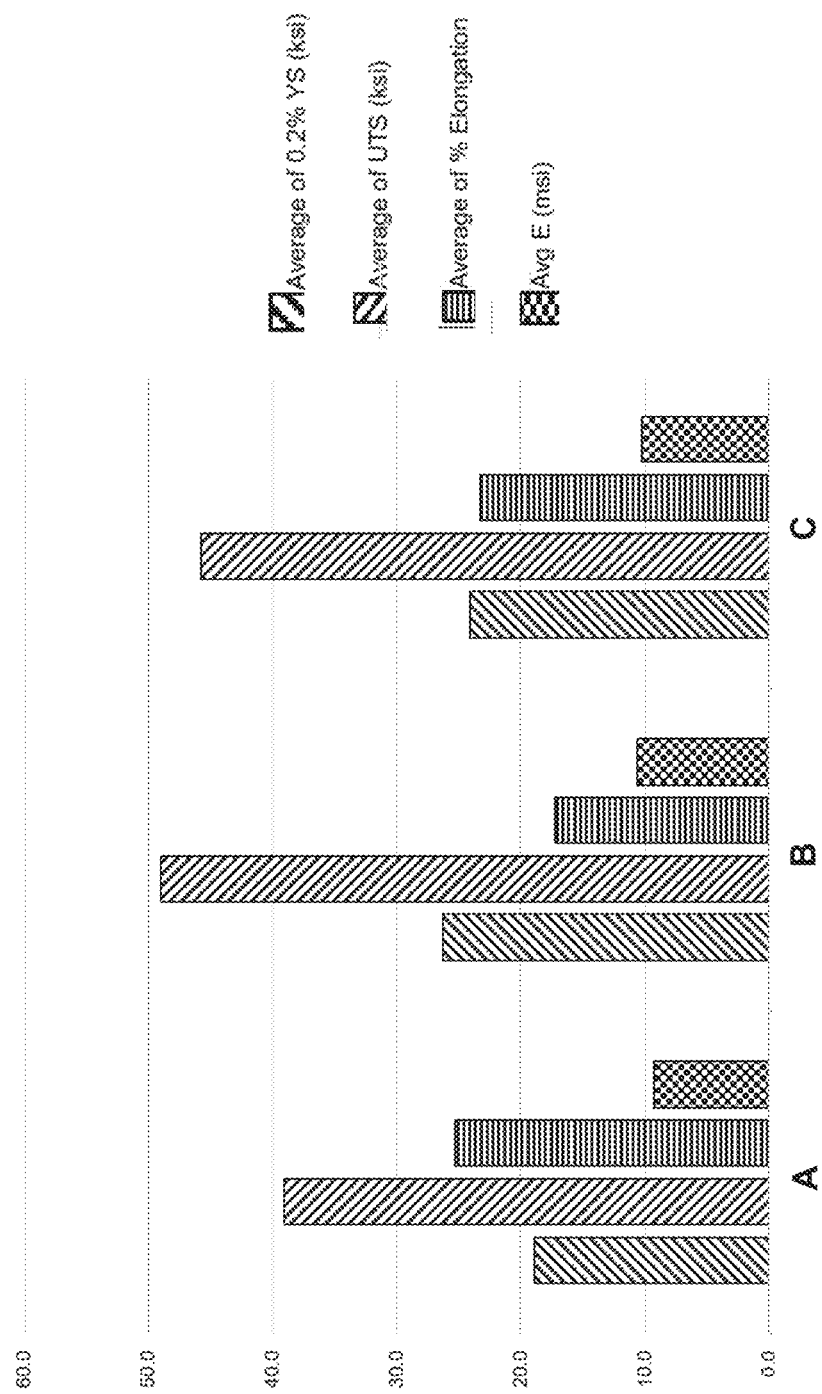
FIG. 8 illustrates mechanical properties in axial direction of the as-printed 5183 Al alloy, the as-printed high Mg alloy, and the as-printed example Al—Mg—Sc alloy in accordance with an embodiment of the invention.

The Al—Mg—Sc alloys in accordance with many embodiments have higher mechanical strength compared to the 5183 Al alloys and the high Mg alloy before and after the T5 heat treatment. FIG. 8 illustrates mechanical properties in axial direction of the as-printed 5183 Al alloy, the as-printed high Mg alloy, and the as-printed example Al—Mg—Sc alloy in accordance with an embodiment. The printed alloys have a thickness of about 0.150 inch. The mechanical properties in FIG. 8 include: average of 0.2% yield strength (YS), average of ultimate tensile strength (UTS), average of % elongation, and average elastic modulus (E). The as-printed alloys refer to WAAM printed alloys without any heat treatment.

Column A of FIG. 8 represents the mechanical properties of the as-printed 5183 Al alloy measured at about 21° C. (70° F.). For the as-printed 5183 Al alloy, the average of 0.2% YS is about 18.9 ksi, the average of UTS is about 39.1 ksi, the average of % elongation is about 25.3%, and the average E is about 9.3 msi.

Column B of FIG. 8 represents the mechanical properties of the as-printed high Mg alloy measured at about 21° C. (70° F.). For the as-printed high Mg alloy, the average of 0.2% YS is about 26.2 ksi, the average of UTS is about 49.0 ksi, the average of % elongation is about 17.3%, and the average E is about 10.6 msi. The high Mg alloy has higher Sc and Mg concentrations compared to the 5183 Al alloy, which contribute to the higher mechanical strength of the high Mg alloy.

Column C of FIG. 8 represents the mechanical properties of the as-printed Al—Mg—Sc alloy measured at about 21° C. (70° F.). For the as-printed Al—Mg—Sc alloy, the average of 0.2% YS is about 24.1 ksi, the average of UTS is about 45.8 ksi, the average of % elongation is about 23.2%, and the average E is about 10.3 msi. The Al—Mg—Sc alloy has higher Sc, Mg, and Zr concentrations compared to the 5183 Al alloy, which contribute to the higher mechanical strength of the Al—Mg—Sc alloy.

Figure 9:
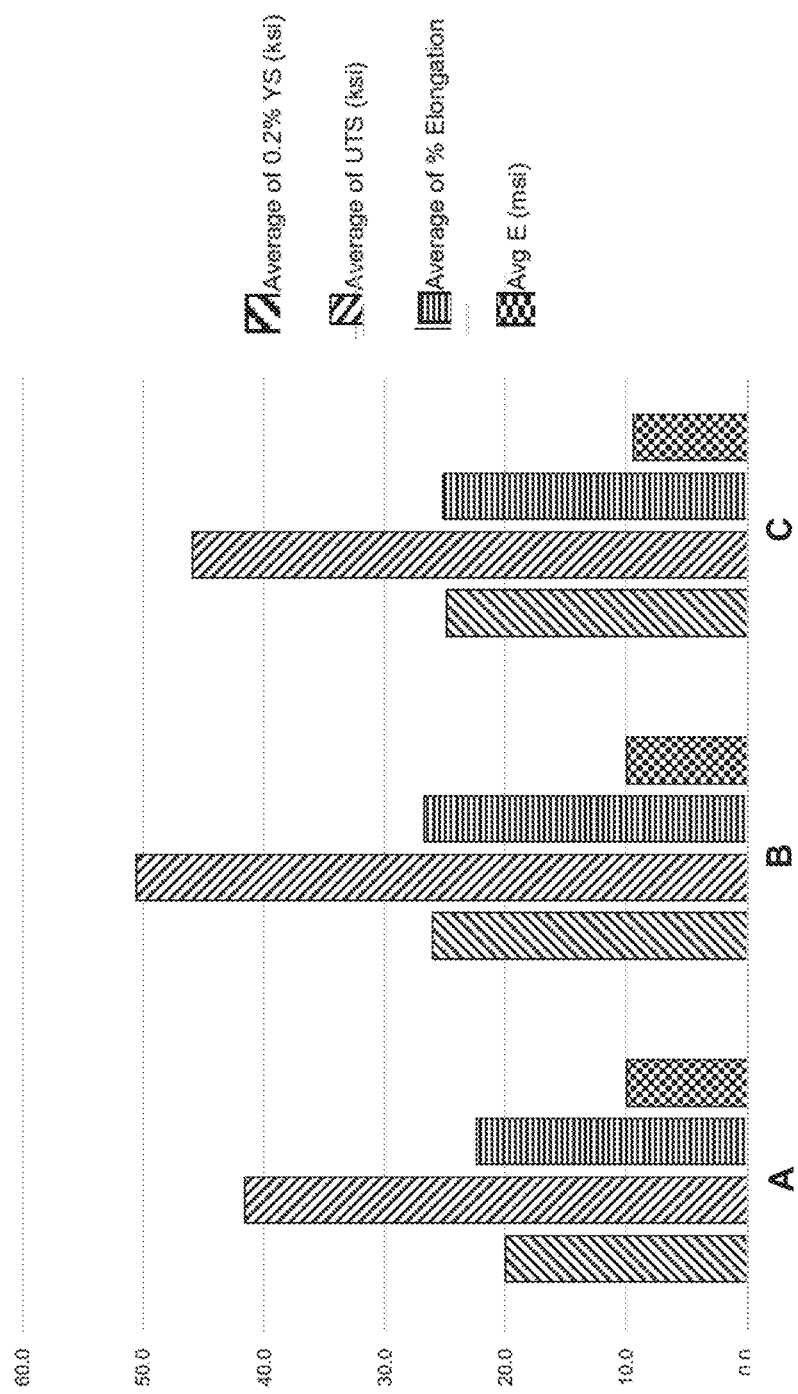
FIG. 9 illustrates mechanical properties in hoop direction of the as-printed 5183 Al alloy, the as-printed high Mg alloy, and the as-printed example Al—Mg—Sc alloy in accordance with an embodiment of the invention.

FIG. 9 illustrates mechanical properties in hoop direction of the as-printed 5183 Al alloy, the as-printed high Mg alloy, and the as-printed example Al—Mg—Sc alloy in accordance with an embodiment. The printed alloys have a thickness of about 0.150 inch. The mechanical properties in FIG. 9 include: average of 0.2% yield strength (YS), average of ultimate tensile strength (UTS), average of % elongation, and average elastic modulus (E). The as-printed alloys refer to WAAM printed alloys without any heat treatment.

Column A of FIG. 9 represents the mechanical properties of the as-printed 5183 Al alloy measured at about 21° C. (70° F.). For the as-printed 5183 Al alloy, the average of 0.2% YS is about 20.0 ksi, the average of UTS is about 41.6 ksi, the average of % elongation is about 22.4%, and the average E is about 9.9 msi.

Column B of FIG. 9 represents the mechanical properties of the as-printed high Mg alloy measured at about 21° C. (70° F.). For the as-printed high Mg alloy, the average of 0.2% YS is about 26.1 ksi, the average of UTS is about 50.6 ksi, the average of % elongation is about 26.7%, and the average E is about 9.9 msi. The high Mg alloy has higher Sc and Mg concentrations compared to the 5183 Al alloy, which contribute to the higher mechanical strength of the high Mg alloy.

Column C of FIG. 9 represents the mechanical properties of the as-printed Al—Mg—Sc alloy measured at about 21° C. (70° F.). For the as-printed Al—Mg—Sc alloy, the average of 0.2% YS is about 24.9 ksi, the average of UTS is about 45.9 ksi, the average of % elongation is about 25.2%, and the average E is about 9.4 msi. The Al—Mg—Sc alloy has higher Sc, Mg, and Zr concentrations compared to the 5183 Al alloy, which contribute to the higher mechanical strength of the Al—Mg—Sc alloy.

The T5 heat treatment in accordance with some embodiments improve the hardness in axial and hoop directions of the Al—Mg—Sc alloys. Table 4 lists hardness of two WAAM printed Al—Mg—Sc alloy samples before and after the T5 heat treatment. One sample has a thickness of about 0.15 inch and the other sample has a thickness of about 0.5 inch. The T5 heat treatment greatly improves the hardness of Al—Mg—Sc alloy samples in both the axial and the hoop directions.

TABLE 4

| | Hardness of Al-Mg-Sc alloys. | | | |
|---|---|---|---|---|
| | Hardness in axial direction (HV) | | Hardness in hoop direction (HV) | |
| Thickness | As printed | T5 heat treat | As printed | T5 heat treat |
| 0.15" sample | 85-90 | 115-125 | 85-90 | 115-125 |
| 0.5" sample | 95 | 105-110 | 95-100 | 105-110 |

In many embodiments, after T5 heat treatment, and in the absence of a homogenization heat treatment, the composition has a yield strength of greater than or equal to about 200 MPa (about 29,000 PSI, or about 29 KSI) and a tensile strength of greater than or equal to about 280 MPa (about 40,600 PSI, or about 40.6 KSI) when determined according to ASTM E8 or an equivalent thereof on a workpiece comprising the composition having a thickness between about 0.05 inch and about 0.5 inch; or a thickness between about 0.05 inch and about 0.375 inch.

The T5 heat treatment in accordance with many embodiments enable the Al—Mg—Sc alloys and/or the WAAM printed objects comprising the Al—Mg—Sc alloys to have a yield strength of greater than or equal to about 200 MPa (about 29,000 PSI, or about 29 KSI), or greater than or equal to about 210 MPa (about 30,000 PSI, or about 30 KSI), or greater than or equal to about 220 MPa (about 32,000 PSI, or about 32 KSI), or greater than or equal to about 230 MPa (about 33,000 PSI, or about 33 KSI), or greater than or equal to about 240 MPa (about 35,000 PSI, or about 35 KSI), or greater than or equal to about 250 MPa (about 36,000 PSI, or about 36 KSI), or greater than or equal to about 260 MPa (about 38,000 PSI, or about 38 KSI), or greater than or equal to about 270 MPa (about 39,000 PSI, or about 39 KSI), or greater than or equal to about 280 MPa (about 41,000 PSI, or about 41 KSI), or greater than or equal to about 290 MPa (about 42,000 PSI, or about 42 KSI), or greater than or equal to about 300 MPa (about 44,000 PSI, or about 44 KSI), or greater than or equal to about 345 MPa (about 50,000 PSI, or about 55 KSI), or greater than or equal to about 200 MPa and less than or equal to about 295 MPa, when determined according to ASTM E8 or an equivalent thereof. In certain embodiments, the T5 heat treatment does not include the homogenization heat treatment.

In several embodiments, after T5 heat treatment, in the absence of homogenization heat treatment, the yield strength of the Al—Mg—Sc alloys and/or the WAAM printed objects comprising the Al—Mg—Sc alloys increases by greater than or equal to about 10%, or greater than or equal to about 20%, or greater than or equal to about 30%, or greater than or equal to about 40%, or greater than or equal to about 50%, or greater than or equal to about 60%, determined by dividing the yield strength before heat treatment by the yield strength after the heat treatment and multiplying by 100.

The T5 heat treatment in accordance with several embodiments enable the Al—Mg—Sc alloys and/or the WAAM printed objects comprising the Al—Mg—Sc alloys to have a tensile strength of greater than or equal to about 280 MPa (about 41,000 PSI, or about 41 KSI), or greater than or equal to about 300 MPa (about 44,000 PSI, or about 44 KSI), or greater than or equal to about 320 MPa (about 46,000 PSI, or about 46 KSI), or greater than or equal to about 340 MPa (about 44,000 PSI, or about 44 KSI), or greater than or equal to about 355 MPa (about 51,500 PSI, or about 51.5 KSI), or greater than or equal to about 355 MPa and less than or equal to about 420 MPa, or greater than or equal to about 360 MPa (about 52,000 PSI, or about 52 KSI), or greater than or equal to about 380 MPa (about 55,000 PSI, or about 55 KSI), or greater than or equal to about 400 MPa (about 58,000 PSI, or about 58 KSI), or greater than or equal to about 420 MPa (about 61,000 PSI, or about 61 KSI), or greater than or equal to about 440 MPa (about 64,000 PSI, or about 64 KSI), or greater than or equal to about 460 MPa (about 67,000 PSI, or about 67 KSI), or greater than or equal to about 480 MPa (about 70,000 PSI, or about 70 KSI), or greater than or equal to about 500 MPa (about 73,000 PSI, or about 73 KSI), or greater than or equal to about 520 MPa (about 75,000 PSI, or about 75 KSI), when determined according to ASTM E8 or an equivalent thereof. In certain embodiments, the T5 heat treatment does not include the homogenization heat treatment.

In several embodiments, after T5 heat treatment, in the absence of homogenization heat treatment, the tensile strength of the Al—Mg—Sc alloys and/or the WAAM printed objects comprising the Al—Mg—Sc alloys increases by greater than or equal to about 10%, or greater than or equal to about 20%, or greater than or equal to about 30%, or greater than or equal to about 40%, or greater than or equal to about 50%, or greater than or equal to about 60%, determined by dividing the tensile strength before heat treatment by the tensile strength after the heat treatment and multiplying by 100.

Figure 10:
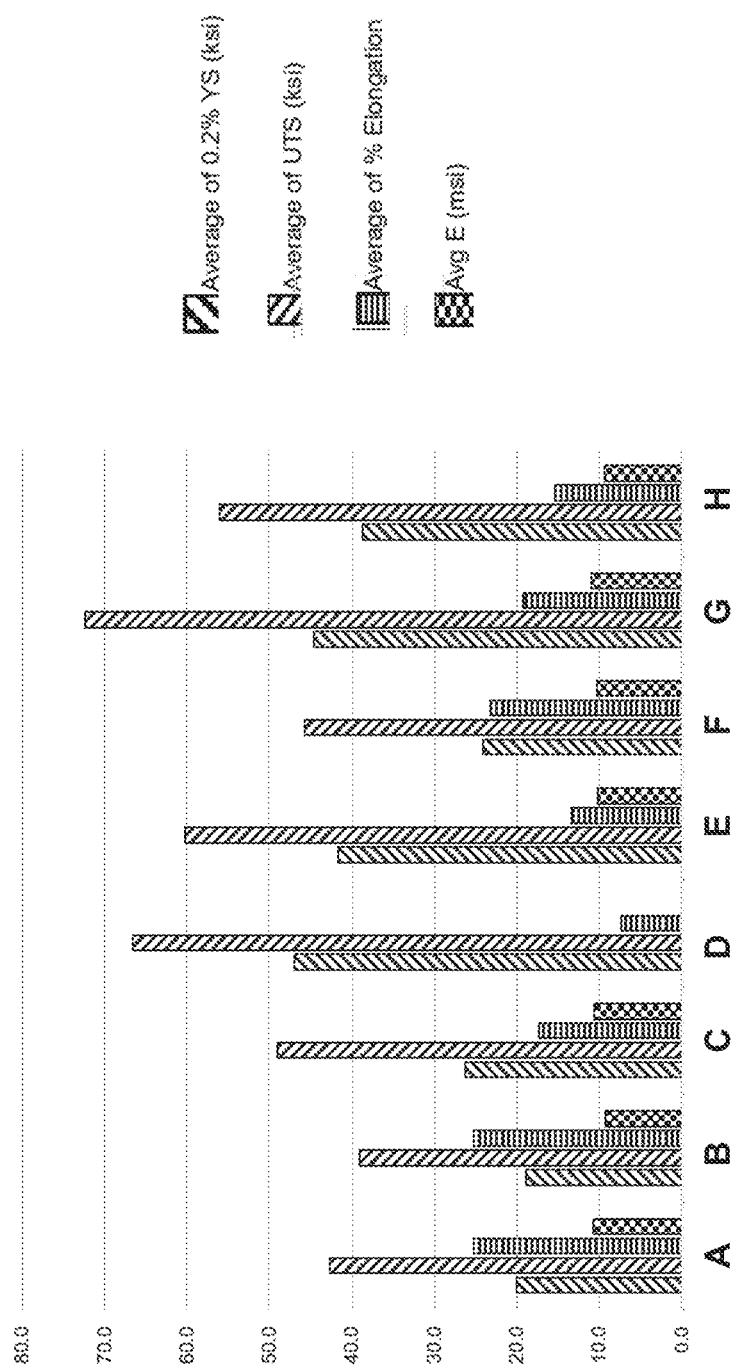
FIG. 10 illustrates mechanical properties in axial direction of the 5183 Al alloy, the high Mg alloy, and the example Al—Mg—Sc alloy before and after the T5 heat treatment in accordance with an embodiment of the invention.

Heat treatment for weldable Al alloys such as the 5XXX alloys normally use homogenization heat treating as a desirable process to allow for controlled release of constituent hardening elements in the alloys. The Al—Mg—Sc alloy heat treatment processes in accordance with some embodiments use artificial aging heat treatment alone and refrain from homogenization heat treatment. The Al—Mg—Sc alloy heat treatment may not improve the physical strength of Al alloys of different compositions. FIG. 10 illustrates mechanical properties in axial direction of the 5183 Al alloy, the high Mg alloy, and the example Al—Mg—Sc alloy before and after the T5 heat treatment in accordance with an embodiment. The printed alloys have a thickness of about 0.150 inch. The mechanical properties in FIG. 10 include: average of 0.2% yield strength (YS), average of ultimate tensile strength (UTS), average of % elongation, and average elastic modulus (E). The as-printed alloys in FIG. 10 refer to WAAM printed alloys without any heat treatment or post treatment. Heat treatment for the alloys refer to the T5 heat treatment in accordance with several embodiments, and are in the absence of homogenization heat treatment.

Column A of FIG. 10 represents 5183 Al alloy after the heat treatment, and the mechanical properties are measured at about 21° C. (70° F.). For T5 heat treated 5183 Al alloy, the average of 0.2% YS is about 20.1 ksi, the average of UTS is about 42.6 ksi, the average of % elongation is about 25.2%, and the average E is about 10.7 msi. Column B of FIG. 10 represents as-printed 5183 Al alloy, and the mechanical properties are measured at about 21° C. (70° F.). For as printed 5183 Al alloy, the average of 0.2% YS is about 18.9 ksi, the average of UTS is about 39.1 ksi, the average of % elongation is about 25.3%, and the average E is about 9.3 msi. The as-printed 5183 Al alloy and the T5 heat treated 5183 Al alloy have comparable mechanical properties in the axial direction, and the T5 heat treatment does not improve the mechanical properties of the 5183 Al alloy by much.

Column C of FIG. 10 represents as printed high Mg alloy, and the mechanical properties are measured at about 21° C. (70° F.). For as-printed high Mg alloy, the average of 0.2% YS is about 26.2 ksi, the average of UTS is about 49.0 ksi, the average of % elongation is about 17.3%, and the average E is about 10.6 msi. Column D of FIG. 10 represents high Mg alloy after the T5 heat treatment, and the mechanical properties are measured at about −196° C. (−320° F.). For T5 heat treated high Mg alloy, the average of 0.2% YS is about 47.0 ksi, the average of UTS is about 66.6 ksi, and the average of % elongation is about 7.3%. Column E of FIG. 10 represents high Mg alloy after the T5 heat treatment, and the mechanical properties are measured at about 21° C. (70° F.). For heat treated high Mg alloy, the average of 0.2% YS is about 41.7 ksi, the average of UTS is about 60.2 ksi, the average of % elongation is about 13.3%, and the average E is about 10.2 msi. The T5 heat treatment greatly improves the yield strength and the tensile strength of the high Mg alloy in the axial direction, while elongation does not improve much.

Column F of FIG. 10 represents as printed Al—Mg—Sc example alloy, and the mechanical properties are measured at about 21° C. (70° F.). For as-printed Al—Mg—Sc example alloy, the average of 0.2% YS is about 24.1 ksi, the average of UTS is about 45.8 ksi, the average of % elongation is about 23.2%, and the average E is about 10.3 msi. Column G of FIG. 10 represents Al—Mg—Sc example alloy after the T5 heat treatment, and the mechanical properties are measured at about −196° C. (−320° F.). For heat treated Al—Mg—Sc example alloy, the average of 0.2% YS is about 44.7 ksi, the average of UTS is about 72.4 ksi, the average of % elongation is about 19.2%, and the average E is about 11.0 msi Column H of FIG. 10 represents Al—Mg—Sc example alloy after the T5 heat treatment, and the mechanical properties are measured at about 21° C. (70° F.). For heat treated Al—Mg—Sc example alloy, the average of 0.2% YS is about 38.7 ksi, the average of UTS is about 56.1 ksi, the average of % elongation is about 15.4%, and the average E is about 9.4 msi. The T5 heat treatment of the Al—Mg—Sc example alloy greatly improves the yield strength and the tensile strength in the axial direction of the alloy, while elongation and the elastic modulus do not improve much. The T5 heat-treated Al—Mg—Sc example alloy has the highest UTS when measured at about −196° C.

Figure 11:
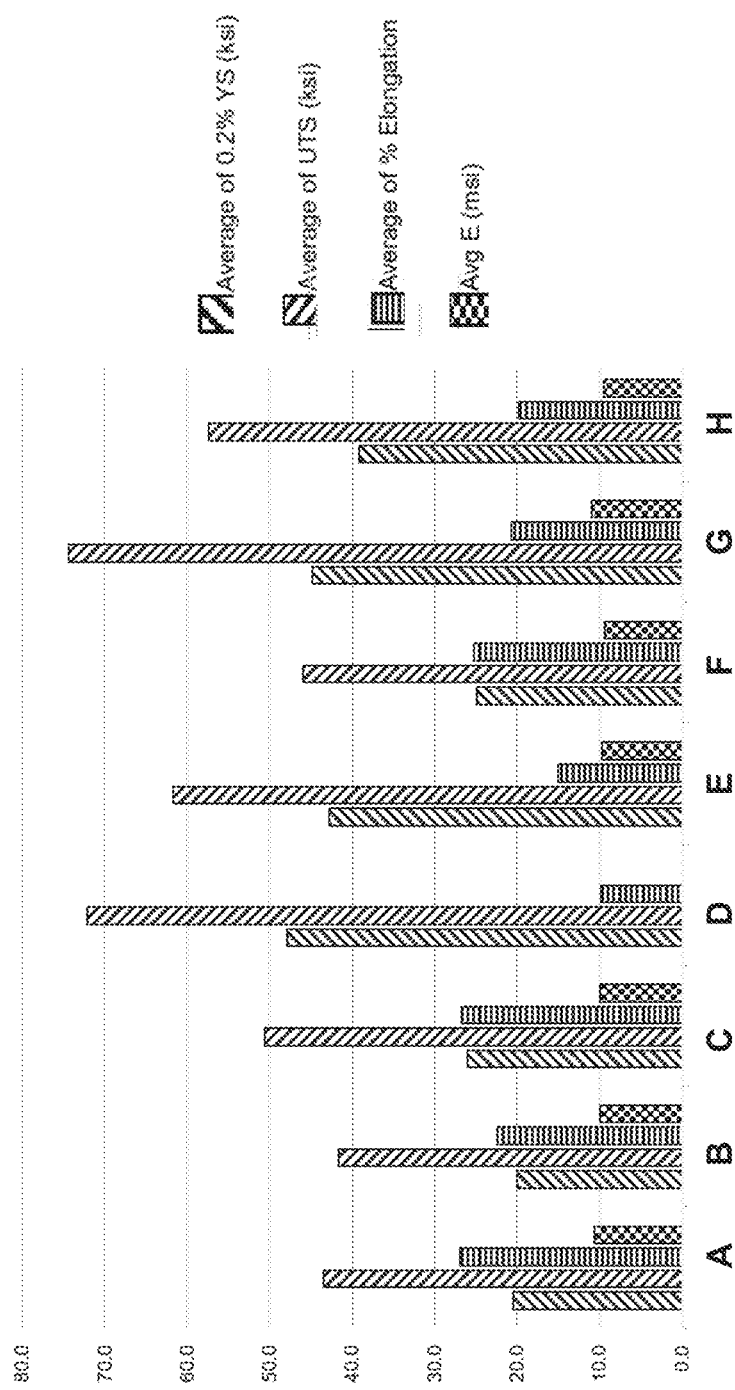
FIG. 11 illustrates mechanical properties in hoop direction of the 5183 Al alloy, the high Mg alloy, and the example Al—Mg—Sc alloy before and after the T5 heat treatment in accordance with an embodiment of the invention.

FIG. 11 illustrates mechanical properties in hoop direction of the 5183 Al alloy, the high Mg alloy, and the example Al—Mg—Sc alloy before and after the T5 heat treatment in accordance with an embodiment. The printed alloys have a thickness of about 0.150 inch. The mechanical properties in FIG. 11 include: average of 0.2% yield strength (YS), average of ultimate tensile strength (UTS), average of % elongation, and average elastic modulus (E). The as-printed alloys in FIG. 11 refer to WAAM printed alloys without any heat treatment or post treatment. Heat treatment for the alloys refer to the T5 heat treatment in accordance with several embodiments, and are in the absence of homogenization heat treatment.

Column A of FIG. 11 represents 5183 Al alloy after the T5 heat treatment, and the mechanical properties are measured at about 21° C. (70° F.). For heat treated 5183 Al alloy, the average of 0.2% YS is about 20.5 ksi, the average of UTS is about 43.5 ksi, the average of % elongation is about 27.0%, and the average E is about 10.6 msi. Column B of FIG. 11 represents as-printed 5183 Al alloy, and the mechanical properties are measured at about 21° C. (70° F.). For as-printed 5183 Al alloy, the average of 0.2% YS is about 20.0 ksi, the average of UTS is about 41.6 ksi, the average of % elongation is about 22.4%, and the average E is about 9.9 msi. The as-printed 5183 Al alloy and the T5 heat treated 5183 Al alloy have comparable mechanical properties in the hoop direction, and the T5 heat treatment does not improve the mechanical properties of the 5183 Al alloy by much.

Column C of FIG. 11 represents as printed high Mg alloy, and the mechanical properties are measured at about 21° C. (70° F.). For as-printed high Mg alloy, the average of 0.2% YS is about 26.1 ksi, the average of UTS is about 50.6 ksi, the average of % elongation is about 26.7%, and the average E is about 9.9 msi. Column D of FIG. 11 represents high Mg alloy after the T5 heat treatment, and the mechanical properties are measured at about −196° C. (−320° F.). For T5 heat treated high Mg alloy, the average of 0.2% YS is about 47.9 ksi, the average of UTS is about 72.1 ksi, and the average of % elongation is about 9.9%. Column E of FIG. 11 represents high Mg alloy after the T5 heat treatment, and the mechanical properties are measured at about 21° C. (70° F.). For heat treated high Mg alloy, the average of 0.2% YS is about 42.8 ksi, the average of UTS is about 61.7 ksi, the average of % elongation is about 15.0%, and the average E is about 9.8 msi. The T5 heat treatment greatly improves the yield strength and the tensile strength of the high Mg alloy in the hoop direction, and elongation does not change much.

Column F of FIG. 11 represents as printed Al—Mg—Sc example alloy, and the mechanical properties are measured at about 21° C. (70° F.). For as-printed Al—Mg—Sc example alloy, the average of 0.2% YS is about 24.9 ksi, the average of UTS is about 45.9 ksi, the average of % elongation is about 25.2%, and the average E is about 9.4 msi. Column G of FIG. 11 represents Al—Mg—Sc example alloy after the heat treatment, and the mechanical properties are measured at about −196° C. (−320° F.). For T5 heat treated Al—Mg—Sc example alloy, the average of 0.2% YS is about 44.8 ksi, the average of UTS is about 74.3 ksi, the average of % elongation is about 20.7%, and the average E is about 11.0 msi. Column H of FIG. 11 represents Al—Mg—Sc example alloy after the heat treatment, and the mechanical properties are measured at about 21° C. (70° F.). For T5 heat treated Al—Mg—Sc example alloy, the average of 0.2% YS is about 39.2 ksi, the average of UTS is about 57.4 ksi, the average of % elongation is about 19.8%, and the average E is about 9.5 msi. The T5 heat treatment of the Al—Mg—Sc example alloy greatly improves the yield strength and the tensile strength in the hoop direction of the alloy, while elongation and the elastic modulus do not improve much. The T5 heat-treated Al—Mg—Sc example alloy has the highest UTS when measured at about −196° C.

Figure 12:
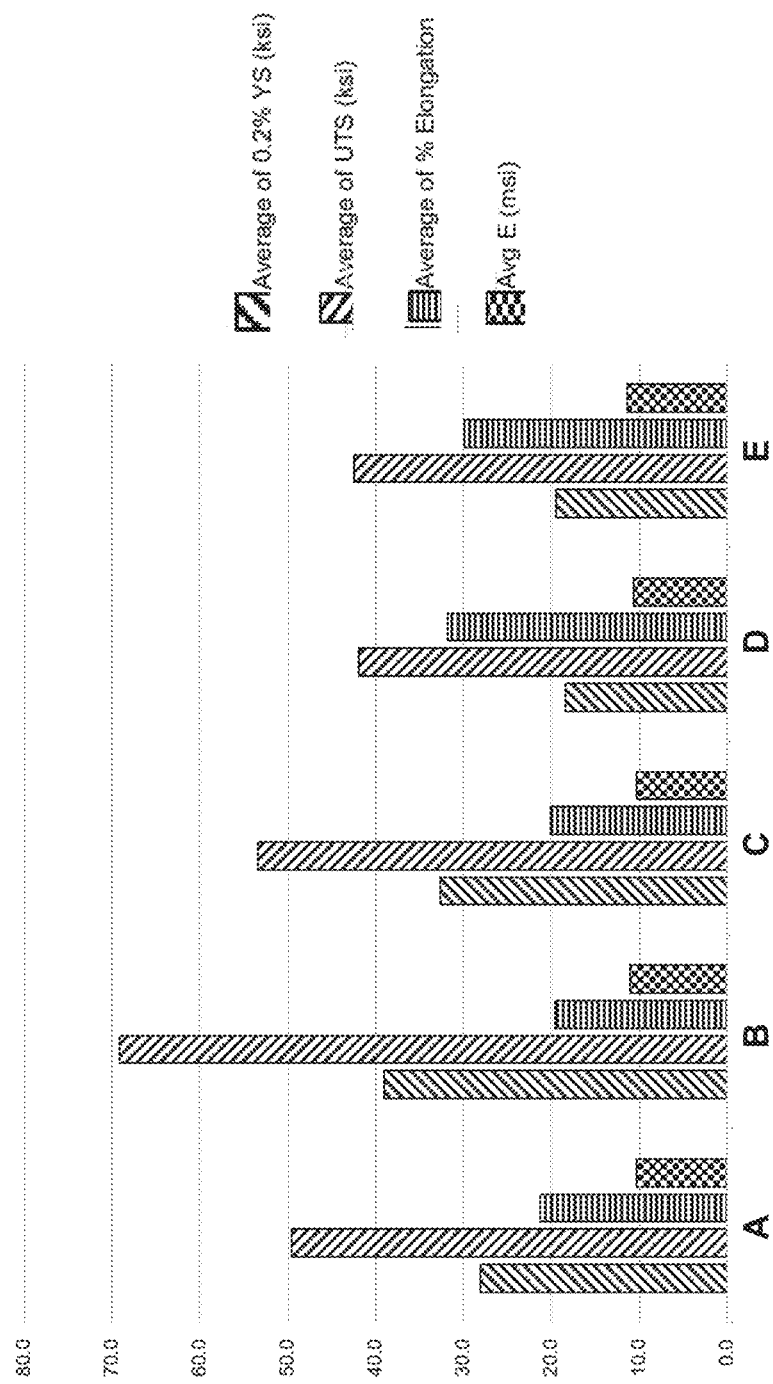
FIG. 12 illustrates mechanical properties in axial direction of the 5183 Al alloy and the example Al—Mg—Sc alloy before and after the T5 heat treatment in accordance with an embodiment of the invention.

FIG. 12 illustrates mechanical properties in axial direction of the 5183 Al alloy and the example Al—Mg—Sc alloy before and after the T5 heat treatment in accordance with an embodiment. The printed alloys have a thickness of about 0.50 inch. The mechanical properties in FIG. 12 include: average of 0.2% yield strength (YS), average of ultimate tensile strength (UTS), average of % elongation, and average elastic modulus (E). The as-printed alloys in FIG. 12 refer to WAAM printed alloys without any heat treatment or post treatment. Heat treatment for the alloys refer to the T5 heat treatment in accordance with several embodiments, and are in the absence of homogenization heat treatment.

Column A of FIG. 12 represents as-printed Al—Mg—Sc example alloy, and the mechanical properties are measured at about 21° C. (70° F.). For as-printed Al—Mg—Sc example alloy, the average of 0.2% YS is about 28.0 ksi, the average of UTS is about 49.6 ksi, the average of % elongation is about 21.2%, and the average E is about 10.2 msi. Column B of FIG. 12 represents Al—Mg—Sc example alloy after the T5 heat treatment, and the mechanical properties are measured at about −196° C. (−320° F.). For T5 heat treated Al—Mg—Sc example alloy, the average of 0.2% YS is about 39.0 ksi, the average of UTS is about 69.1 ksi, the average of % elongation is about 19.6%, and the average E is about 11.0 msi. Column C of FIG. 12 represents Al—Mg—Sc example alloy after the T5 heat treatment, and the mechanical properties are measured at about 21° C. (70° F.). For heat treated Al—Mg—Sc example alloy, the average of 0.2% YS is about 32.7 ksi, the average of UTS is about 53.4 ksi, the average of % elongation is about 20.1%, and the average E is about 10.3 msi. The T5 heat treatment of the Al—Mg—Sc example alloy greatly improves the yield strength and the tensile strength in the axial direction of the alloy, while elongation and the elastic modulus do not improve much. The T5 heat-treated Al—Mg—Sc example alloy has the highest UTS when measured at about −196° C.

Column D of FIG. 12 represents as printed 5183 Al alloy, and the mechanical properties are measured at about 21° C. (70° F.). For as-printed 5183 Al alloy, the average of 0.2% YS is about 18.4 ksi, the average of UTS is about 41.9 ksi, the average of % elongation is about 31.8%, and the average E is about 10.6 msi. Column E of FIG. 12 represents 5183 Al alloy after the heat treatment, and the mechanical properties are measured at about 21° C. (70° F.). For T5 heat treated 5183 Al alloy, the average of 0.2% YS is about 19.6 ksi, the average of UTS is about 42.4 ksi, the average of % elongation is about 29.8%, and the average E is about 11.4 msi. The as-printed 5183 Al alloy and the T5 heat treated 5183 Al alloy have comparable mechanical properties in the axial direction. The T5 heat treatment can relieve residual stress and lower degree of sensitization of the 5183 Al alloys, and may not improve the mechanical properties of the 5183 Al alloy.

Figure 13:
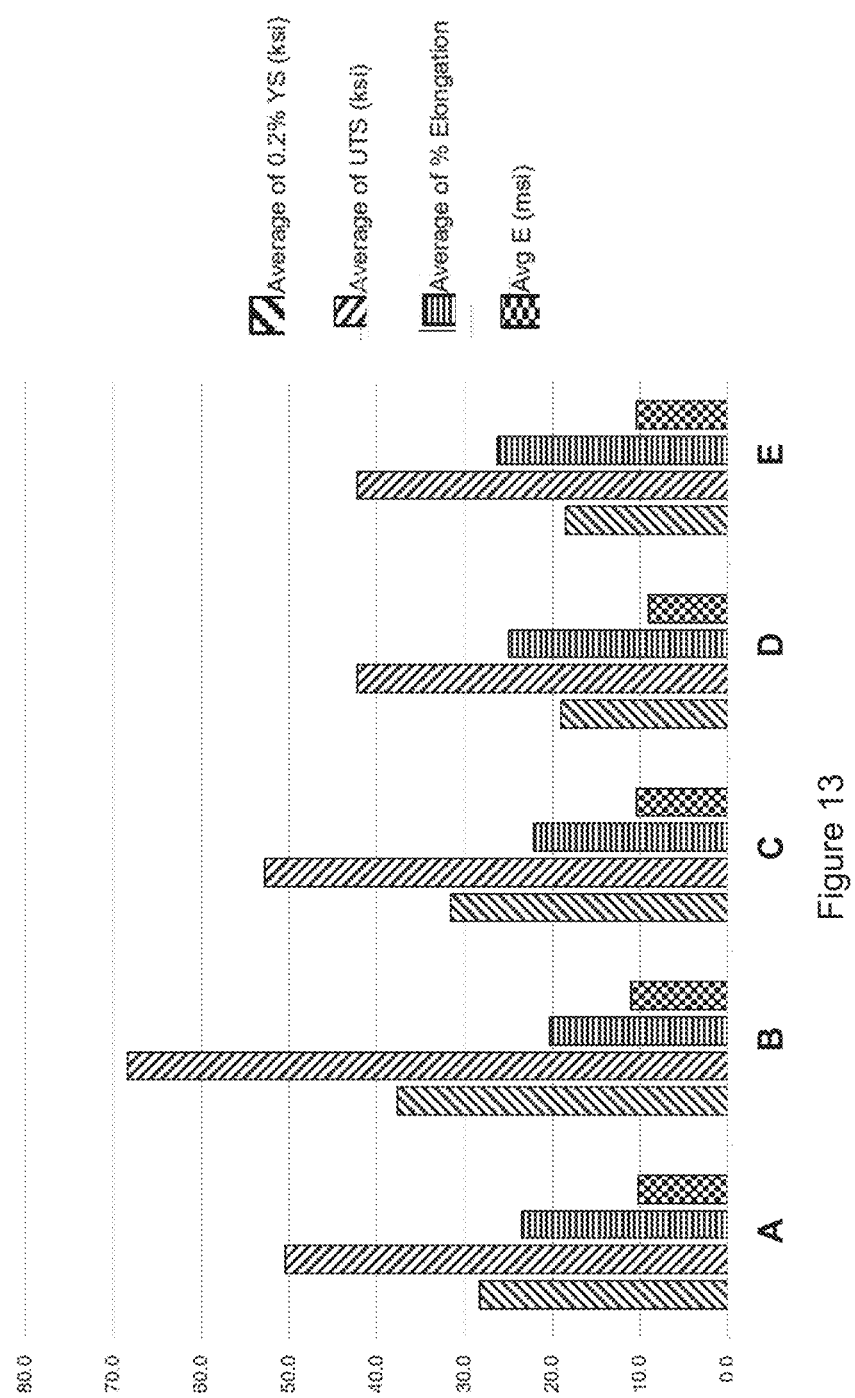
FIG. 13 illustrates mechanical properties in hoop direction of the 5183 Al alloy and the example Al—Mg—Sc alloy before and after the T5 heat treatment in accordance with an embodiment of the invention.

FIG. 13 illustrates mechanical properties in hoop direction of the 5183 Al alloy and the example Al—Mg—Sc alloy before and after the T5 heat treatment in accordance with an embodiment. The printed alloys have a thickness of about 0.50 inch. The mechanical properties in FIG. 13 include: average of 0.2% yield strength (YS), average of ultimate tensile strength (UTS), average of % elongation, and average elastic modulus (E). The as-printed alloys in FIG. 13 refer to WAAM printed alloys without any heat treatment or post treatment. Heat treatment for the alloys refer to the T5 heat treatment in accordance with several embodiments, and are in the absence of homogenization heat treatment.

Column A of FIG. 13 represents as-printed Al—Mg—Sc example alloy, and the mechanical properties are measured at about 21° C. (70° F.). For as-printed Al—Mg—Sc example alloy, the average of 0.2% YS is about 28.2 ksi, the average of UTS is about 50.4 ksi, the average of % elongation is about 23.5%, and the average E is about 10.2 msi. Column B of FIG. 13 represents Al—Mg—Sc example alloy after the T5 heat treatment, and the mechanical properties are measured at about −196° C. (−320° F.). For T5 heat treated Al—Mg—Sc example alloy, the average of 0.2% YS is about 37.6 ksi, the average of UTS is about 68.3 ksi, the average of % elongation is about 20.3%, and the average E is about 11.0 msi. Column C of FIG. 13 represents Al—Mg—Sc example alloy after the T5 heat treatment, and the mechanical properties are measured at about 21° C. (70° F.). For heat treated Al—Mg—Sc example alloy, the average of 0.2% YS is about 31.6 ksi, the average of UTS is about 52.7 ksi, the average of % elongation is about 22.1%, and the average E is about 10.4 msi. The T5 heat treatment of the Al—Mg—Sc example alloy greatly improves the yield strength and the tensile strength in the hoop direction of the alloy, while elongation and the elastic modulus do not improve much. The T5 heat-treated Al—Mg—Sc example alloy has the highest UTS when measured at about −196° C.

Column D of FIG. 13 represents as-printed 5183 Al alloy, and the mechanical properties are measured at about 21° C. (70° F.). For as-printed 5183 Al alloy, the average of 0.2% YS is about 19.0 ksi, the average of UTS is about 42.2 ksi, the average of % elongation is about 25.0%, and the average E is about 9.0 msi. Column E of FIG. 13 represents 5183 Al alloy after the heat treatment, and the mechanical properties are measured at about 21° C. (70° F.). For T5 heat treated 5183 Al alloy, the average of 0.2% YS is about 18.4 ksi, the average of UTS is about 42.2 ksi, the average of % elongation is about 26.2%, and the average E is about 10.4 msi. The as-printed 5183 Al alloy and the T5 heat treated 5183 Al alloy have comparable mechanical properties in the hoop direction, and the T5 heat treatment does not improve the mechanical properties of the 5183 Al alloy by much.

In contrast, the homogenization heat treatment for Al alloys utilizes relatively high temperatures from about 426° C. to about 482° C. (about 800-900° F.). At the homogenization temperatures, a solid solution can be formed under the homogenization temperature. In contrast, T5 heat treatments in accordance with many embodiments heat WAAM printed objects at a temperature at least 275° C. and less than or equal to about 335° C. (635° F.). In several embodiments, the T5 heat treatment is not heated to a temperature consistent with a homogenization heat treatment. Several embodiments include the inventive realization that heat treatment of the Al—Mg—Sc alloys at a temperature greater than or equal to about 400° C. may not improve the mechanical strength of the Al—Mg—Sc alloys.

Figure 14:
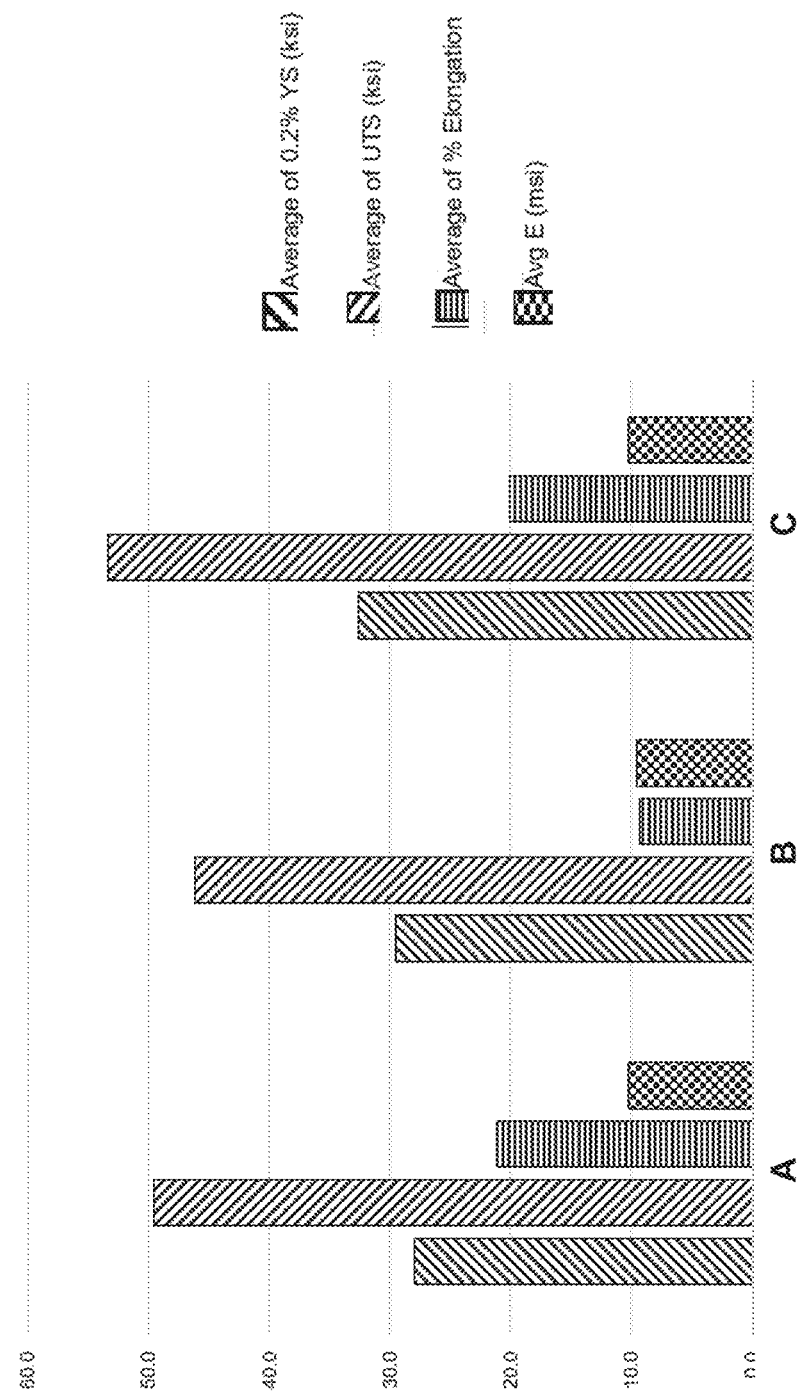
FIG. 14 illustrates mechanical properties in axial direction of the example Al—Mg—Sc alloy under different heat treatment conditions in accordance with an embodiment of the invention.

FIG. 14 illustrates mechanical properties in axial direction of the example Al—Mg—Sc alloy under different heat treatment conditions in accordance with an embodiment. The printed alloys have a thickness of about 0.50 inch. The mechanical properties in FIG. 14 include: average of 0.2% yield strength (YS), average of ultimate tensile strength (UTS), average of % elongation, and average elastic modulus (E). The as-printed alloys in FIG. 14 refer to WAAM printed alloys without any heat treatment or post treatment. T5 heat treatment of the alloy in accordance with several embodiments is in the absence of homogenization heat treatment.

Column A of FIG. 14 represents as-printed Al—Mg—Sc example alloy, and the mechanical properties are measured at about 21° C. (70° F.). For as-printed Al—Mg—Sc example alloy, the average of 0.2% YS is about 28.0 ksi, the average of UTS is about 49.6 ksi, the average of % elongation is about 21.2%, and the average E is about 10.2 msi. Column B of FIG. 14 represents Al—Mg—Sc example alloy after the heat treatment at about 400° C., and the mechanical properties are measured at about 21° C. (70° F.). For 400° C. heat treated Al—Mg—Sc example alloy, the average of 0.2% YS is about 29.5 ksi, the average of UTS is about 46.2 ksi, the average of % elongation is about 9.3%, and the average E is about 9.6 msi. Column C of FIG. 14 represents Al—Mg—Sc example alloy after the T5 heat treatment, and the mechanical properties are measured at about 21° C. (70° F.). For the T5 heat treated Al—Mg—Sc example alloy, the average of 0.2% YS is about 32.7 ksi, the average of UTS is about 53.4 ksi, the average of % elongation is about 20.1%, and the average E is about 10.3 msi. The T5 heat treatment of the Al—Mg—Sc example alloy greatly improves the yield strength and the tensile strength in the axial direction of the alloy. The heat treatment at about 400° C. does not improve the yield strength by much and actually lowers the tensile strength.

Figure 15:
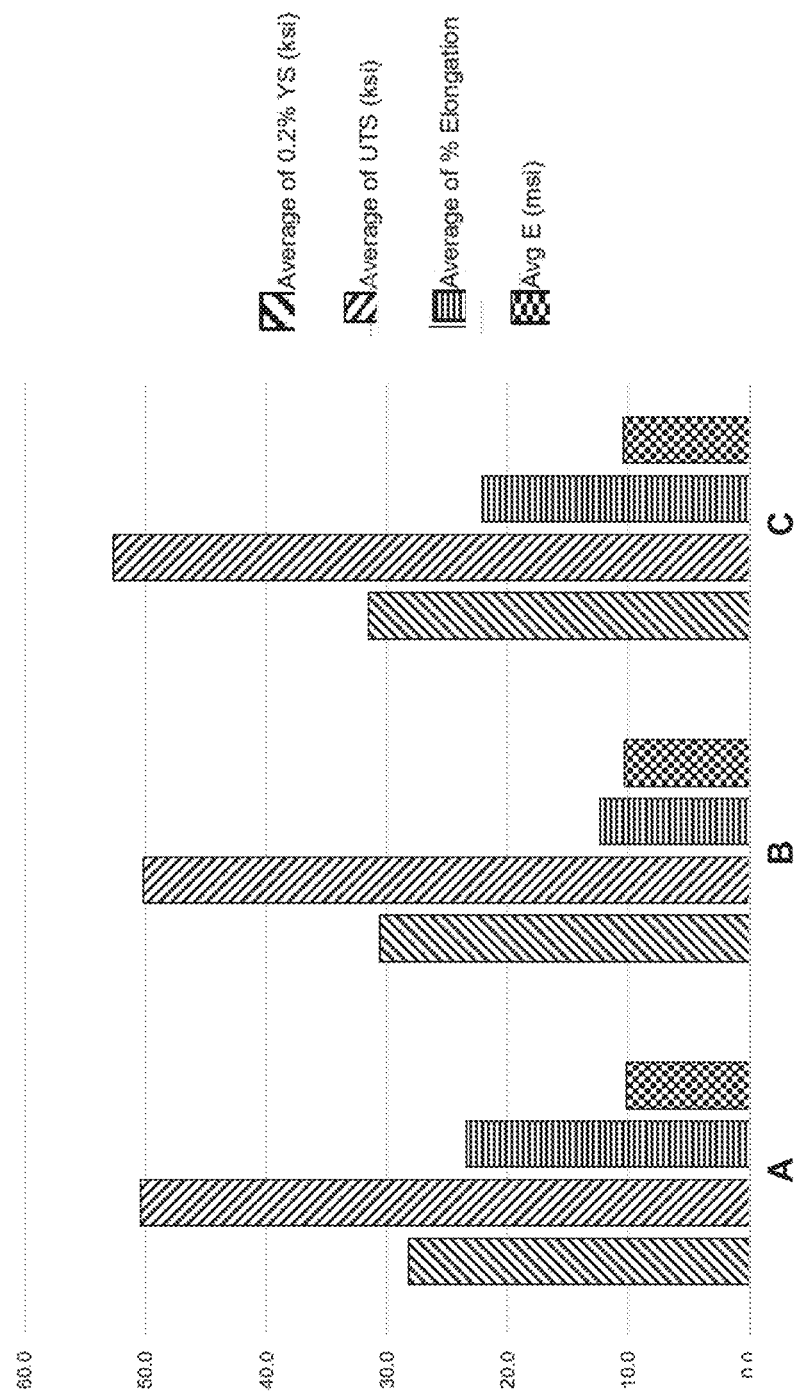
FIG. 15 illustrates mechanical properties in hoop direction of the example Al—Mg—Sc alloy under different heat treatment conditions in accordance with an embodiment of the invention.

FIG. 15 illustrates mechanical properties in hoop direction of the example Al—Mg—Sc alloy under different heat treatment conditions in accordance with an embodiment. The printed alloys have a thickness of about 0.50 inch. The mechanical properties in FIG. 15 include: average of 0.2% yield strength (YS), average of ultimate tensile strength (UTS), average of % elongation, and average elastic modulus (E). The as-printed alloys in FIG. 15 refer to WAAM printed alloys without any heat treatment or post treatment. T5 heat treatment of the alloy in accordance with several embodiments is in the absence of homogenization heat treatment.

Column A of FIG. 15 represents as printed Al—Mg—Sc example alloy, and the mechanical properties are measured at about 21° C. (70° F.). For as printed Al—Mg—Sc example alloy, the average of 0.2% YS is about 28.2 ksi, the average of UTS is about 50.4 ksi, the average of % elongation is about 23.5%, and the average E is about 10.2 msi. Column B of FIG. 15 represents Al—Mg—Sc example alloy after the heat treatment at about 400° C., and the mechanical properties are measured at about 21° C. (70° F.). For 400° C. heat treated Al—Mg—Sc example alloy, the average of 0.2% YS is about 30.6 ksi, the average of UTS is about 50.2 ksi, the average of % elongation is about 12.3%, and the average E is about 10.3 msi. Column C of FIG. 15 represents Al—Mg—Sc example alloy after the T5 heat treatment, and the mechanical properties are measured at about 21° C. (70° F.). For the T5 heat treated Al—Mg—Sc example alloy, the average of 0.2% YS is about 31.6 ksi, the average of UTS is about 52.7 ksi, the average of % elongation is about 22.1%, and the average E is about 10.4 msi. The T5 heat treatment of the Al—Mg—Sc example alloy greatly improves the yield strength and the tensile strength in the hoop direction of the alloy. The heat treatment at about 400° C. does not improve the yield strength or the tensile strength by much.

Figure 16:
FIG. 16 illustrates the fracture toughness of the Al—Mg—Sc alloys in accordance with an embodiment of the invention.

Many embodiments include the fracture toughness of the WAAM printed Al—Mg—Sc alloys. The fracture toughness defines the resistance of materials against crack growth. Fracture toughness describes the resistance of brittle materials to the propagation of flaws under an applied stress, and it assumes that the longer the flaw, the lower is the stress needed to cause fracture. The ability of a flaw to cause fracture depends on the fracture toughness of the material. High fracture toughness in metals can be achieved by increasing the ductility, but this may lead to lower yield strength. FIG. 16 illustrates the fracture toughness of the Al—Mg—Sc alloys in accordance with an embodiment of the invention. The printed Al—Mg—Sc alloys have a thickness of about 0.385 inch, and the alloys have been T5 heat treated in accordance with some embodiments. Column A shows the fracture toughness of about 36.1 ksi*inch$^{1/2}$ in the axial direction and measured at about 21° C. (70° F.). Column B shows the fracture toughness of about 38.6 ksi*inch$^{1/2}$ in the hoop direction and measured at about 21° C. (70° F.). Column C shows the fracture toughness of about 47.1 ksi*inch$^{1/2}$ in the axial direction and measured at about −196° C. (−320° F.). Column D shows the fracture toughness of about 48.3 ksi*inch$^{1/2}$ in the hoop direction and measured at about −196° C. (−320° F.).

Figure 17:
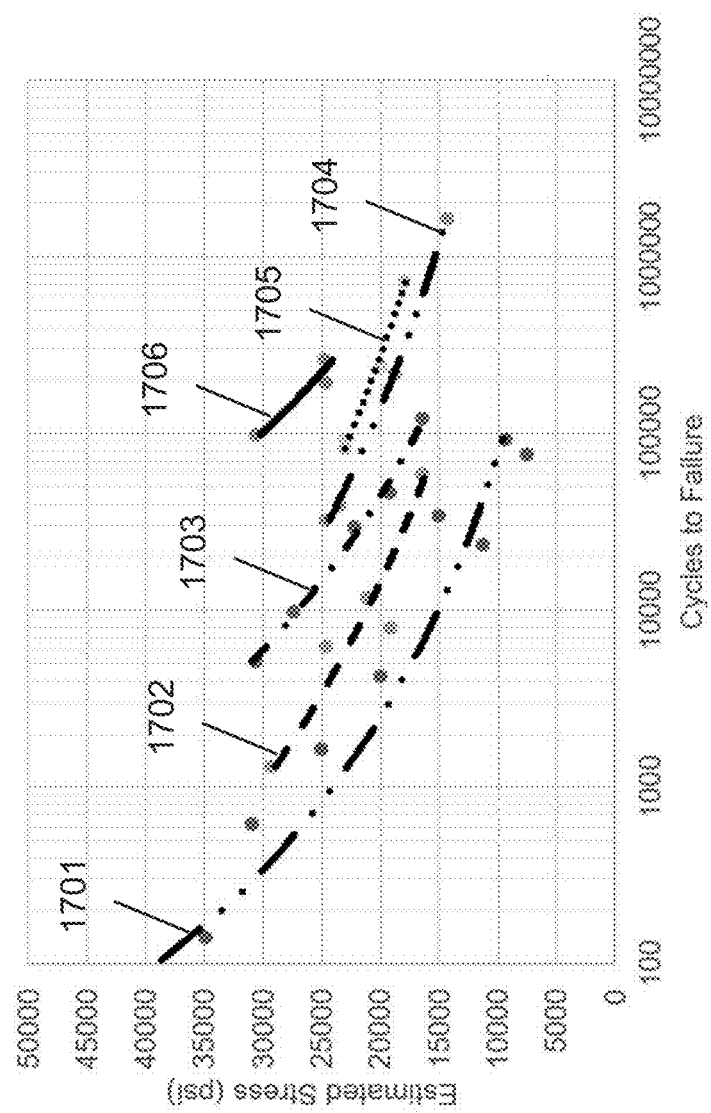
FIG. 17 illustrates estimated applied stress at different cycles to failure for various printed Al—Mg—Sc samples in accordance with an embodiment of the invention.

Several embodiments include fatigue life of the WAAM printed Al—Mg—Sc alloys. In several embodiments, T5 heat treatment increases the number of cycles to failure of the printed Al—Mg—Sc objects. In some embodiments, machining and T5 heat treatment can further improve the number of cycles to failure of the printed Al—Mg—Sc objects. FIG. 17 illustrates estimated applied stress at different cycles to failure for various printed Al—Mg—Sc samples in accordance with an embodiment of the invention. The tests are carried out at a temperature about 21° C. (70° F.). 1701 represents a 0.19-inch-thick WAAM printed Al—Mg—Sc sample after T5 heat treatment, with an applied stress ratio R of −1. 1702 represents a 0.5-inch-thick WAAM printed Al—Mg—Sc sample after T5 heat treatment, with R ratio of −1. 1703 represents a 0.5-inch-thick WAAM printed Al—Mg—Sc sample after T5 heat treatment, with R ratio of 0. 1704 represents a 0.5-inch-thick WAAM printed Al—Mg—Sc sample after machining and T5 heat treatment, with R ratio of −1. 1705 represents a 0.15-inch-thick WAAM printed Al—Mg—Sc sample after machining and T5 heat treatment, with R ratio of −1. 1706 represents a 0.5-inch-thick WAAM printed Al—Mg—Sc sample after machining and T5 heat treatment, with R ratio of 0. The machined and T5 heat treated samples have equal to or greater than about 1 million cycles to failure under about 15,000 psi to 20,000 psi applied stress.

Residual Stress

Many embodiments include the inventive realization that residual stress imparted to the 3D structure during the additive manufacturing process can be alleviated and/or reduced as a result of the T5 heat treatment process, in the absence of a homogenization heat treatment. In several embodiments, the T5 heat treatment can release the residual stress from the WAAM printed Al—Mg—Sc objects. In embodiments, the temperature of the T5 heat treatment is less than or equal to about 400° C., or less than or equal to about 390° C., or less than or equal to about 370° C., or less than or equal to about 350° C., or less than or equal to about 340° C.

In WAAM processes, the residual stress is a major cause of distortions and the loss of geometrical accuracy in the printed objects, affecting part accuracy and quality. Residual stress is the stress that remains in the material after the removal of all external loading forces. Thermal induced stresses arise from thermal-induced strains during non-uniform expansion during WAAM. The induced strain can distort a material being deposited. If a structure cannot react by macroscopically distorting it, it may cause microscopic deformation (e.g. yield or crack) or result in residual stresses. During WAAM printing processes, there are large thermal gradients during repeated melting and cooling, and the transient and spatially non-uniform temperature conditions contribute to residual stress and distortion.

For aerospace applications, the printed structures including (but not limited to) a barrel or a tank, need to be mechanically strong. At the same time, the printed structures may be pressurized during transportation, and the residual stress inside can cause huge cracks all over the structure if not managed properly. T5 heat treatment in accordance with many embodiments not only can improve the mechanical strength of the WAAM printed Al—Mg—Sc objects, it also relieves the residual stress accumulated during the printing processes. The T5 heat treatment enables mechanically strong structures for aerospace applications, and also preserves the structural integrity and quality by removing the residual stress.

Figure 18A:
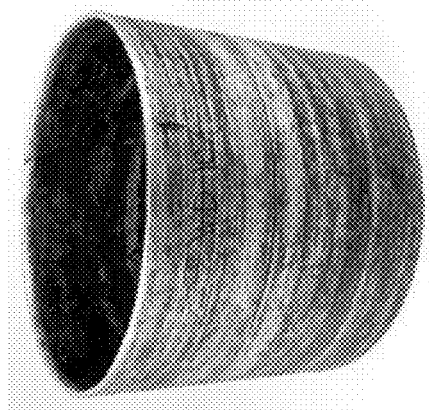
FIG. 18A illustrates a cylindrical structure printed by WAAM using the Al—Mg—Sc alloys for the stress relief tests in accordance with an embodiment of the invention.

Several embodiments include the inventive realization that the T5 heat treatment can eliminate more than about 90% of residual stress in the WAAM printed Al—Mg—Sc structures. FIG. 18A illustrates an example a cylindrical structure printed by WAAM using an Al—Mg—Sc alloy in accordance with an embodiment of the invention. This example article was used for stress tests. The hole drilling method is used to test the residual stress versus depth. The structure is about 13 inches in length, 13 inches in diameter, and 0.2 inches in wall thickness. The incremental hole drilling method is used to measure the residual stress in the cylinder structure at various locations. The hole drilling measurements measure residual stress in the hoop and axial directions. The hole drilling measurements are drilled in about 0.001-inch increments to a final depth of about 0.020 inches. The hole drilling method follows the procedures determined by ASTM Standard E837-08. As illustrated, the printed article may include a layered structure with rings created through printing. This is different from an article created through other processes such as casting, which would produce a plate.

The layered structure may include layers of cylindrical or oval shaped contours that additively stack to form the article. FIG. 18B is an example cross sectional view of an article printed by WAAM using an Al—Mg—Sc alloy in accordance with an embodiment of the invention. As illustrated, the article 1802 may include cylindrical layers 1804 which make up the article 1802. The cylindrical layers 1804 may merge into each other at an interface. Each layer 1804 may include protruding sections 1804a out from a middle section 1804b of the layer 1804. The interior and exterior of each layer 1804 may include these protruding sections 1804a from the middle section 1804b of the layer 1804. Each of the layers 1804 may be formed by additively printing an Al—Mg—Sc wire onto the surface of the below layer 1804. A heat treatment technique as discussed throughout may be performed after printing the article.

Figure 19A:
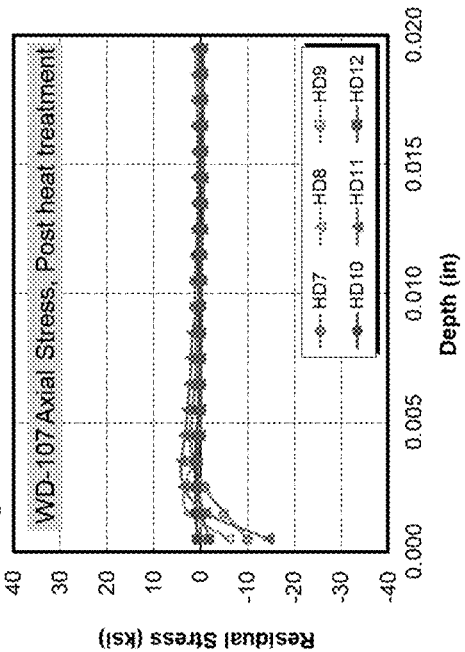
FIG. 19A-19F illustrate residual stress relief of the WAAM printed Al—Mg—Sc structures after the T5 heat treatment in accordance with an embodiment of the invention.
Figure 19B:
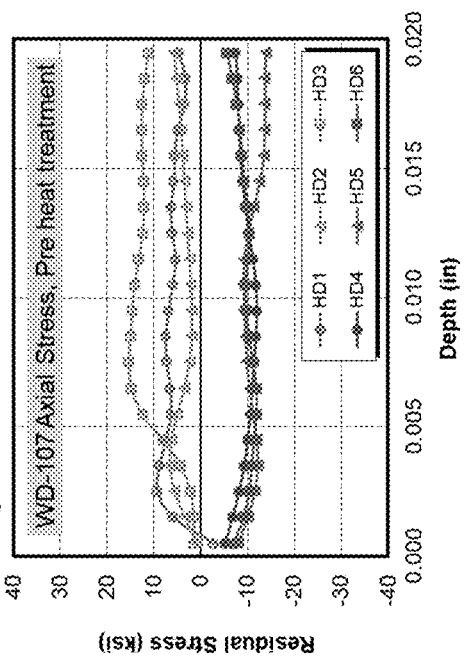

It is also understood that the Al—Mg—Sc wire may be used to repair a previously produced part such a previously printed part. In order to repair an article, the Al—Mg—Sc wire may be printed on a fractured portion of an article. The fractured portion may include two sections of the article. At the interface between the two section, the wire may be printed to produce a repaired portion. A heat treatment may be performed locally on the repaired portion, such that an area adjacent to the repaired portion is treated without the need for treating the entire printed part. In at least one embodiment, a large, repaired structure, e.g., having a dimension of at least about 6, 10, or 18 feet, that has already been subjected to heat treatment, can be placed inside a furnace so that the entirety of the large structure, including the repair, is subjected to another heat treatment. The heat treatment performed on the repaired portion can be the same heat treatment originally performed on the previously printed part. FIGS. 19A-19F illustrate residual stress relief results of the WAAM printed Al—Mg—Sc structures after the T5 heat treatment in accordance with an embodiment of the invention. FIGS. 19A-19F show the residual stress measured using the hole drilling method, displayed in the form of line plots of the residual stress versus depth. FIG. 19A shows the residual stress in axial direction before the heat treatment. HD1-HD6 represent different locations of the hole drilled on the cylindrical structure at different depth. The residual stress varies in a range from about −20 ksi to about 20 ksi. FIG. 19B shows the residual stress in axial direction after the T5 heat treatment. HD7-HD12 represent different locations of the hole drilled on the cylindrical structure at different depth. The residual stress after the T5 heat treatment at different locations is reduced to almost 0 ksi.

Figure 19C:
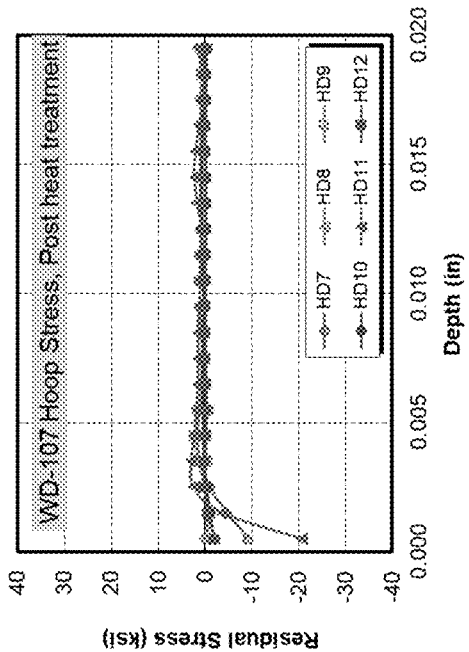
Figure 19D:
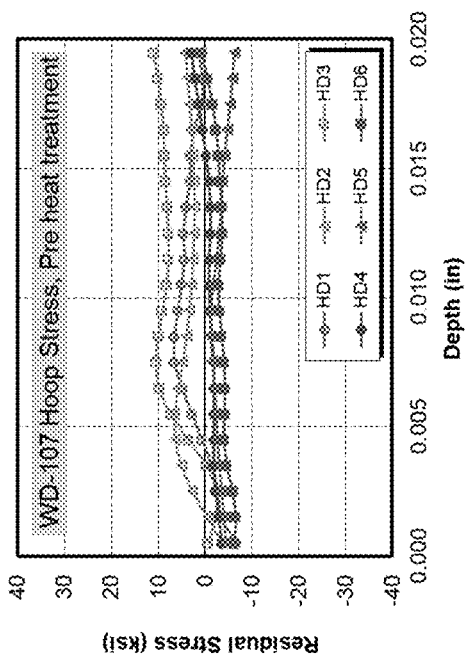

FIG. 19C shows the residual stress in hoop direction before the heat treatment. The residual stress varies in a range from about −10 ksi to about 10 ksi. FIG. 19D shows the residual stress in hoop direction after the T5 heat treatment. The residual stress after the T5 heat treatment at different locations is reduced to almost 0 ksi.

Figures 19E, 19F:
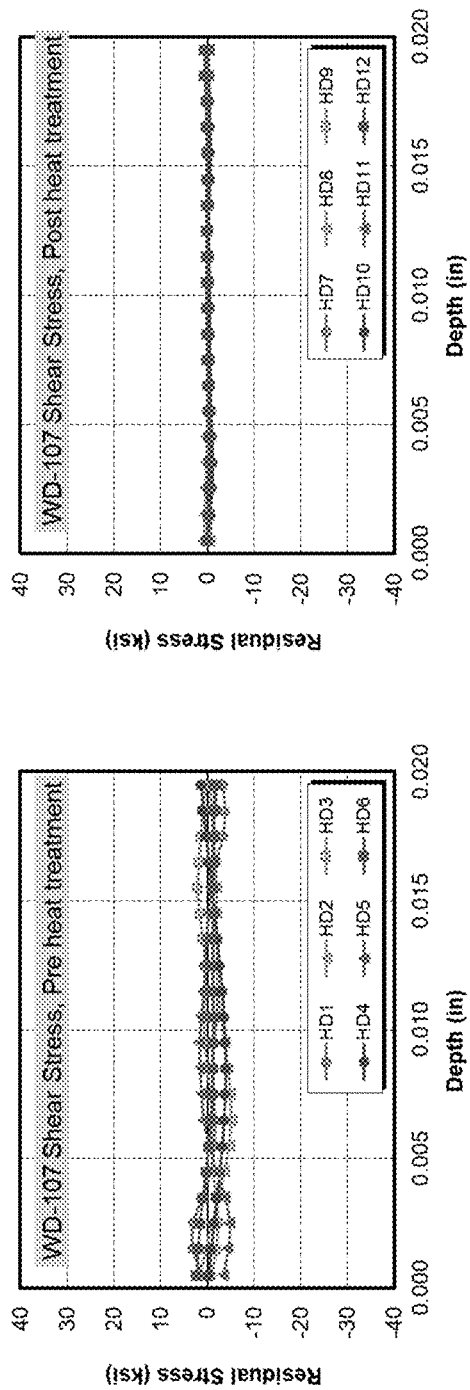

FIG. 19E shows the shear stress before the heat treatment. The shear stress varies in a range from about −10 ksi to about 10 ksi. FIG. 19F shows the shear stress after the T5 heat treatment. The shear stress after the T5 heat treatment at different locations is reduced to almost 0 ksi.

Degree of Sensitization

Conventionally, the 5XXX series Al alloys comprise relatively large amount of Mg, and possess moderate to high strength characteristics, as well as good weldability and resistance to corrosion in the marine environment. However, the 5XXX series Al alloys are susceptible to sensitization during service at elevated temperatures.

Al alloys containing rich Mg deposits (as present in the 5xxx series Al alloys) may be susceptible to intergranular corrosion (IGC) and intergranular stress corrosion cracking (IGSCC). This susceptibility is due to sensitization processes where a material changes phases causing precipitation of a metal. The Mg rich deposits can force a phase shift into a β-phase ($Mg_2Al_3$). The β-phase may form preferentially at grain boundaries and form a deleterious corrosion-susceptible constituent, resulting in a sensitized form. This precipitation may form along a majority of the grain boundary or continuously along the grain boundary, and may result in deleterious results such as the presence of environmentally assisted cracking. This can present risks due to stress corrosion cracking (SCC), and/or other structural defects which can be problematic in high performance applications such as aerospace.

The precipitation of the β-phase in the grain boundaries can give rise to intergranular corrosion when the material is exposed to chloride-containing natural environments. The extent to which the alloy will be susceptible to intergranular corrosion depends upon the degree of precipitate continuity in the grain boundaries. Visible manifestations of the attack may be in various forms such as pitting, exfoliation, or stress-corrosion cracking, depending upon the morphology of the grain structure and the presence of sustained tensile stress.

To reduce the degree of sensitization in 5XXX aluminum alloys, a T6 or T7 heat treatment regimen may be required in which the material first undergoes a high temperature homogenization heat treatment which may then be followed by an accelerated heat treatment. Homogenization heat treatment may not be possible in many high performance and/or aerospace applications, however.

The Al—Mg—Sc alloy compositions in accordance with many embodiments comprise a Mg concentration that is comparable to that of the 5XXX aluminum alloys. Yet, several embodiments include the inventive realization that a single cycle T5 heat treatment (in the absence of homogenization heat treatment), can remove the β-phase from the Al—Mg—Sc alloys and get the alloy to an unsensitized state. Many embodiments include the inventive realization that the T5 heat treatment can remove the β-phase ($Mg_2Al_3$) from the Al—Mg—Sc alloys and improve the corrosion resistance of the alloy. After the T5 heat treatment (in the absence of homogenization heat treatment), the Al—Mg—Sc alloys are essentially devoid of the β-phase and are in an unsensitized state. The Al—Mg—Sc alloys after the T5 heat treatment in accordance with several embodiments have a degree of sensitization (DoS) mass loss of less than or equal to about 15 mg/cm$^2$, when determined according to ASTM G67-18, or an equivalent thereof.

The T5 heat treatment can improve corrosion resistance of the alloy. Table 5 lists elemental compositions of 5XXX series Al alloys, a high Mg alloy, and an example Al—Mg—Sc alloy.

TABLE 5

Alloy compositions in % by weight.

| Elements | 5083 Al alloy | 5183 Al alloy | High Mg alloy | Example alloy |
| --- | --- | --- | --- | --- |
| Mg | 4.0-4.9 | 4.3-5.2 | 6.5 | 4.1-5.6 |
| Sc | n/a | n/a | 0.3 | 0.23-0.37 |
| Zr | n/a | n/a | n/a | 0.11-0.19 |
| Mn | 0.4-1.0 | 0.5-1.0 | 0.7 | 0.1-1.0 |
| Zn | 0.25 | 0.25 | n/a | ≤0.1 |
| Ti | 0.15 | 0.15 | 0.125 | ≤0.1 |
| Cu | 0.1 | 0.1 | n/a | ≤0.1 |
| Si | 0.4 | 0.4 | ≤0.1 | ≤0.1 |
| Fe | 0.4 | 0.4 | n/a | ≤0.1 |
| Be | n/a | 0.0003 | n/a | ≤0.1 |
| Cr | 0.05-0.25 | 0.05-0.25 | n/a | ≤0.2 |
| Al | Balance | Balance | Balance | Balance |

Corrosion resistance can be measured with degree of sensitization (DoS). The effects of sensitization on intergranular boundaries may be quantified in a multitude of ways. A common method to determine the degree of sensitization is an acid mass loss test according to ASTM G67-18, or an equivalent thereof. ASTM G67-18 provides a standard quantitative test method for determining the susceptibility to intergranular corrosion of 5XXX series Al alloys by mass loss after exposure to nitric acid (NAMLT Test). The test method includes immersing test specimens in concentrated nitric acid at about 30° C. (86° F.) for about 24 hours and determining the mass loss per unit area as a measure of susceptibility to intergranular corrosion. The nitric acid dissolves the β-phase, in preference to the solid solution of Mg in the Al matrix. When this compound is precipitated in a relatively continuous network along grain boundaries, the effect of the preferential attack is to corrode around the grains, causing them to fall away from the specimens. Such dropping out of the grains can cause relatively large mass losses of the order of 25 to 75 mg/cm$^2$ (160 to 480 mg/inch$^2$), whereas samples of intergranular-resistant materials lose about 1 to 15 mg/cm$^2$ (10 to 100 mg/inch$^2$).

The more sensitized an Al—Mg alloy is, the more vulnerable it is to stress corrosion cracking. An Al—Mg alloy with more β-phase is more sensitized, thus it is going to be more susceptible to corrosion and decreasing the stress-corrosion-cracking resistance. Al alloys can be considered to be immune to intergranular attack if the DoS is less than about 15 mg/cm² and susceptible to intergranular corrosion if greater than about mg/cm². Values between 15 mg/cm² and 25 mg/cm² are considered to be uncertain.

Figure 20:
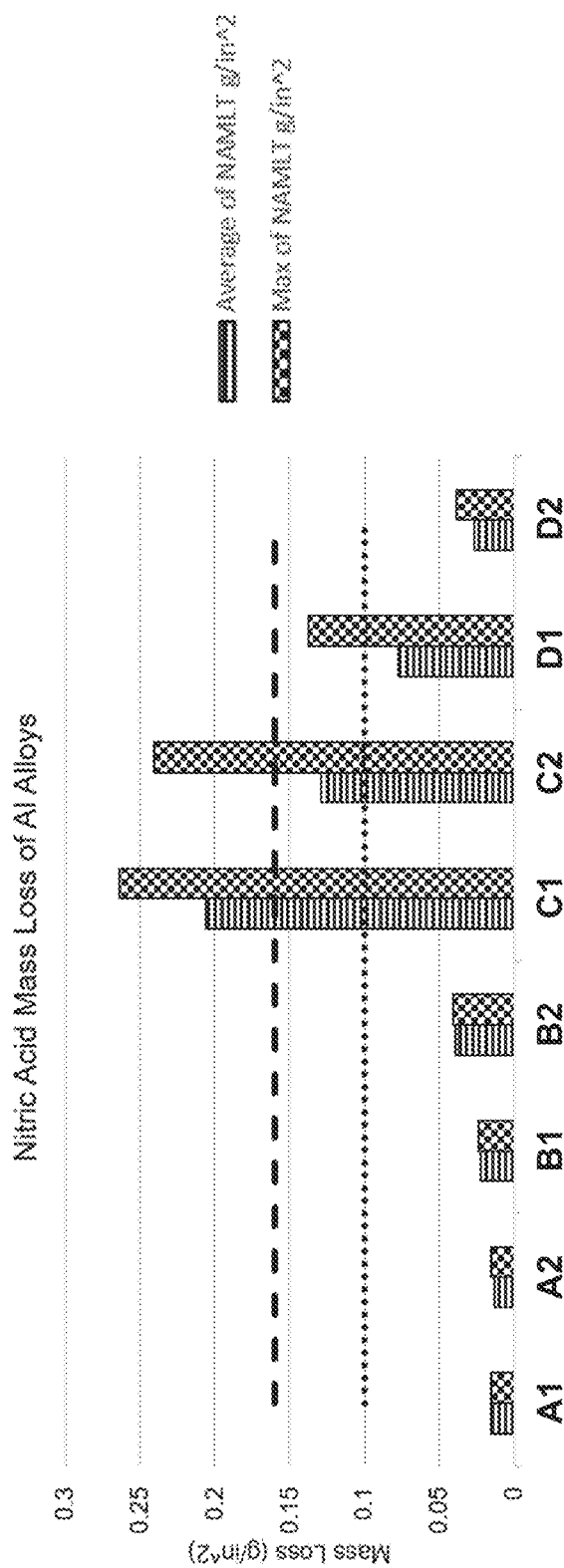
FIG. 20 illustrates degree of sensitization and mass loss of various alloys using the nitric acid mass loss test in accordance with an embodiment of the invention.

FIG. 20 illustrates mass loss of various alloys using the nitric acid mass loss test (NAMLT) in accordance with an embodiment of the invention. FIG. 20 shows average mass loss of NAMLT in g/inch² and maximum mass loss of NAMLT in g/inch². Al alloys can be considered immune to intergranular attack if the DoS is less than about 15 mg/cm² (0.1 g/inch², dotted line). Al alloys can be susceptible to intergranular corrosion if DoS is greater than about 25 mg/cm² (0.16 g/inch², dash line). Column A1 shows as-printed 5083 Al alloy, and column A2 shows T5 heat treated 5083 Al alloy. Column B1 shows as-printed 5183 Al alloy, and column B2 shows T5 heat treated 5183 Al alloy. As 5083 and 5183 alloys are coarse grained, both Al alloys are low sensitization as is. DoS of 5083 and 5183 Al alloys almost show no change after the T5 heat treatment.

Column C1 shows as-printed high Mg alloy, and column C2 shows T5 heat treated high Mg alloy. The high Mg alloy is fine grained and has higher Mg content and higher grain boundary area fraction, making for high DoS even after the T5 heat treatment. The high Mg alloy can be susceptible to corrosion.

Column D1 shows as-printed example Al—Mg—Sc alloy, and column D2 shows T5 heat treated example Al—Mg—Sc alloy. The example Al—Mg—Sc alloy is fine grained and has lower Mg content compared to the high Mg alloy. The example Al—Mg—Sc alloy has a mass loss of less than about 0.1 g/inch², and is not susceptible to corrosion after the T5 heat treat.

Aluminum-Magnesium-Scandium Alloys with Reduced Mn Content

One 5XXX alloy is 5025 alloy, which was originally intended for use as a welding wire. The chemical composition limits for wrought aluminum 5025 alloy are defined in The Aluminum Association, International Alloy Designations And Chemical Composition Limits For Wrought Aluminum And Wrought Aluminum Alloys (2018), at 25, which is hereby incorporated by reference in its entirety for all purposes. These chemical compositional limits for this designated and registered alloy are:

≤0.25 wt % Si;
≤0.25 wt % Fe;
≤0.10 wt % Cu;
≤0.20 wt % Mn;
4.5-6.0 wt % Mg;
≤0.20 wt % Cr;
≤0.25 wt % Zn;
0.05-0.20 wt % Ti;
0.10-0.25 wt % Zr;
≤0.0008 wt % Be
0.05-0.55 wt % Sc;
"Others," if present, not exceeding 0.05 wt % "Each" and, in "Total," not exceeding 0.15 wt %;
with the balance of the composition being Al.

In the foregoing composition, "Others" includes Ni, Ag, B, Bi, Ga, Li, Pb, Sn, and V, as well as unlisted metallic elements. A producer of 5025 alloy may analyze samples for trace elements not specified in the registration or specification. However, such analysis is not required and may not cover all metallic "other" elements. Should any analysis establish that an "others" element exceeds the limit of "Each" or that the aggregate of several "others" elements exceeds the limit of Total, the material shall be considered non-conforming.

The 5025 alloy is no longer in commercial use and was not previously utilized for additive manufacturing or 3D printing or for repairing 3d printed structures. The inventors discovered that compositions encompassing the 5025 alloy may be advantageous in additive manufacturing. Particularly, although the 5025 alloy (like all 5XXX alloys) is defined to be a non-heat-treatable alloy, the inventors discovered that the lower Mn content of the 5025 alloy and Mn content exceeding the compositional limits of Mn for 5025 alloy may have advantageous effects for 3D printed articles that are heat treated. The previous literature describes 5XXX series alloys as non-heat-treatable alloys. For example, (//esab.com/usinam_eniesab-university/blogs/heat-treatable-vs-non-heat-treatable-aluminum-alloys/) explains that 5XXX alloys are non-heat-treatable and are known to derive increased strength from strain hardening. Thus, the previous literature teaches away from utilizing 5XXX series alloys in articles produced utilizing a heat treatment process.

A specific advantageous range has been discovered with a lower amount of Mn content in the Al—Mg—Sc alloy which may change the performance of the Al—Mg—Sc alloys compared to the chemistries described in previous sections. Various embodiments of this disclosure include use of Al—Mg—Sc alloys including lower Mn content for additive manufacturing and, even more specifically, with additive manufacturing including plasma processes.

Several embodiments provide elemental compositions of Al—Mg—Sc alloys with lower Mn content than those described above. Unless otherwise indicated, all percentages refer to a weight percent (wt %) and are determined relative to the total amount of a composition present. In certain embodiments, elemental compositions of Al—Mg—Sc alloys can include:

Sc greater than or equal to 0.23 and less than or equal to 0.37 wt %;
Zr greater than or equal to 0.11 and less than or equal to 0.19 wt %;
Mg greater than or equal to 4.1 and less than or equal to 5.6 wt %;
Mn greater than or equal to 0.1 and less than or equal to 0.48 wt %;
Ti less than or equal to 0.15 wt %;
each of Si, Fe, Cu, and Zn less than or equal to 0.1 wt %;
with a balance of the composition being Al.

For the avoidance of doubt, the foregoing ranges encompass chemistries containing no or substantially no Ti. In some embodiments, the foregoing composition includes Mn in the range of 0.13-0.48 w % or in the range of 0.22-0.42 wt %. The inventors further discovered the need for a minimum amount of Mn greater than or equal to 0.15 wt % in a Al—Mg—Sc alloy, for example in the range of 0.15-0.25 wt %. Certain embodiments encompass Mn greater than 0.20 and less than or equal to 0.25 weight percent. The inventors further discovered advantageous results for a Al—Mg—Sc alloy that caps the amount of Mn at less than or equal to 0.25%, for example, in the range of 0.15-0.25%. In the foregoing embodiments, Sc can be present more specifically in the range of 0.28-0.32 wt %. Zr can be present more specifically in the range of 0.13-0.17 wt %. Mg can be present more specifically in the range of 4.6-5.1 wt %. Ti can be present more specifically in the range of 0.05-0.2 wt % or in the range of 0.06-0.1 wt %. In this context, "in the range of" includes the endpoints of the recited ranges.

Many embodiments contain Al, Mg, Sc, zirconium (Zr), manganese (Mn), silicon (Si), iron (Fe), copper (Cu), zinc (Zn), optionally titanium (Ti), and at least one of silver (Ag), boron (B), beryllium (Be), chromium (Cr), cadmium (Cd), and mercury (Hg). In the embodiments recited above, elemental compositions of Al—Mg—Sc alloys can further include:

less than or equal to about 0.2 wt % of Cr;
less than or equal to about 0.1 wt % of at least one of Be, Cd, Hg, Ag, B, Li;
less than or equal to about 0.05 wt % of each trace element; and
less than or equal to about 0.15 wt % of a total amount of trace elements;
with the balance of the composition being Al.

In the foregoing embodiments, Cr can be present more specifically in a weight percent less than or equal to 0.15. Cr can be present more specifically in a weight percent less than or equal to 0.08. Be (beryllium) can be present more specifically in a weight percent less than or equal to 0.0008. B (boron) can be present more specifically in the range of 0.0005-0.0015 wt %, inclusive of endpoints.

In some embodiments, the inclusion and discussion of other elements above may be included in these elemental compositions such as Sc, Zr, Mg, Ti, Si, Fe, Cu, Zn, Cr, Be, Cd, Hg, Ag, B, Li.

In at least one embodiment, elemental compositions of Al—Mg—Sc alloys include:

≤0.25 wt % Si;
≤0.25 wt % Fe;
≤1 wt % Cu;
0.15-0.1425 wt % Mn;
4.5-6 wt % Mg;
≤2 wt % Cr;
≤0.25 wt % Zn;
≤0.2 wt % Ti;
0.1-0.25 wt % Zr;
0.05-0.55 wt % Sc;
with the balance of the composition being Al. The composition can include, more specifically, ≤0.08 wt % Cr.

In at least one embodiment, elemental compositions of Al—Mg—Sc alloys include:

≤0.1 wt % Si;
≤0.1 wt % Fe;
≤0.05 wt % Cu;
0.15-0.25 wt % Mn;
4.6-5.1 wt % Mg;
≤0.15 wt % Cr;
≤0.1 wt % Zn;
≤0.1 wt % Ti;
0.0005-0.0015 wt % B;
0.13-0.17 wt % Zr;
≤0.0003 wt % Be;
0.28-0.32 wt % Sc;
with the balance of the composition being Al. The composition can include, more specifically, ≤0.08 wt % Cr.

Importantly, the inventors realized the inventive significance of the endpoints of the foregoing ranges and the endpoints thereof.

Including Mn in Al—Mg—Sc alloys may promote hardening and strengthening when strained through a work hardening effect. For example, rolling and/or forging work can harden the alloy quickly and, in that regard, Al—Mg—Sc alloys containing high quantities of Mn (e.g., around 0.7 wt %) can be advantageous.

The inventors discovered, however, that high quantities of Mn may not be desirable in all embodiments of the invention. (The disadvantages discussed next should not be understood to be a disclaimer of scope of other embodiments discussed in this written description of the invention.) First, the inventors observed that high amounts of Mn may not be not advantageous when drawing the alloy into a wire because the presence of Mn makes wire surface quality difficult to control and drawing more difficult. Second, Mn can undesirably add density to the alloys. Accordingly, reducing the amount of Mn may reduce the density of the alloy, which in large structures can result in a significant mass reduction.

Third, the inventors discovered that higher Mn may not offer strength benefits after heat treatment (e.g., heat-aging). In the as-deposited condition, before heat-aging, Mn in the alloy may be in solution which may provide solid solution strengthening. This occurs directly after deposition, however, and not after heat-aging. In examples where, after printing, there is no heat aging, a higher Mn content provides distinct benefits. However, in embodiments where heat-aging occurs, higher Mn content may be disadvantageous because the inventors have discovered that the Mn comes out of solution during heat-aging and instead forms large phases that may lead to deleterious mechanical properties.

Figure 21:
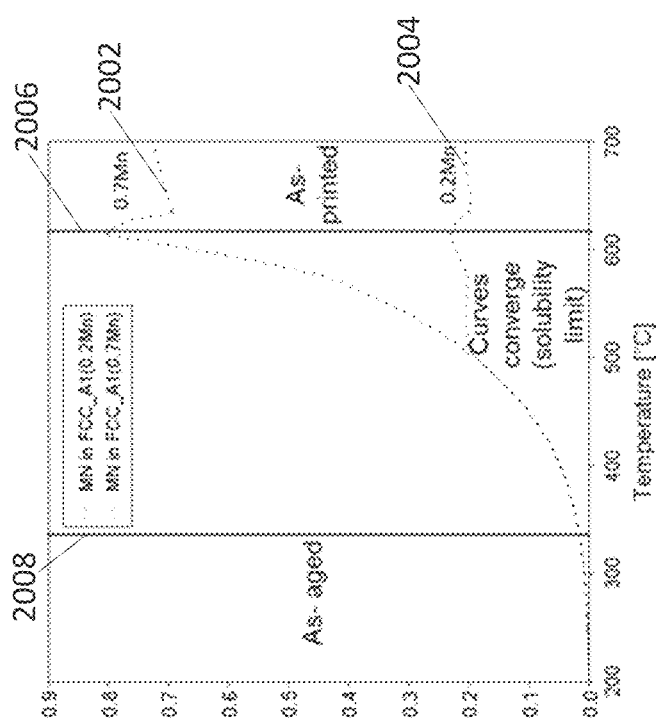
FIG. 21 is a graph of comparing the solubility of Mn in two alloys at different temperatures.

FIG. 21 is a graph of comparing the solubility of Mn in two alloys at different temperatures. A top line 2002 corresponds to an Al—Mg—Sc alloy including 0.7 wt % of Mn. A bottom line 2004 corresponds to an Al—Mg—Sc alloy including 0.2 wt % of Mn. The vertical axis corresponds to the mass percentage of Mn in solution. The horizontal axis corresponds to the temperature of the Al—Mg—Sc alloy. When the Mn is in solution, solid solution strengthening occurs which provides the alloy strength. When Mn comes out of solution it may form in a globular, large particles that do not provide strength. Printing occurs at 615° C. which is labeled by a first vertical line 2006. At this temperature, the manganese concentration may be much higher for the top line 2002 corresponding to 0.7 wt % Mn versus the bottom line 2004 corresponding to 0.2 wt % Mn. Thus, the higher Mn concentration stays in solution during the at printed state. However, after printing, the alloy is heat-aged at a temperature of 325° C. which is represented by a second vertical line 2008. At this temperature, the top line 2002 and the bottom line 2004 converge at less than 0.1 wt % Mn solubility which means leads to excess Mn in each case. Regardless of whether the feedstock has 0.7 wt % Mn or 0.2 wt % Mn, the heat-aged material has less than 0.1 wt % Mn solubility. There is more excess Mn in the 0.7 wt % Mn alloy than the 0.2 wt % Mn alloy.

Therefore, there is a very limited amount of that manganese, which stays in solution during heat-aging to provide that solid solution strengthening regardless of the amount of manganese in the total alloy composition. The inventors have observed that the remainder of the manganese may come out in the form of aluminum-manganese particles that do not provide strength and potentially provide deleterious properties. Accordingly, Mn only contributes marginally to solid solution strengthening and can have deleterious effects outweighing that marginal benefit.

As illustrated in FIG. 21, at heat-aging temperature 2008, the solubility of Mn appears to be below 0.1 wt % and even well below 0.05 wt %. This would suggest that a Mn content of below 0.1 wt % and even well below 0.05 wt % may be advantageous to avoid the formation of the large particles impacting alloy strength. At 0.15% or higher, such as at 0.2 wt % or 0.25 wt %, the Mn level exceeds the solubility limit in aluminum at the heat-aging temperature of 325° C., and such amounts are therefore counterintuitive to providing a strong 3D printed alloy, e.g., for use in the demanding environment of launch vehicles.

Yet, the inventors further discovered that non-soluble Mn at certain weight percentages above the solubility limit at the heat-aging temperature may unexpectedly improve strength in a printed material that includes the above alloys. Without limitation to any particular theory, the unexpected improvement may be due to the excess Mn (that does not contribute to solid solution strengthening) bonding with impurities in the alloy that would otherwise have disadvantageous effects on strength. For example, Fe and Si and certain other elements may be present as contaminants. The excess Mn may form Mn—Fe phases, Mn—Si phases, and/or Mn—Si—Fe phases, that may not embrittle the printed article. If these contaminants were not captured by excess insoluble Mn and they instead bond with other components of the alloy such as Al, these contaminants may form Al—Si or Al—Fe phases, which the inventors discovered will form as-printed and persist after aging, causing brittleness in a printed material. In this way, the excess Mn may bind with the Si and Fe impurities without causing brittleness that would otherwise occur if excess Mn were not present. Thus, the inventors discovered that including excess Mn above the solubility amount at the aging temperature (e.g., the amount providing solid solution strengthening) may serve a valuable purpose in helping alleviate otherwise embrittling effects of impurities.

As noted, in at least one embodiment, Mn is included in the foregoing alloys at 0.15 wt % or higher, such as at 0.2 wt % or 0.25 wt %. Again, these amounts all exceed the solubility limit in aluminum at the heat-aging temperature of 325° C. and do not contribute to alloy properties through solid solution strengthening, and yet unexpectedly contribute to the material properties by preventing formation of embrittling Al compounds during printing.

In some embodiments, the amount of Mn, may be selected based on the amount of impurities (e.g., Fe and Si) in the alloy. While Fe and Si are discussed as impurities which may bind to Mn, other impurities may be present as well such as Su, and/or P which may bind to Al and cause embrittling. Furthermore, these impurities may bind with Fe which may lead to iron sulfates and/or iron phosphates which may lead to cracking. Again, the excess Mn may not add beneficial material properties itself but unexpectedly may improve strength and other alloy properties by reducing the negative effect of impurities. Because additive manufacture of aerospace applications benefit from precise and high performing material, alloys including less contaminants may be advantageous.

Higher ranges of wt % Mn may yield advantageous results such as 0.15 wt % or higher. However, as discussed above, higher ranges beyond a certain wt % may have disadvantageous results. Mn higher than a certain level may cause the Mn to precipitate out during heat-aging and potentially creating a deleterious effect. The amount of Mn may be selected specifically based on the amount of impurities such as Si and Fe.

In some embodiments, the amount of Mn in the Al—Mg—Sc alloy may be greater than or equal to 0.15 wt % and less than or equal to 0.25 wt %. In some embodiments, the Al—Mg—Sc alloy composition includes from about 0.16 wt % Mn to about 0.24 wt % Mn; or from about 0.17 wt % Mn to about 0.23 wt % Mn; or from about 0.18 Wt % Mn to about 0.22 wt % Mn; or from about 0.19 wt % Mn to about 0.21 wt % Mn, based on the total amount of the composition. In some embodiments, the Al—Mg—Sc alloy composition includes about 0.20 wt % Mn.

The Al—Mg—Sc alloy may be utilized in a wire which may be utilized in additive manufacturing to produce an article. The Al—Mg—Sc alloy may be utilized to produce an article. The Al—Mg—Sc alloy may be utilized in an additive manufacturing process and a subsequent heat-aging process to produce the article. In some embodiments, the article has a yield strength of greater than or equal to 200 MPa or 225 MPa and a tensile strength of greater than or equal to 280 MPa or 300 MPa after a T5 age-after-print heat treatment process. The article may be a layered article as discussed above. For example, FIG. 18B and its corresponding disclosure provide an example layered article. The wire may be utilized in an additive manufacturing process including printing. The printed article may be heat treated after printing.

Aluminum-Magnesium-Scandium Wire Thickness

For aid in understanding the following discussion of dual plasma wire arc additive manufacturing, U.S. Provisional Patent Application No. 63/482,763, filed Feb. 1, 2023, is incorporated by reference in its entirety. The inventors discovered that the dual plasma processes described in the incorporated application are improved with a wire thickness of at least 1.5 mm, such as at least 1.6 mm or at least 2.0 mm. In some examples, the wire thickness may be between about 1.5 mm and about 2.5 mm, inclusive of the endpoints, and data points within that range, such as 2.0 mm.

The dual plasma print nozzle may include a greater stick-out distance than other processes such as cold metal transfer (CMT) deposition processes in 3D printing. The Al—Mg—Sc wire may be utilized as an electrode in the dual plasma wire arc additive manufacturing process. The inventors discovered that the stability that a thicker wire allows for the electrode to stay stable, instead of wandering. The inventors observed improved electrode stability when using a 1.6 mm wire compared with a 1.2 mm wire.

The inventors also discovered that longer up-time can be achieved when using a thicker wire with a dual-plasma print process. The dual plasma print process puts in much more power into the electrode than a CMT process does. However, this creates excess power which has to dissipate in some manner. It is possible to increase wire feed speed to provide more mass to the print head. Yet, mechanical constraints can limit wire feed speed. Moreover, increasing the wire feed speed can lead to undesirable electrode burn back when the mechanical constraints cannot keep up with dual plasma system requirements. That is, heat builds up in the wire electrode, such that the wire melts back up into where the wire is feeding from and clogs the nozzle. The printing process ends until the nozzle can be unclogged. The inventors realized that sufficient mass can be provided to the dual plasma nozzle by increasing wire diameter from 1.2 mm to, for example, 1.5 mm, 1.6 mm, 2.0 mm or higher. In some embodiments, the wire diameter may be 1.5 mm to 2.0 mm, 1.6 mm to 1.9 mm, or 1.7 mm to 1.8 mm.

DOCTRINE OF EQUIVALENTS

This description of the invention has been presented for the purposes of illustration and description. It is not intended to be exhaustive or to limit the invention to the precise form described, and many modifications and variations are possible in light of the teaching above. Notably, all references to wire arc additive manufacturing in this application are provided as an example and should not be construed as limiting. The inventive concepts in this application are applicable to any Directed Energy Deposition (DED) 3D printing process that uses wire feedstock. Relevant energy sources are plasma, arc, laser, and others. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the terms "approximately," "about," and "around" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

What is claimed is:

1. An article comprising:
   a layered structure comprising an aluminum-magnesium-scandium alloy, wherein the aluminum-magnesium-scandium alloy comprises:
     Sc greater than or equal to 0.23 and less than or equal to 0.37 weight percent;
     Zr greater than or equal to 0.11 and less than or equal to 0.19 weight percent;
     Mg greater than or equal to 4.1 and less than or equal to 5.6 weight percent;
     Mn greater than or equal to 0.15 and less than or equal to 0.25 weight percent;
     Ti greater than or equal to 0.05 and less than or equal to 0.15 weight percent;
     each of Si, Fe, Cu, and Zn less than or equal to 0.1 weight percent; and
     with a balance of the composition being Al,
   wherein the article has a yield strength of greater than or equal to 200 MPa and a tensile strength of greater than or equal to 280 MPa after a T5 age-after-print heat treatment process.

2. The article of claim 1, wherein the composition further comprises less than or equal to 0.2 wt % Cr.

3. The article of claim 1, wherein the composition further comprises less than or equal to 0.1 wt % of at least one of Cd, Hg, Ag, B, and Li.

4. The article of claim 1, wherein the composition further comprises less than or equal to 0.002 wt % B.

5. The article of claim 1, wherein the composition further comprises less than or equal to 0.0008 wt % Be.

6. The article of claim 1, wherein the composition further comprises less than or equal to 0.05 wt % Si.

7. The article of claim 1, wherein a ratio of Zr to Sc is less than or equal to 0.51, when determined according to the formula: (Zr wt %/Sc wt %).

8. The article of claim 1, where the wt % of Mn present in the composition exceeds the wt % of Fe present in the composition combined with the wt % of Si presented in the composition.

9. The article of claim 1, wherein the composition further comprises at least one trace element less than or equal to 0.05 weight percent, and a total amount of trace element less than or equal to 0.15 weight percent.

10. The article of claim 9, wherein the at least one trace element is selected from the group consisting of: an element from the lanthanide group, yttrium (Y), niobium (Nb), vanadium (V), hydrogen (H), oxygen (O), nitrogen (N), and any combination thereof.

11. The article of claim 1, wherein the composition comprises at least one primary particle or domain of $Al_3$(Sc, Zr) having at least one dimension of less than or equal to 20 μm.

12. The article of claim 1, wherein at least a portion of the article has a height at least 1000 times greater than a thickness of the same portion of the article.

13. The article of claim 1, wherein the article has a yield strength of greater than or equal to 225 MPa and a tensile strength of greater than or equal to 300 MPa after the heat treatment.

14. The article of claim 1, wherein the heat treatment is a process where the article is heated at a temperature at least 275° C. and less than a melting point of the article for a period of less than or equal to 12 hours, and omits a homogenization heat treatment.

15. The article of claim 1, wherein the heat treatment temperature is less than or equal to 335° C.

16. The article of claim 1, wherein after the heat treatment, the article has a degree of sensitization (DoS) mass loss of less than or equal to 15 mg/cm$^2$.

17. The article of claim 1, wherein the Mn content is greater than 0.2 and less than 0.25 weight percent.

18. The article of claim 1, wherein the layered structure comprises layers of cylindrical or oval shaped contours that additively stack to form the article.

19. The article of claim 1, wherein the Sc composition is greater than or equal to 0.28 and less than or equal to 0.32 weight percent.

* * * * *